(12) United States Patent
Humphreys et al.

(10) Patent No.: US 11,339,330 B2
(45) Date of Patent: May 24, 2022

(54) METHOD AND APPARATUS FOR PRODUCING BIOFUEL

(71) Applicant: MURA TECHNOLOGY LIMITED, London (GB)

(72) Inventors: Leonard James Humphreys, Roseville Chase (AU); William Neil Rowlands, Alexandria (AU)

(73) Assignee: Mura Technology Limited, London (GB)

( * ) Notice: Subject to any disclaimer, the term of this patent is extended or adjusted under 35 U.S.C. 154(b) by 2 days.

(21) Appl. No.: 16/465,916

(22) PCT Filed: Dec. 14, 2017

(86) PCT No.: PCT/AU2017/000278
§ 371 (c)(1),
(2) Date: May 31, 2019

(87) PCT Pub. No.: WO2018/107204
PCT Pub. Date: Jun. 21, 2018

(65) Prior Publication Data
US 2020/0071619 A1 Mar. 5, 2020

(30) Foreign Application Priority Data
Dec. 14, 2016 (AU) .................. 2016905177

(51) Int. Cl.
| | |
|---|---|
| *C10G 1/10* | (2006.01) |
| *C10G 1/00* | (2006.01) |
| *C10L 1/02* | (2006.01) |
| *C10L 1/04* | (2006.01) |

(52) U.S. Cl.
CPC .............. *C10G 1/10* (2013.01); *C10G 1/002* (2013.01); *C10L 1/02* (2013.01); *C10L 1/04* (2013.01); *C10G 2300/1003* (2013.01); *C10G 2300/202* (2013.01); *C10G 2300/301* (2013.01); *C10G 2300/805* (2013.01); *C10G 2400/28* (2013.01); *C10L 2200/0461* (2013.01);
(Continued)

(58) Field of Classification Search
CPC .......................... C10G 1/10; C10G 2300/1003
See application file for complete search history.

(56) References Cited

U.S. PATENT DOCUMENTS

| | | | | |
|---|---|---|---|---|
| 6,107,532 | A | * | 8/2000 | Saito ................. C10G 1/10 44/300 |
| 6,504,068 | B1 | | 1/2003 | Matsubara et al. |
| 2005/0261470 | A1 | | 11/2005 | Goto et al. |

(Continued)

FOREIGN PATENT DOCUMENTS

| | | |
|---|---|---|
| WO | 2012000033 A1 | 1/2012 |
| WO | 2014197928 A1 | 12/2014 |
| WO | 2016197180 A1 | 12/2016 |

OTHER PUBLICATIONS

Motonobu Goto, Chemical recycling of plastics using sub- and supercritical fluids, 2009, Journal of Supercritical Fluids, 47, 500-507 (Year: 2009).*

*Primary Examiner* — Ellen M McAvoy
*Assistant Examiner* — Ming Cheung Po
(74) *Attorney, Agent, or Firm* — Hoffmann & Baron, LLP

(57) ABSTRACT

The present invention relates to the field of renewable energy. More specifically, the present invention relates to the production of biofuel from biomass including, for example, polymeric materials.

18 Claims, 21 Drawing Sheets

(52) U.S. Cl.
CPC ....... *C10L 2250/04* (2013.01); *C10L 2290/06* (2013.01); *C10L 2290/28* (2013.01)

(56) References Cited

U.S. PATENT DOCUMENTS

| | | | |
|---|---|---|---|
| 2010/0329938 A1* | 12/2010 | Allan | B01J 8/0045 422/186.01 |
| 2012/0184788 A1* | 7/2012 | Loop | B01J 3/008 585/241 |
| 2014/0112955 A1 | 4/2014 | Bodo et al. | |
| 2016/0114307 A1 | 4/2016 | Downie et al. | |

* cited by examiner

METHOD AND APPARATUS FOR PRODUCING BIOFUEL

INCORPORATION BY CROSS-REFERENCE

The present invention claims priority from Australian provisional patent application no. 2016905177 filed on 14 Dec. 2016, the entire contents of which are incorporated herein by cross-reference.

TECHNICAL FIELD

The present invention relates to the field of renewable energy. More specifically, the present invention relates to the production of biofuel from biomass including, for example, polymeric materials.

BACKGROUND

As light crude reservoirs become scarce and carbon constraints raise questions about the wisdom of continued extraction of fossil fuels, much effort has focussed on alternative sources such as the generation of biofuels (e.g. bio-oils) from natural feedstocks (e.g. plant material) and waste materials (e.g. sewerage, municipal waste etc.).

Plastic waste material is poorly biodegradable and represents an increasing environmental problem. The majority of plastic waste is still used in landfill meaning that a significant amount of processed raw material and energy is lost/not utilised. Methods capable of converting plastic waste into biofuels or other valuable products would thus offer a solution to the issue of accumulating plastic wastes as well as an alternative to fossil fuel utilisation.

Indeed, many types of polymer waste are not suitable for recycling. Disposal options are therefore incineration or land-fill. Both of these activities are banned or discouraged in many jurisdictions, incineration because of hazardous emissions e.g. dioxins associated with small amounts of chlorine from e.g. polyvinyl chloride (PVC) content of the polymer waste, and land fill because it is unsustainable and polluting. A further option is thermo-chemical recycling (e.g. pyrolysis or catalytic pyrolysis to produce fuels or chemicals by thermal or catalytic cracking of the polymers). These processes suffer from the problems that emissions can be hazardous as for incineration and the processes, especially catalytic processes are sensitive to ash, metals, cellulose (paper), inorganic fillers and additives as impurities in the polymer feed. Heat transfer into polymer masses is also problematic, leading to blockages in plant. As a consequence of these problems several waste plastic pyrolysis plants that have attempted to operate commercially have closed down.

A need exists for improved methods and/or devices capable of converting polymeric materials (e.g. plastics) into biofuel.

SUMMARY

The present invention addresses one or more problems existing in the prior art by providing improved means to convert polymeric materials into biofuels and/or other chemicals.

The means by which the present invention addresses one or more of the shortfalls in the prior art noted above include, without limitation, any one or more of the following features. Polymeric materials such as waste plastics may be readily prepared by means known in the art for extrusion by a suitable extruder. The extruder output may then be combined with a heated/pressurised aqueous solvent to provide a mixture of polymeric material/water with a high concentration of the polymeric material compared to an equivalent reaction mixture formed without extruding the polymeric material. The water phase may provide efficient heat transfer to the polymer melt by virtue of its high diffusivity, and/or the presence of the water may supress char formation. Halogens (e.g. chlorine) present in the reaction mixture may be largely transferred to the aqueous phase as inorganic halides thereby reducing issues around dioxin formation. Cellulose based impurities such as paper may be largely gasified or else converted to oil components. Ash-like components and inorganic fillers may be largely carried through the process and can be separated from the products by means known in the art (e.g. fractional distillation). The design of the extruder-reactor interface and/or the mixing interface for the dilution with supercritical or superheated aqueous solvent (e.g. water) may, for example, be at least in part responsible for providing advantage/s over prior art methods.

The present invention relates to at least the following non-limiting embodiments:

Embodiment 1

A method for producing a bio-oil, the method comprising:
extruding polymeric material in an extruder to thereby form a melt stream comprising the polymeric material,
providing a stream of aqueous solvent that is separate to the melt stream,
contacting the melt stream with the stream of aqueous solvent to form a reaction mixture,
treating the reaction mixture in a reactor vessel at a reaction temperature and a reaction pressure for a time period suitable for conversion of all or a portion of the polymeric material present in the reaction mixture into a product comprising the bio-oil, and
depressurising and cooling the product.

Embodiment 2

The method according to embodiment 1, wherein the extruder is a single screw extruder, a multiscrew extruder, a counter-rotating multiscrew extruder, a co-rotating multiscrew extruder, a twin screw extruder, a counter-rotating twin screw extruder, a co-rotating twin screw extruder, an intermeshing screw extruder, a radial extruder, or a roll-type extrusion press.

Embodiment 3

The method according to embodiment 1 or embodiment 2, wherein the method further comprises venting gases and/or vapours from one or a series of ports present in a barrel of the extruder.

Embodiment 4

The method according to embodiment 3, wherein the gases and/or vapours comprise any one or more of: hydrogen chloride, hydrogen bromide, hydrogen fluoride, chlorine, ammonia, carbon monoxide, carbon dioxide.

Embodiment 5

The method according to any one of embodiments 1 to 4, further comprising adding a base to any one or more of: the polymeric material prior to extrusion, the melt stream, the stream of aqueous solvent, and/or the reaction mixture, wherein:

the base is an additional component to the polymeric material and the aqueous solvent, within the reaction mixture the number of moles of the base added per 100 grams of polymeric material is between 0.5 times and 1.5 times the total number of moles of halogens per 100 grams of the polymeric material, and the base precipitates metal halides in the reaction mixture facilitating their removal.

Embodiment 6

The method according to embodiment 5, wherein the product has a pH of more than 3, 4, 5, 6, 7, 8, or 9 after cooling and depressurising it to ambient temperature and pressure.

Embodiment 7

The method of any one of embodiments 1 to 6, wherein the melt stream exits from the extruder:
(i) at a pressure of more than 20 bar, more than 50 bar, more than 100 bar, more than 150 bar, more than 200 bar, more than 220 bar, more than 250 bar, or more than 350 bar, or between 220 bar and 300 bar; and/or
(ii) at a temperature of between 200° C. and 300° C. and a pressure of between 100 bar and 350 bar, or at a temperature of between 220° C. and 280° C. and a pressure of between 200 bar and 350 bar, or at a temperature of between 280° C. and 380° C. and a pressure of between 220 bar and 300 bar.

Embodiment 8

The method of any one of embodiments 1 to 7, wherein the extruder is directly connected to a hydrothermal reactor apparatus in a manner allowing the melt stream to flow into the reactor in a continuous flow.

Embodiment 9

The method according to any one of embodiments 1 to 8, wherein prior to said extruding the polymeric material is preteated using any one or more of grinding, chipping, pelletisation, granulisation, flaking, powdering, shredding, milling, compression/expansion, agitation, washing, flotation, removing materials comprising halogens optionally by infra-red or x-ray fluorescence detection and compressed gas classification/rejection and/or pulse-electric field (PEF) treatment.

Embodiment 10

The method according to any one of embodiments 1 to 9, wherein the polymeric material is extruded in the presence of water, and the water constitutes less than 5 wt % (wet basis) of total polymeric material weight.

Embodiment 11

The method according to any one of embodiments 1 to 10, wherein the polymeric material is selected from the group consisting of: Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly (vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly(phenylene Oxide) (PPO), Polyphenylene Sulfide (PPS), Polyphthalamide, (PTA), Polysulfone (PSU), Polyurethane, (PU), Poly(vinylidene chloride) (PVDC), Poly (tetrafluoroethylene) PTFE, Poly(fluoroxy alkane) PFA, Poly(siloxanes), silicones, thermoplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers, synthetic polymeric materials, naturally-occurring polymeric materials, plastics, and mixtures thereof.

Embodiment 12

The method according to any one of embodiments 1 to 11, wherein the reaction mixture prior to said treating comprises:
(i) at least 1 wt %, at least 2 wt %, at least 3 wt %, at least 4 wt %, at least 5 wt %, at least 10 wt %, at least 15 wt %, at least 20 wt %, at least 5 wt %, at least 30 wt %, at least 35 wt %, at least 40 wt %, at least 45 wt %, at least 50 wt %, at least 60 wt %, at least 70 wt %, at least 80 wt %, at least 90 wt %, at least 95 wt %, or at least 98 wt % of the polymeric material; and/or
(ii) less than 98 wt %, less than 95 wt %, less than 90 wt %, less than 80 wt %, less than 70 wt %, less than 60 wt %, less than 50 wt %, less than 45 wt %, less than 40 wt %, less than 35 wt %, less than 30 wt %, less than 25 wt %, less than 20 wt %, less than 15 wt %, less than 10 wt %, less than 5 wt %, less than 4 wt %, less than 3 wt %, less than 2 wt %, or less than 1 wt %, of the polymeric material.

Embodiment 13

The method according to any one of embodiments 1 to 12, wherein the reaction mixture prior to said treating comprises:
between 40 wt % and 80 wt % of the polymeric material from the melt stream and between 20 wt % and 60 wt % of the aqueous solvent from the aqueous solvent stream; or
between 50 wt % and 75 wt % of the polymeric material from the melt stream and between 25 wt % and 50 wt % of the aqueous solvent from the aqueous solvent stream.

Embodiment 14

The method according to any one of embodiments 1 to 13, wherein the polymeric material comprises any one or more of:

less than about 5 wt % nitrogen, less than about 1 wt % nitrogen, less than about 0.5 wt % nitrogen, or less than about 0.1 wt % nitrogen;

less than about 1 wt % total halogens, less than about 1 wt % total halogens, less than about 0.5 wt % total halogens, less than about 0.1 wt % total halogens, or less than about 0.05 wt % total halogens;

a molar ratio of hydrogen to carbon (H/C) of greater than 2.15, greater than 2.0, greater than 1.8, greater than 1.6, greater than 14, greater than 1.2, greater than 1.0, or greater than 0.8.

Embodiment 15

The method according to any one of embodiments 1 to 14, wherein:
the reaction temperature is or ranges between 300° C. and 600° C. and the reaction pressure is or ranges between 50 bar and 300 bar; or
the reaction temperature is or ranges between 350° C. and 550° C. and the reaction pressure is or ranges between 50 bar and 300 bar; or
the reaction temperature is or ranges between 350° C. and 600° C. and the reaction pressure is or ranges between 20 bar and 350 bar; or
the reaction temperature is or ranges between 375° C. and 550° C. and the reaction pressure is or ranges between 50 bar and 300 bar; or
the reaction temperature is or ranges between 400° C. and 600° C. and the reaction pressure is or ranges between 100 bar and 300 bar; or
the reaction temperature is or ranges between 380° C. and 500° C. and the reaction pressure is or ranges between 200 bar and 300 bar; or Embodiment 16

The method according to any one of embodiments 1 to 15, wherein the stream of aqueous solvent is supercritical prior to said contacting.

Embodiment 17

The method of any one of embodiments 1 to 16, wherein prior to said contacting the stream of aqueous solvent comprises more than 90% supercritical water, more than 95% supercritical water, or 100% supercritical water; or
more than 90% subcritical water, more than 90% subcritical water, or 100% subcritical water; or
more than 90% steam, more than 95% steam, or 100% steam.

Embodiment 18

The method of any one of embodiments 1 to 17, wherein prior to said contacting the stream of aqueous solvent comprises between 5 wt % and 40 wt % alcohol, between 1 wt % and 30 wt % alcohol, between 5 wt % and 25 wt % alcohol, between 1 wt % and 20 wt % alcohol, between 2 wt % and 20 wt % alcohol, between 1 wt % and 10 wt % alcohol, or between 2 wt % and 10 wt % alcohol.

Embodiment 19

The method according to embodiment 18 wherein the alcohol is ethanol, methanol, or a mixture comprising ethanol and methanol.

Embodiment 20

The method according to any one of embodiments 1 to 19, wherein the method comprises
separating one or more of a gaseous, aqueous, bio-oil, and/or wax component from the product, and/or
separating one or more fractions of a bio-oil, and/or one or more fractions of a wax component from the product.

Embodiment 21

The method according to any one of embodiments 1 to 20, wherein the method comprises separating and recycling into the method one or more fractions of the product having a boiling point:
between 30° C. and 140° C., between 60° C. and 160° C., 140° C. and 205° C., between 150° C. and 300° C., or between 230° C. and 350° C.

Embodiment 22

The method according to any one of embodiments 1 to 21, wherein the method comprises separating and recycling into the method a fraction of the product comprising a wax or a waxy oil having a boiling point above 370° C. atmospheric equivalent boiling point (AEBP), above 400° C. AEBP, above 450° C. AEBP, above 500° C. AEBP, or above 550° C. AEBP.

Embodiment 23

The method according to any one of embodiments 1 to 22, wherein the method comprises separating and recycling a fraction of the product having a boiling point in the range of a: naphtha boiling range, heavy naphtha boiling range, kerosene boiling range, diesel boiling range, heavy gas oil boiling range, or vacuum gas oil boiling range, and combusting the separated naphtha fraction to provide heat for repeating the method.

Embodiment 24

The method according to any one of embodiments 1 to 23, wherein the reaction mixture comprises a supplementary catalyst selected from the group consisting of: a base catalyst, an acid catalyst, a water-gas-shift catalyst, an aluminosilicate catalyst, a sulphide catalyst, and any combination thereof, wherein the supplementary catalyst is not derived from any other component of the reaction mixture or a vessel wall of a reactor apparatus, and does not form in situ during the method.

Embodiment 25

The method according to embodiment 24, wherein the supplementary catalyst is selected from the group consisting of sodium hydroxide, potassium hydroxide, sodium carbonate, potassium carbonate, sodium formate, potassium formate, an iron salt, or any combination thereof.

Embodiment 26

The method according to embodiment 24 or embodiment 25, wherein the supplementary catalyst is added to the reaction mixture after the reaction mixture has reached said reaction temperature, or after the reaction mixture after the reaction mixture has reached said reaction temperature and said reaction pressure.

Embodiment 27

The method according to any one of embodiments 1 to 26, wherein the reaction mixture comprises between 5 wt % and 60 wt %, between 10 wt % and 60 wt %, or between 20 wt % and 60 wt %, of oil, optionally wherein the oil is recycled from a bio-oil product previously generated in accordance with the method of any one of embodiments 1 to 26.

Embodiment 28

The method according to embodiment 27, wherein the oil is selected from the group consisting of paraffinic oil, gas-oil, crude oil, synthetic oil, coal-oil, bio-oil, shale oil, kerogen oil, mineral oil, white mineral oil, and aromatic oil.

Embodiment 29

The method according to any one of embodiments 1 to 28, wherein the reaction mixture prior to said treating:
(i) comprises less than 10 wt %, less than 5 wt %, less than 4 wt %, less than 3 wt %, less than 2 wt %, or less than 1 wt %, of: lignocellulosic matter, coal, coke, peat, kerogen, tar sand, oil shale, shale tar, asphalt, asphaltine, natural bitumen, or bituminous sand; or
(ii) does not comprise lignocellulosic matter, coal, coke, peat, kerogen, tar sand, oil shale, shale tar, asphalt, asphaltine, natural bitumen, or bituminous sand.

Embodiment 30

The method according to embodiment 29, wherein said lignocellulosic material comprises more than 5 wt % lignin, more than 10 wt % lignin, more than 15 wt % lignin, more than 20 wt % lignin, more than 25 wt % lignin, more than 30 wt % lignin, more than 35 wt % lignin, more than 40 wt % lignin, more than 45 wt % lignin, or more than 50 wt % lignin.

Embodiment 31 The method according to any one of embodiments 1 to 30, wherein the reaction mixture comprises a solid substrate that is either or both of:
(i) solid or substantially solid at the temperature and the pressure;
(ii) inert or substantially inert at the temperature and the pressure.

Embodiment 32 The method according to embodiment 31, wherein the solid substrate is:
(i) a carbonaceous material comprising at least 50%, at least 60%, at least 70%, at least 80%, or at least 90% by weight carbon; or
(ii) is a non-carbonaceous material comprising no more than 10%, no more than 5%, no more than 1%, or no carbon.

Embodiment 33

The method according to embodiment 31 or embodiment 32, wherein the solid substrate is selected from the group consisting of: coals, anthracitic coal, meta-anthracite, anthracite semianthracite, bituminous coal, subbituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium.

Embodiment 34

The method according to any one of embodiments 31 to 33, wherein the reaction mixture comprises more than 0.5 wt %, more than 1 wt %, more than 3 wt %, more than 5 wt %, more than 10 wt %, more than 15 wt %, more than 20 wt %, more than 25 wt %, or more than 30 wt %, of the solid substrate.

Embodiment 35

A product obtained or obtainable by the method according to any one of embodiments 1 to 34.

BRIEF DESCRIPTION OF THE FIGURES

A preferred embodiment of the present invention will now be described, by way of an example only, with reference to the accompanying figures wherein:

Figure One provides an exemplary schematic of a method and apparatus according to embodiments of the present invention.

Figure 1:
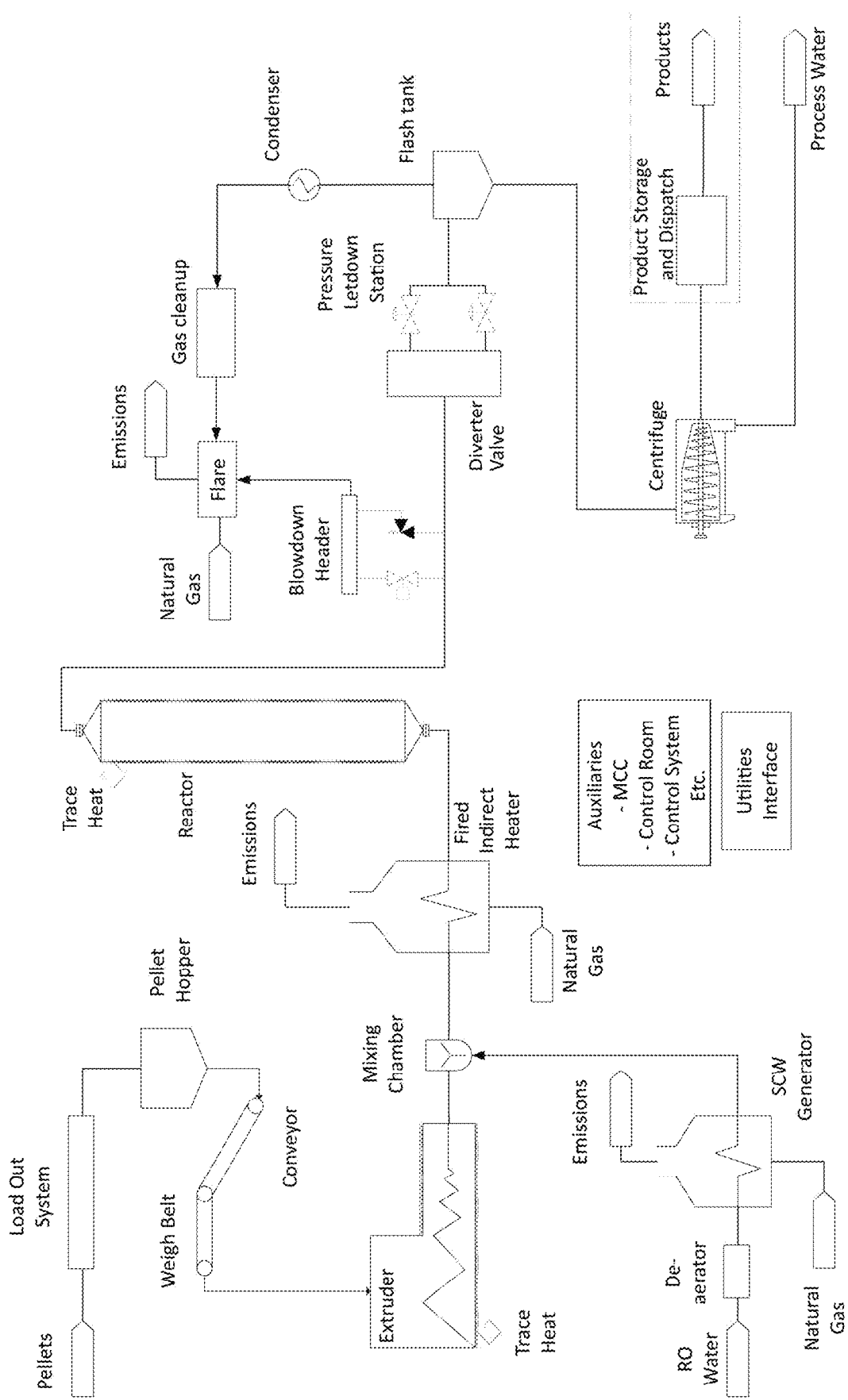
Figure 2:
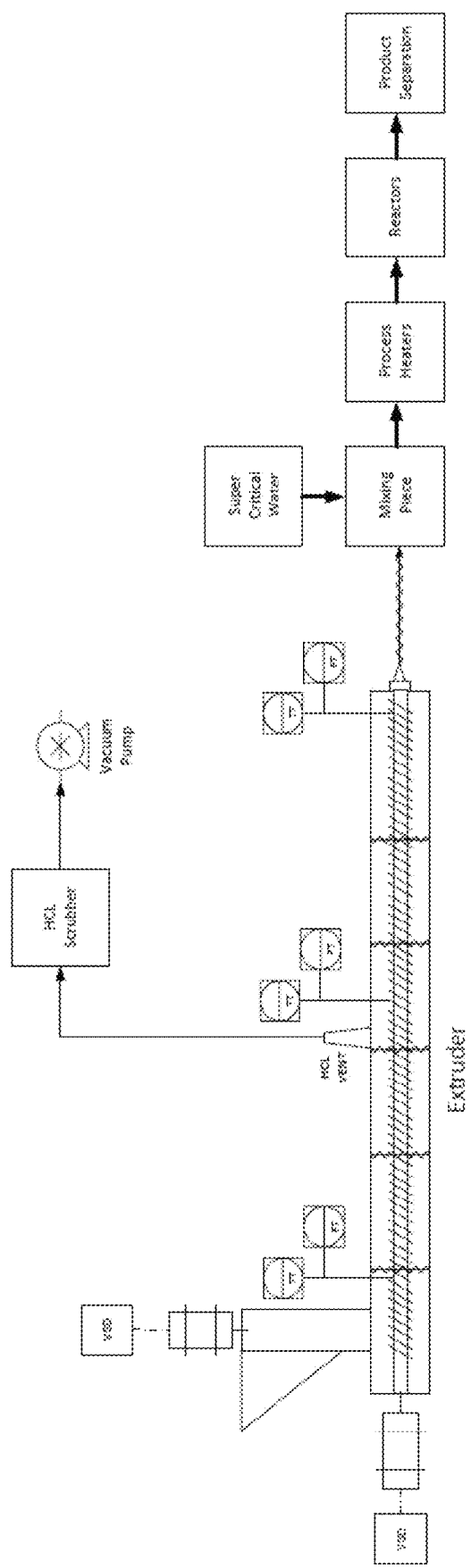
Figure 3:
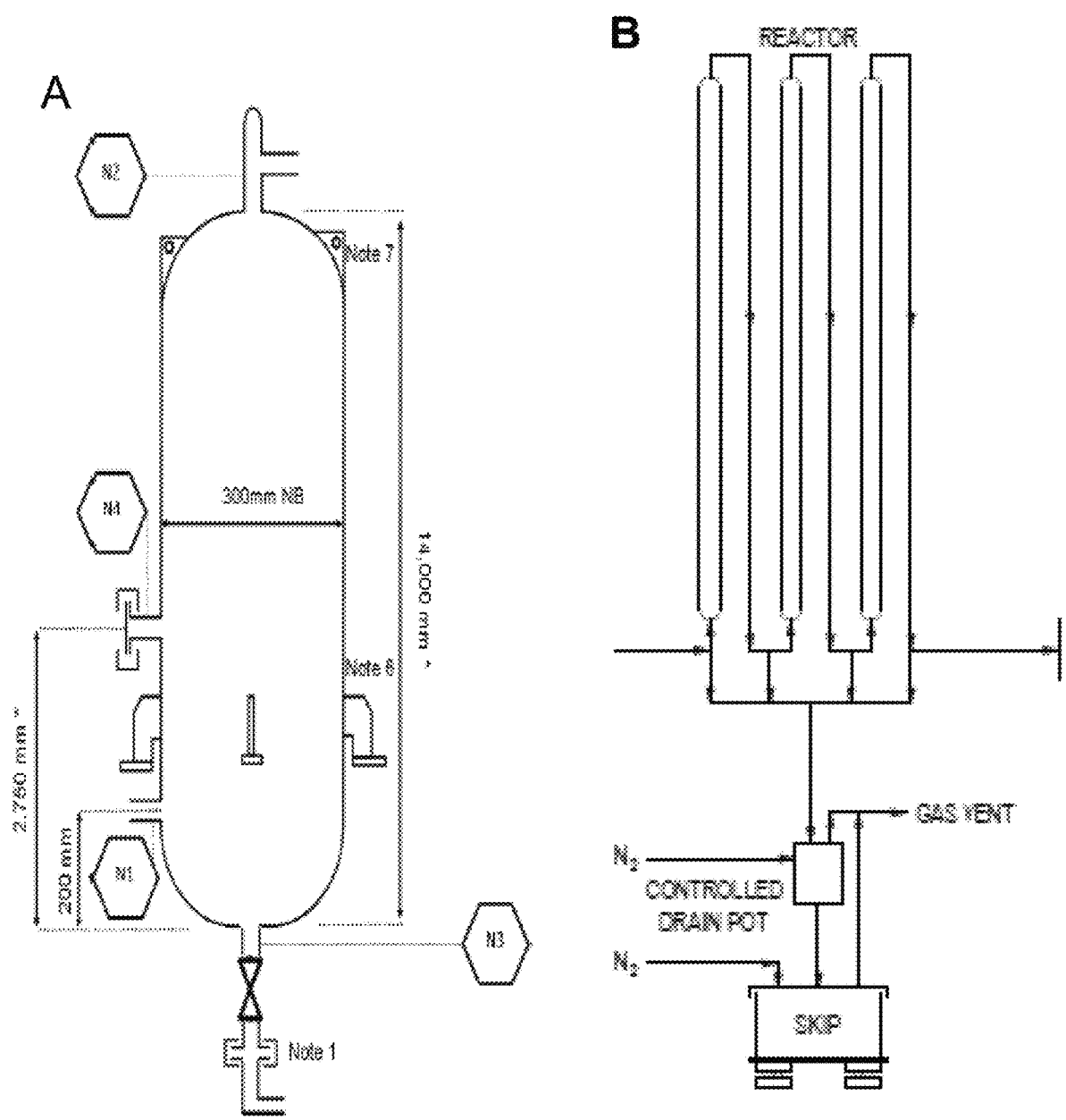
Figure 4:
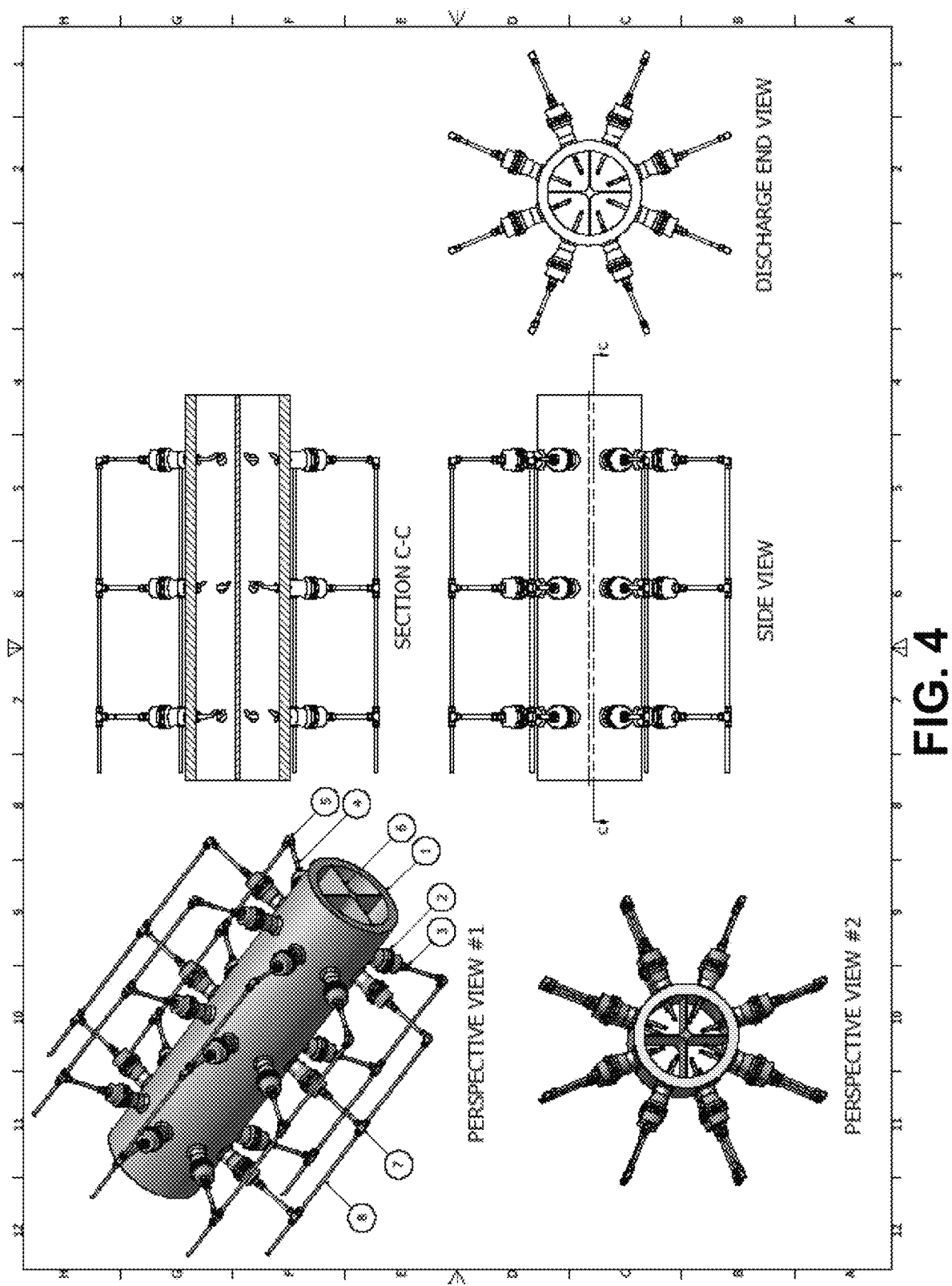
Figure 5:
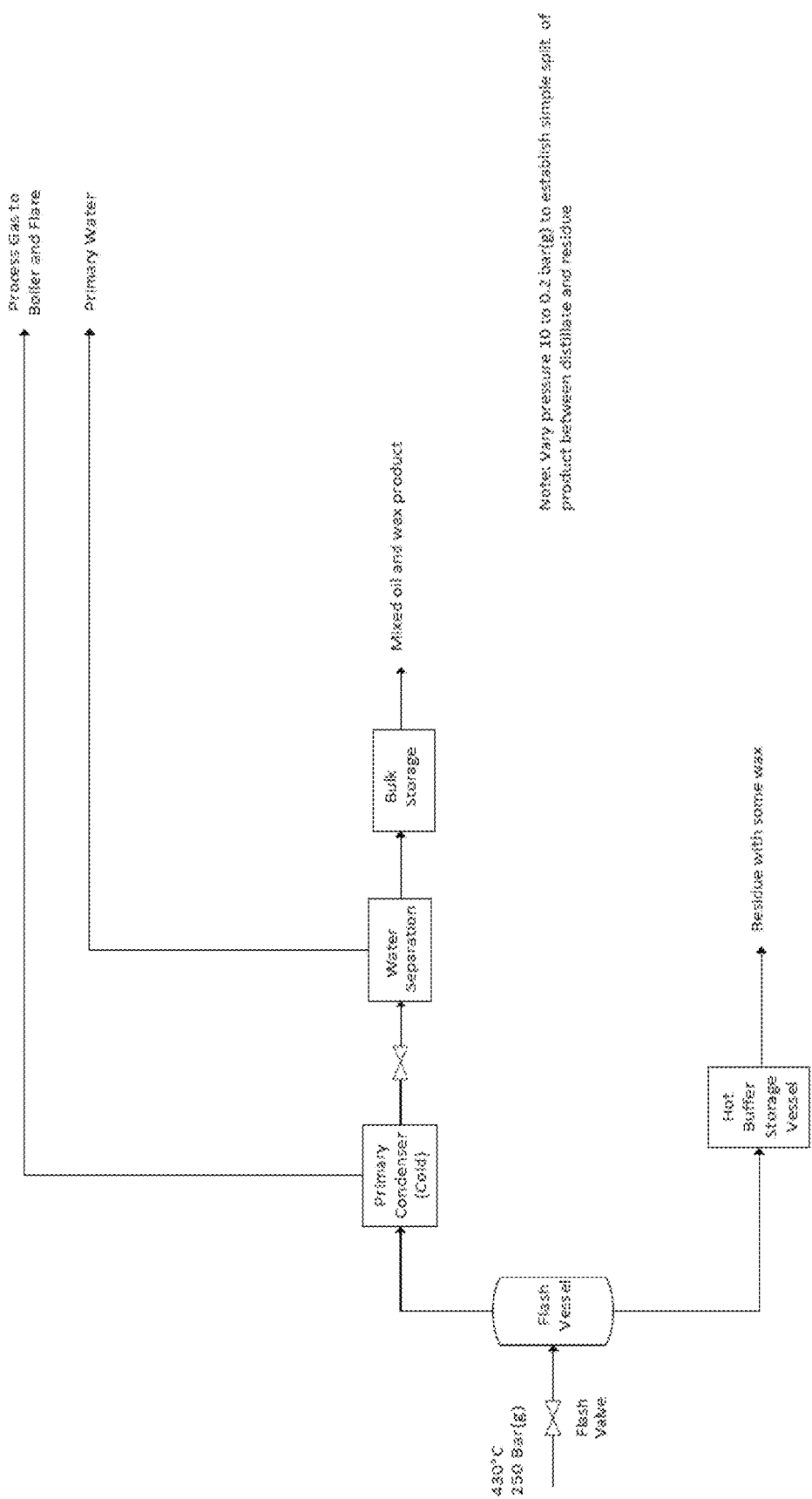
Figure 6:
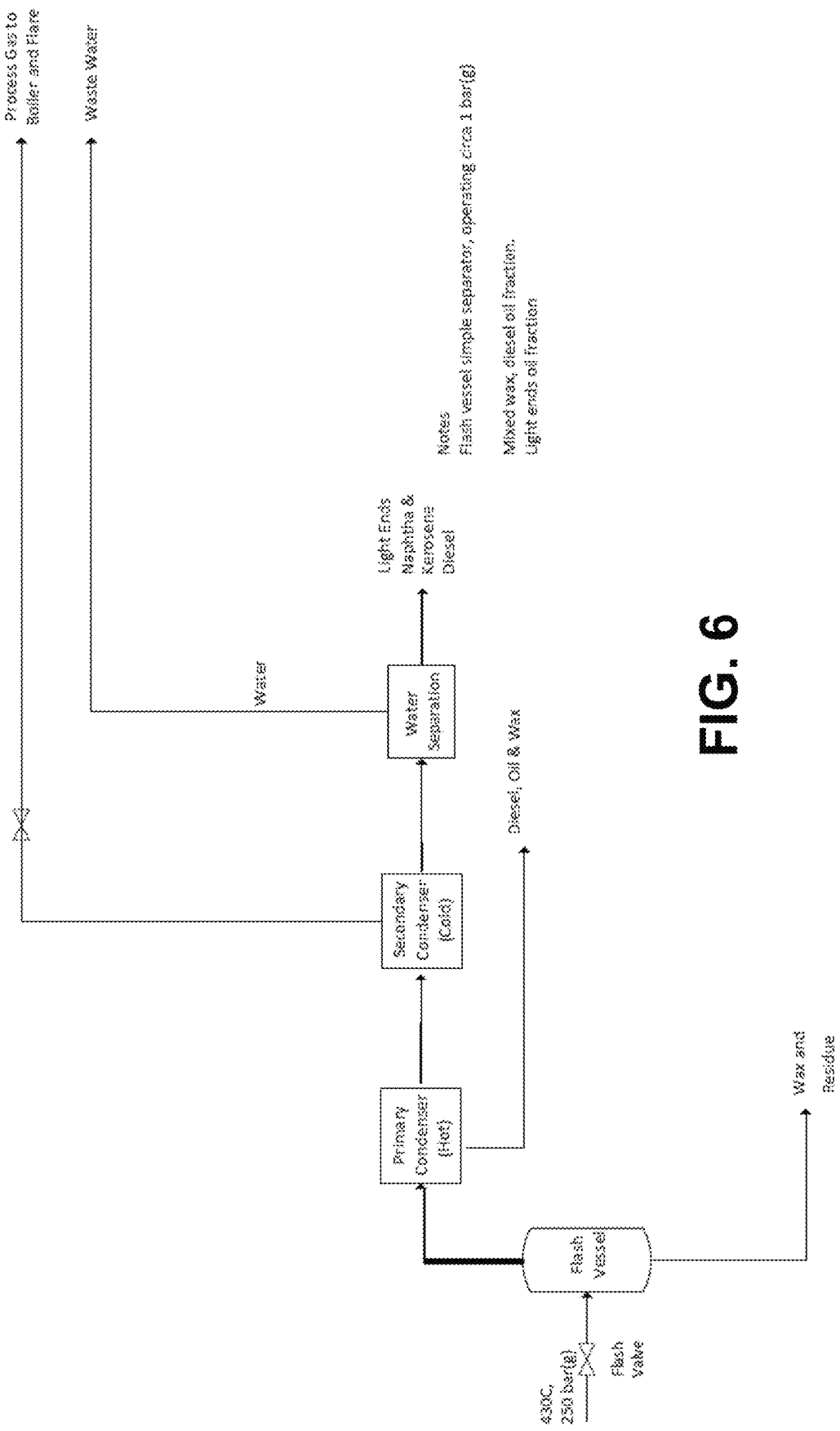
Figure 7:
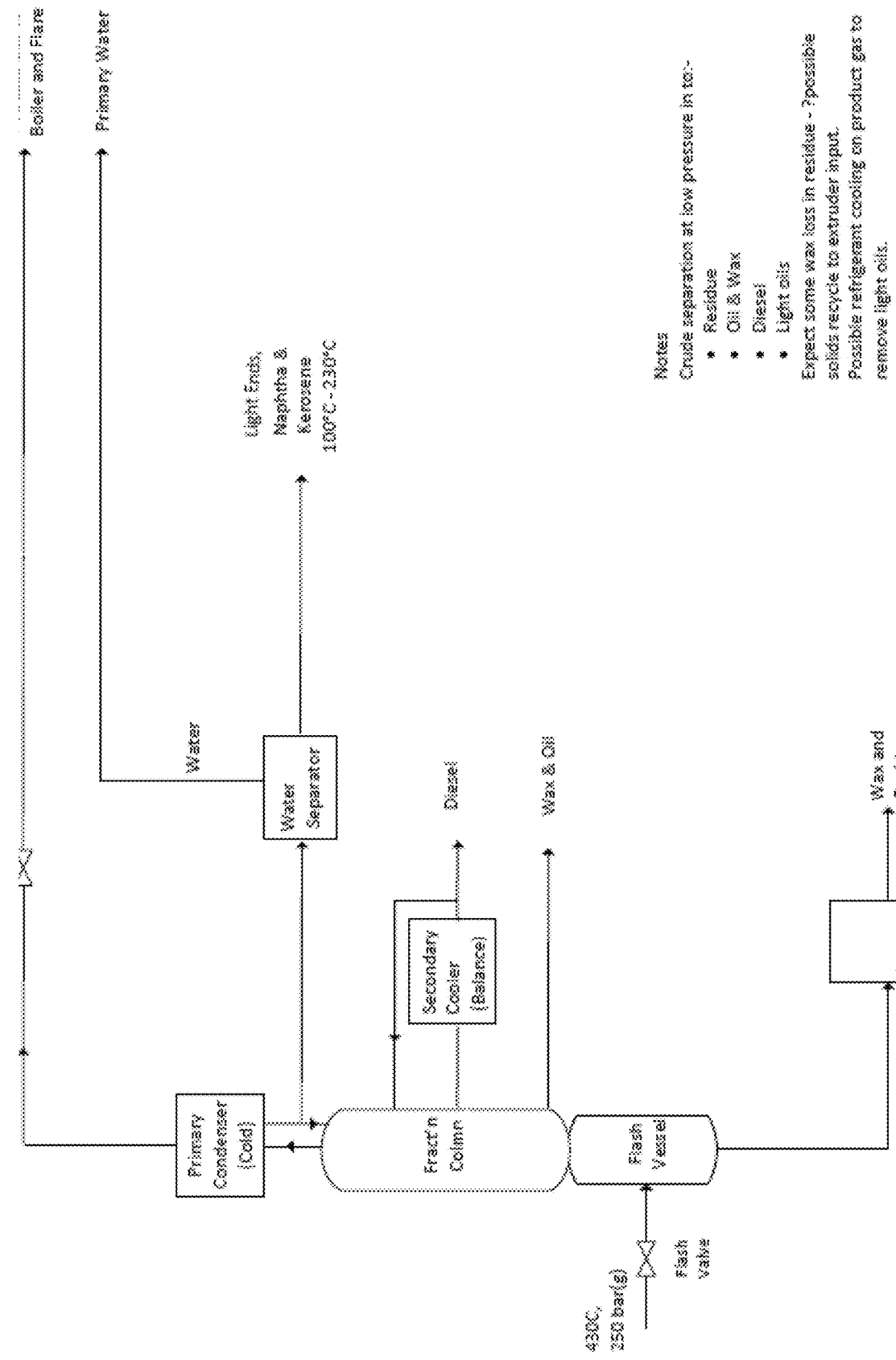
Figure 8:
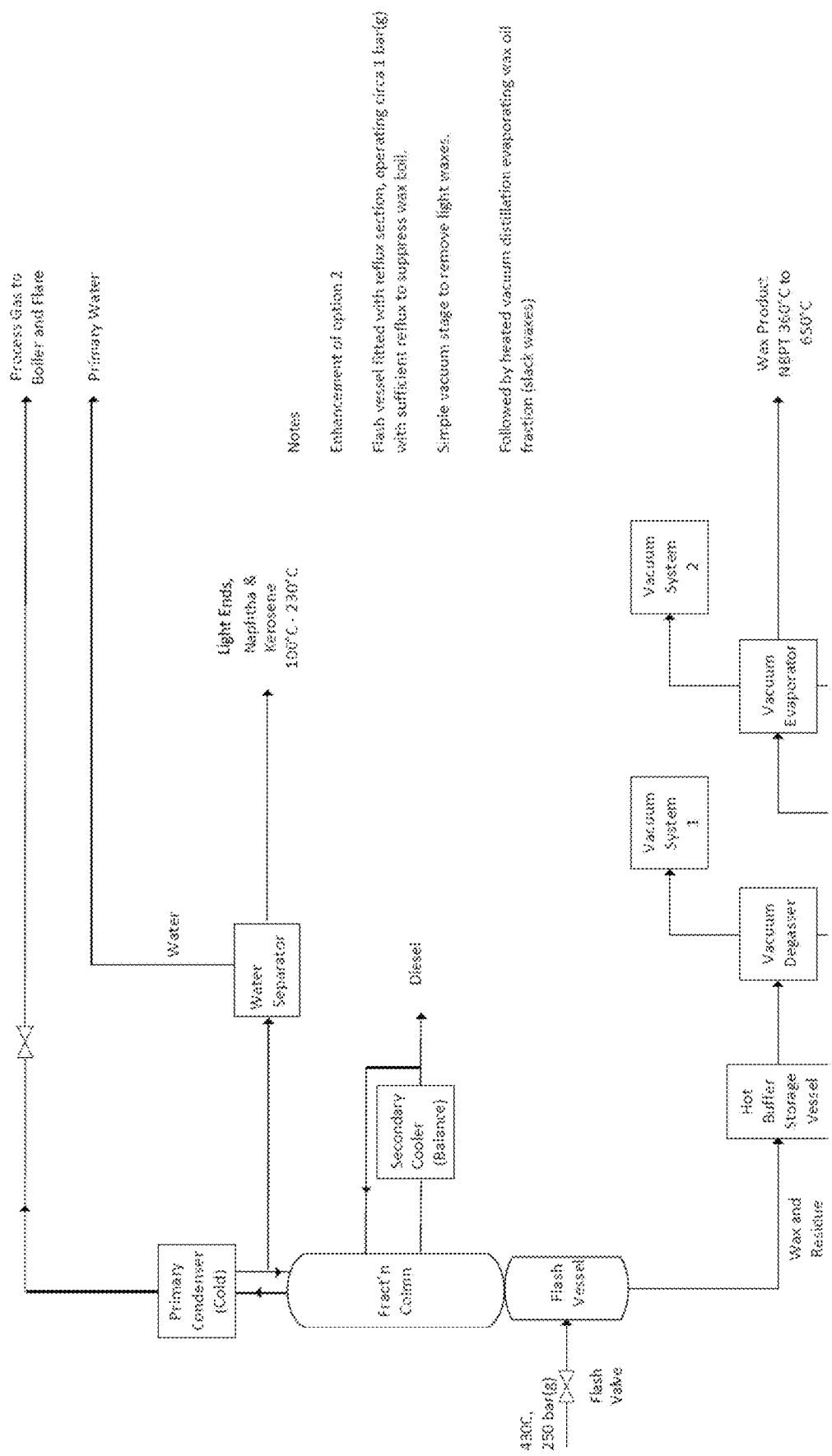
Figure 9:
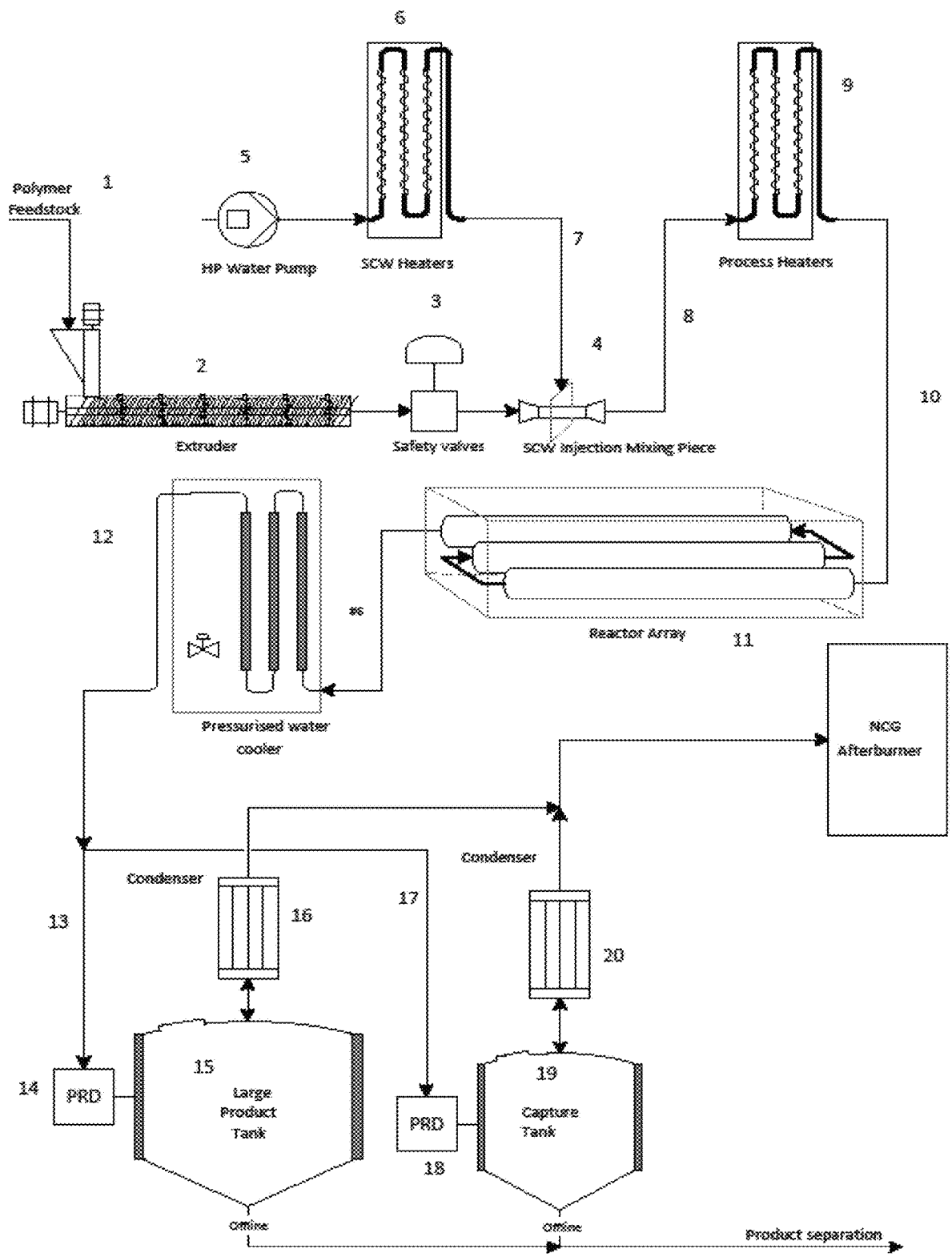
Figure 10:
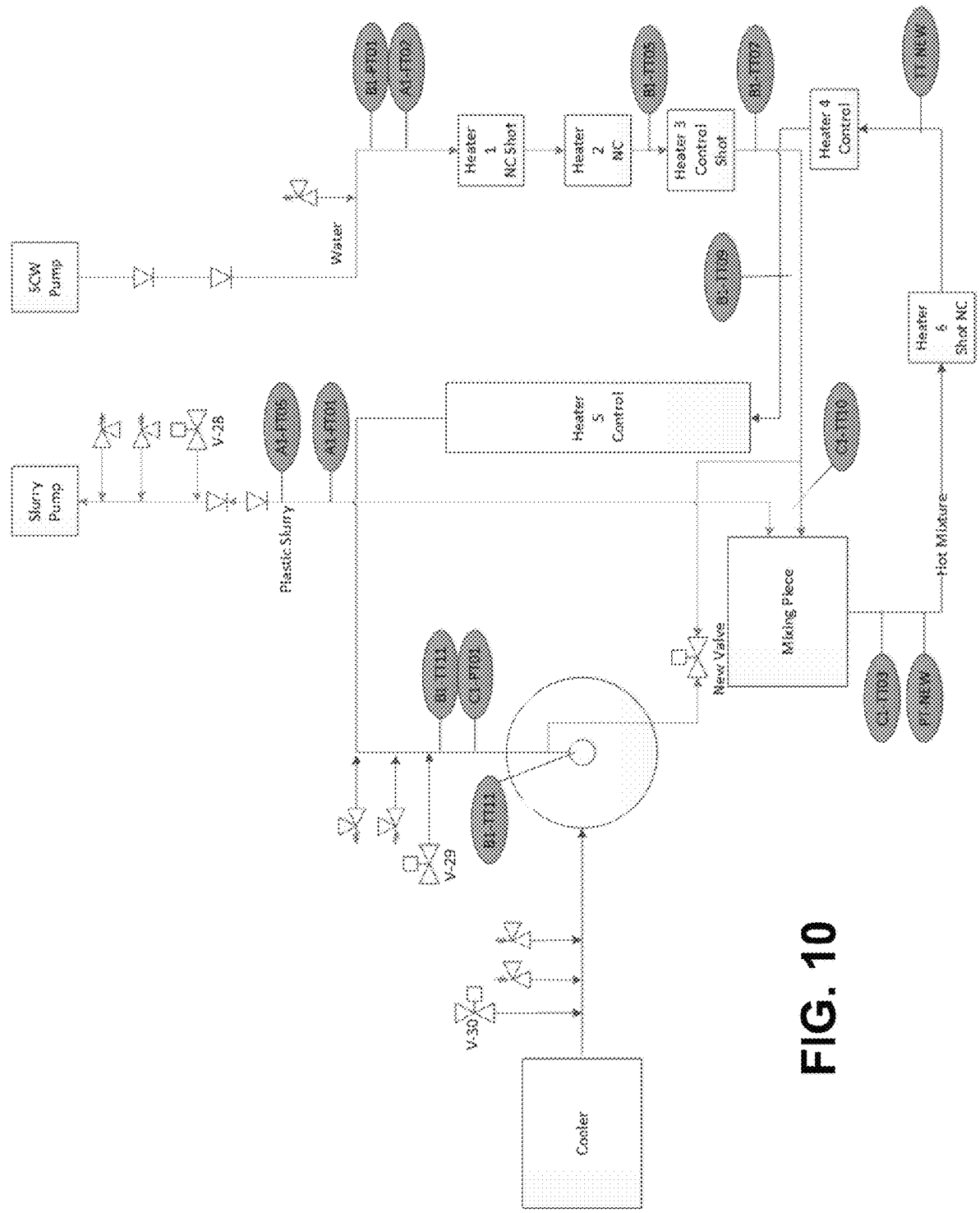
Figure 11:
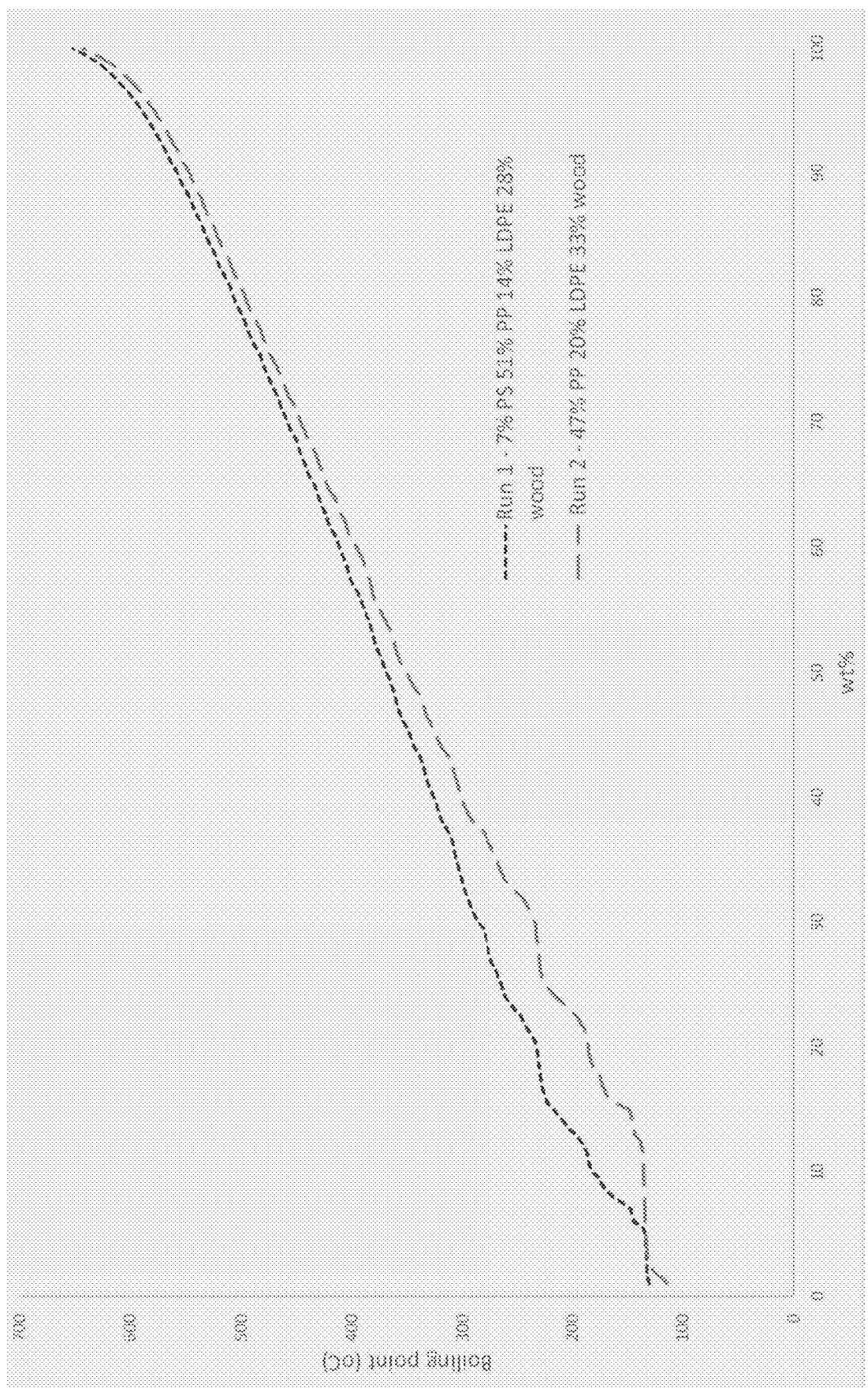
Figure 12:
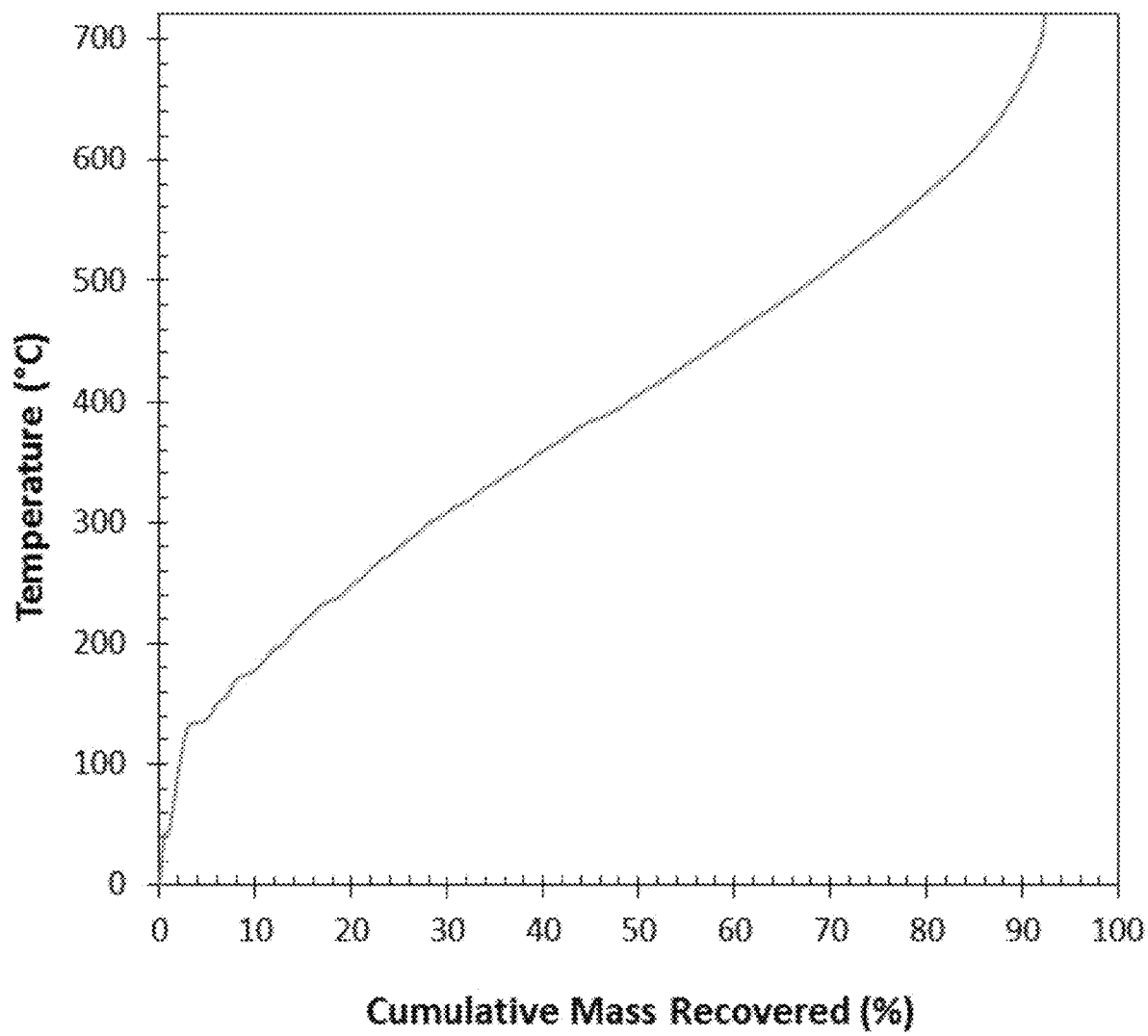
Figure 13:
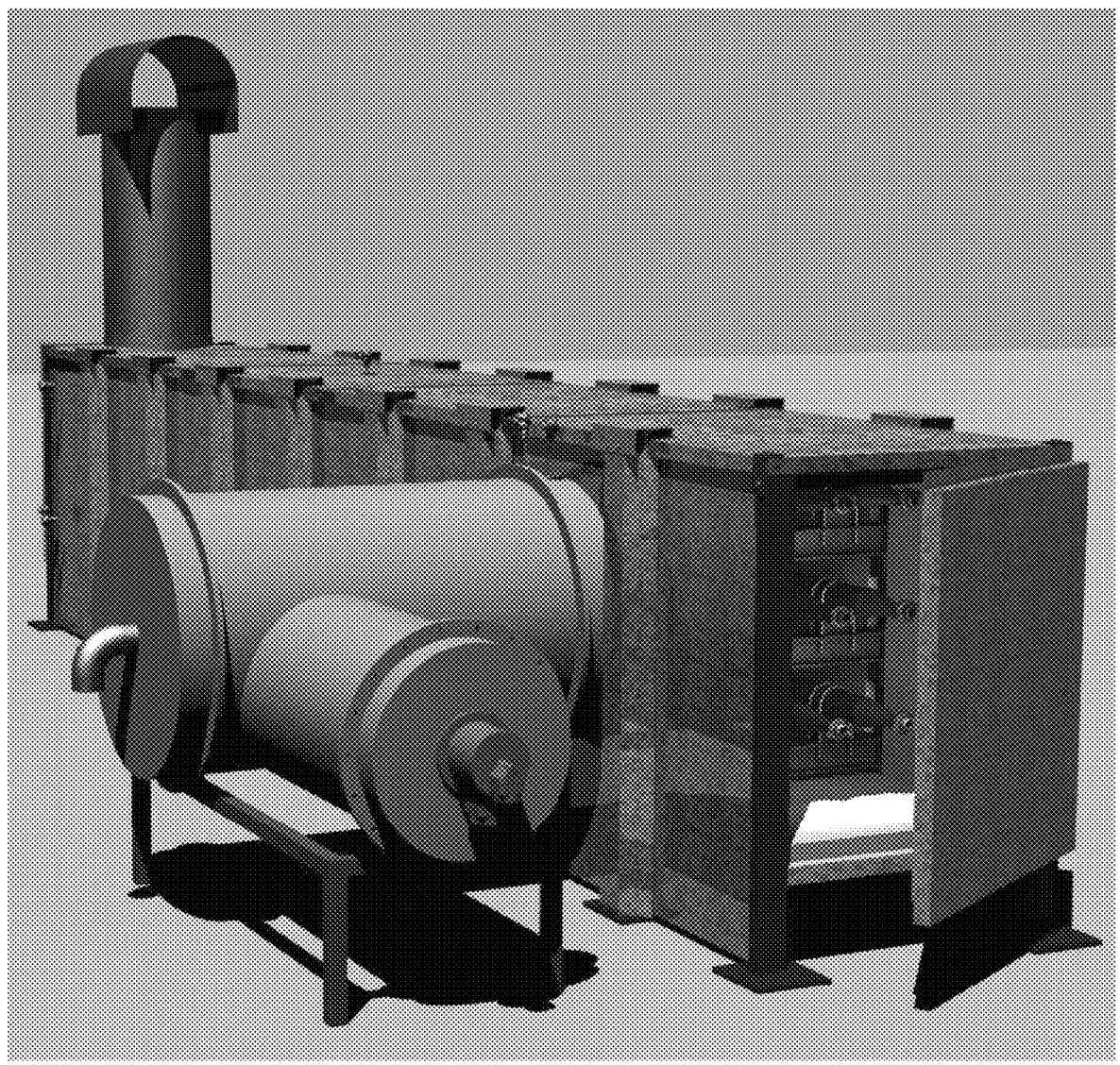
Figure 14:
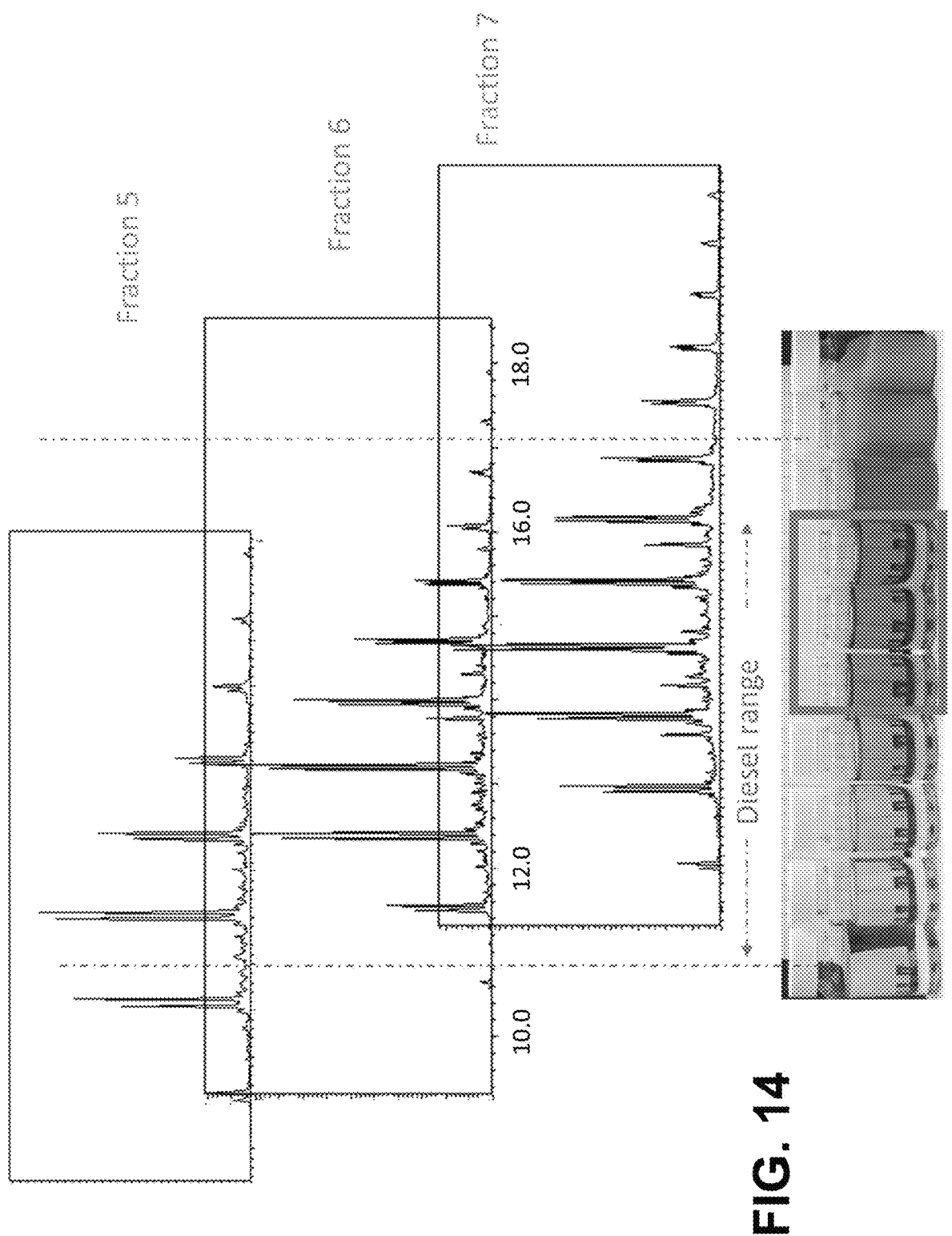
Figure 15:
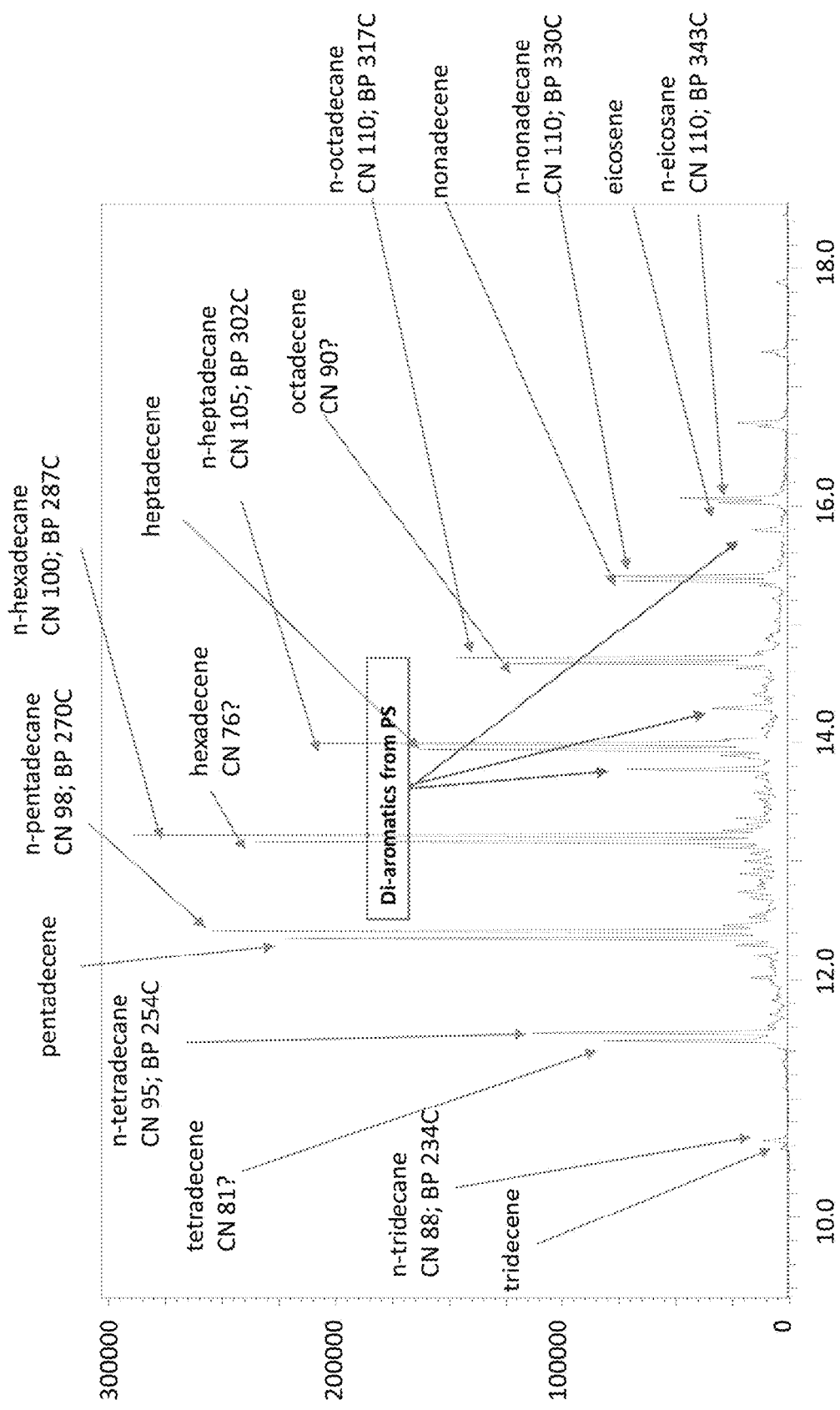
Figure 16:
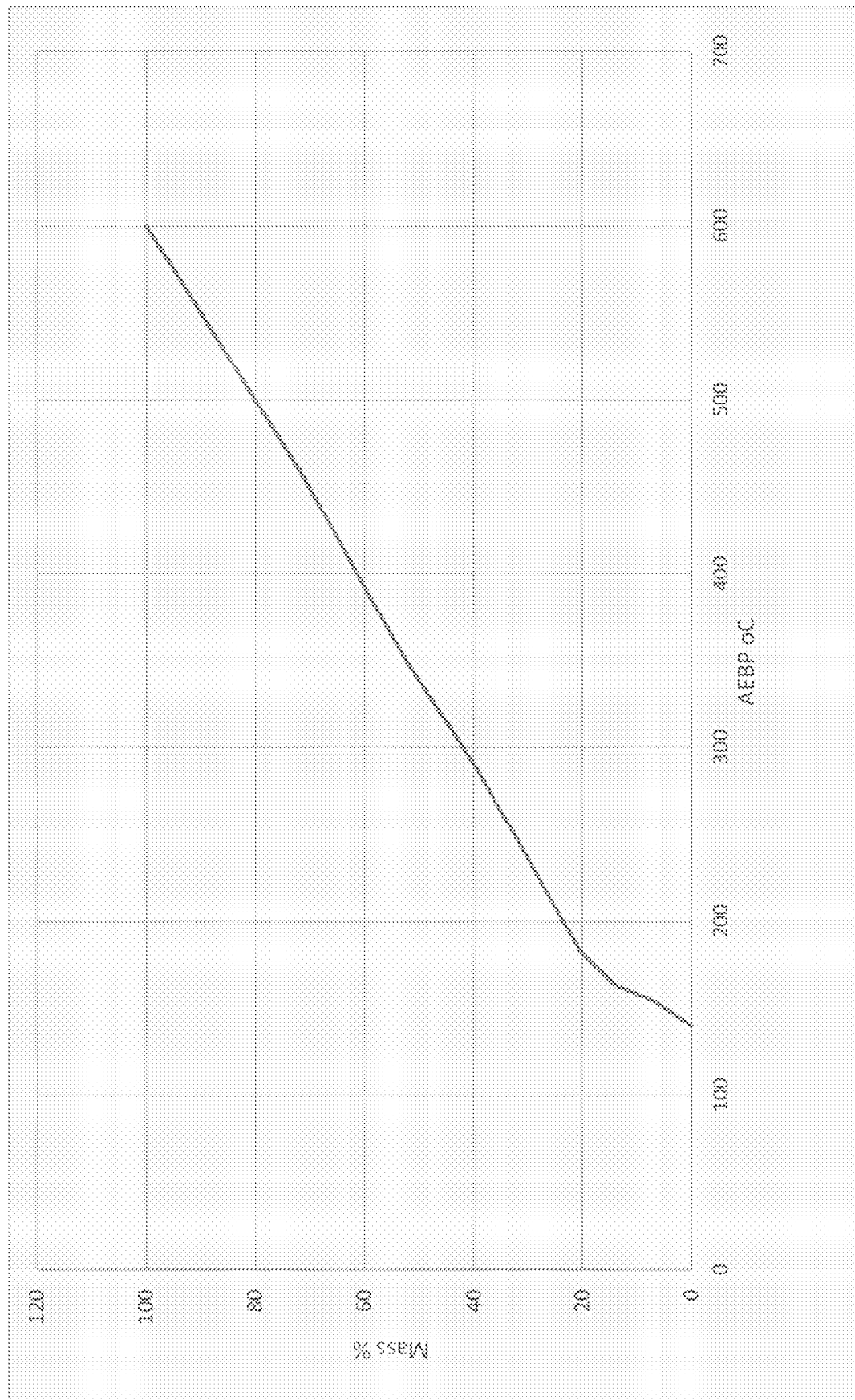
Figure 17:
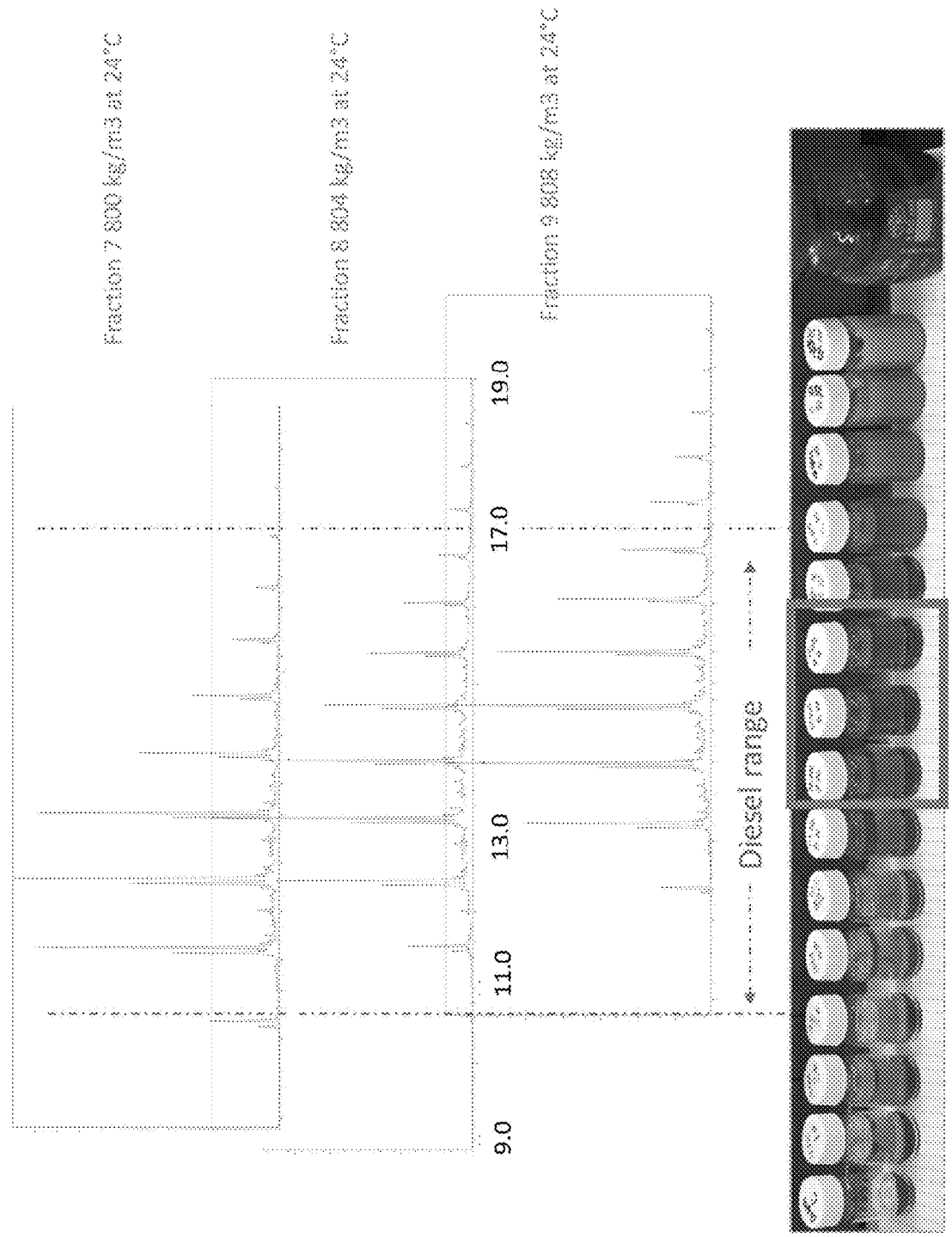
Figure 18:
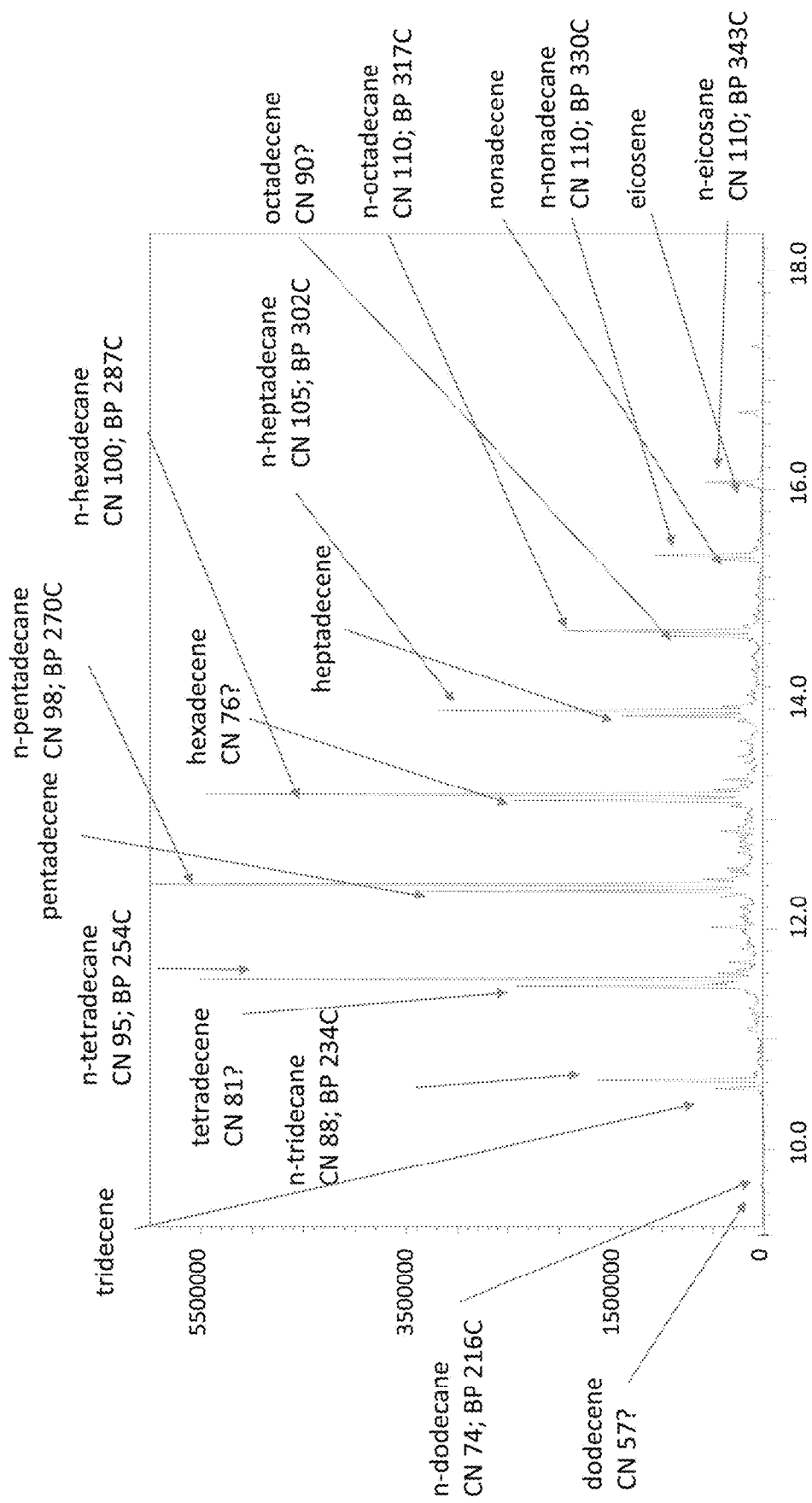
Figure 19:
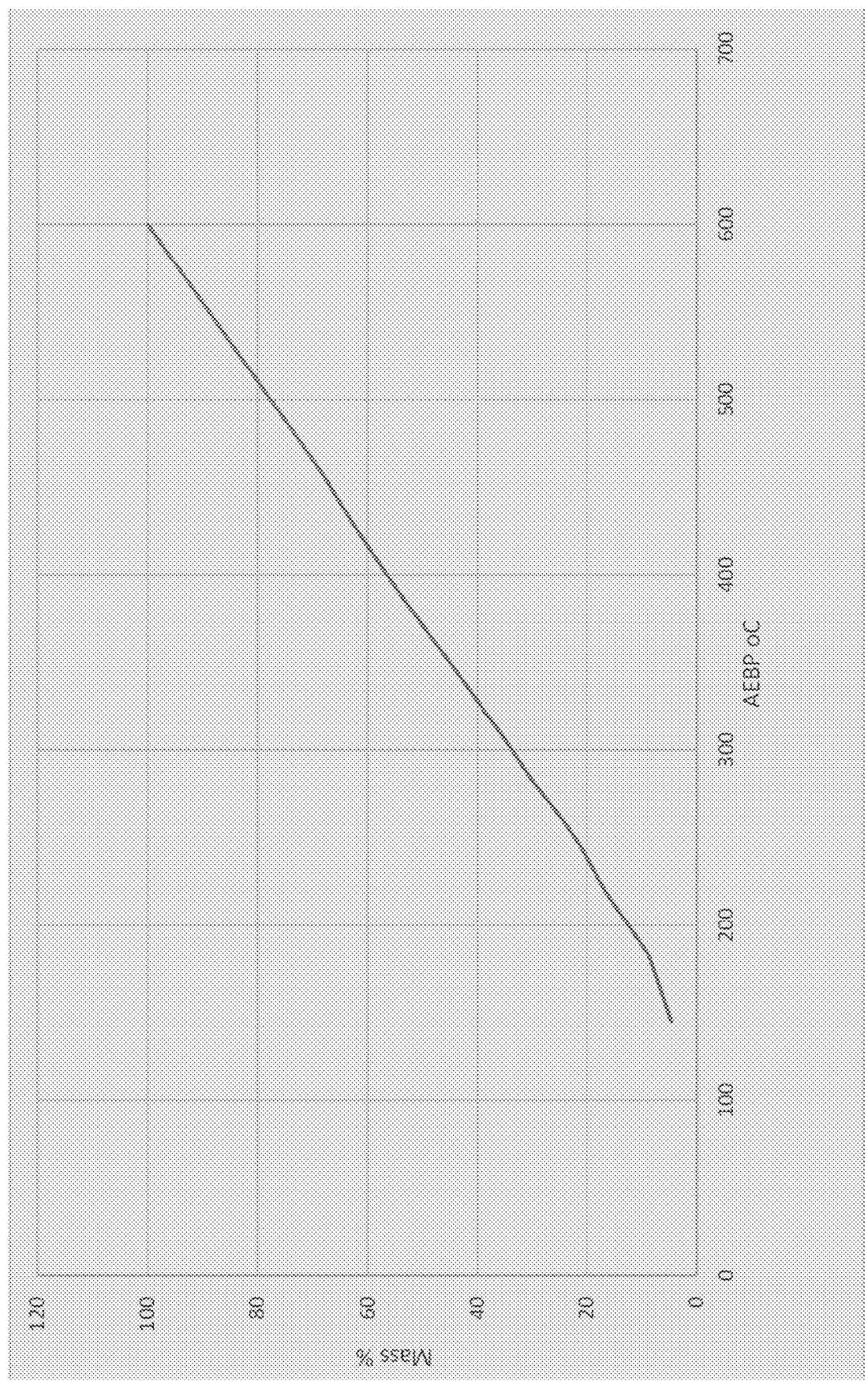
Figure 20:
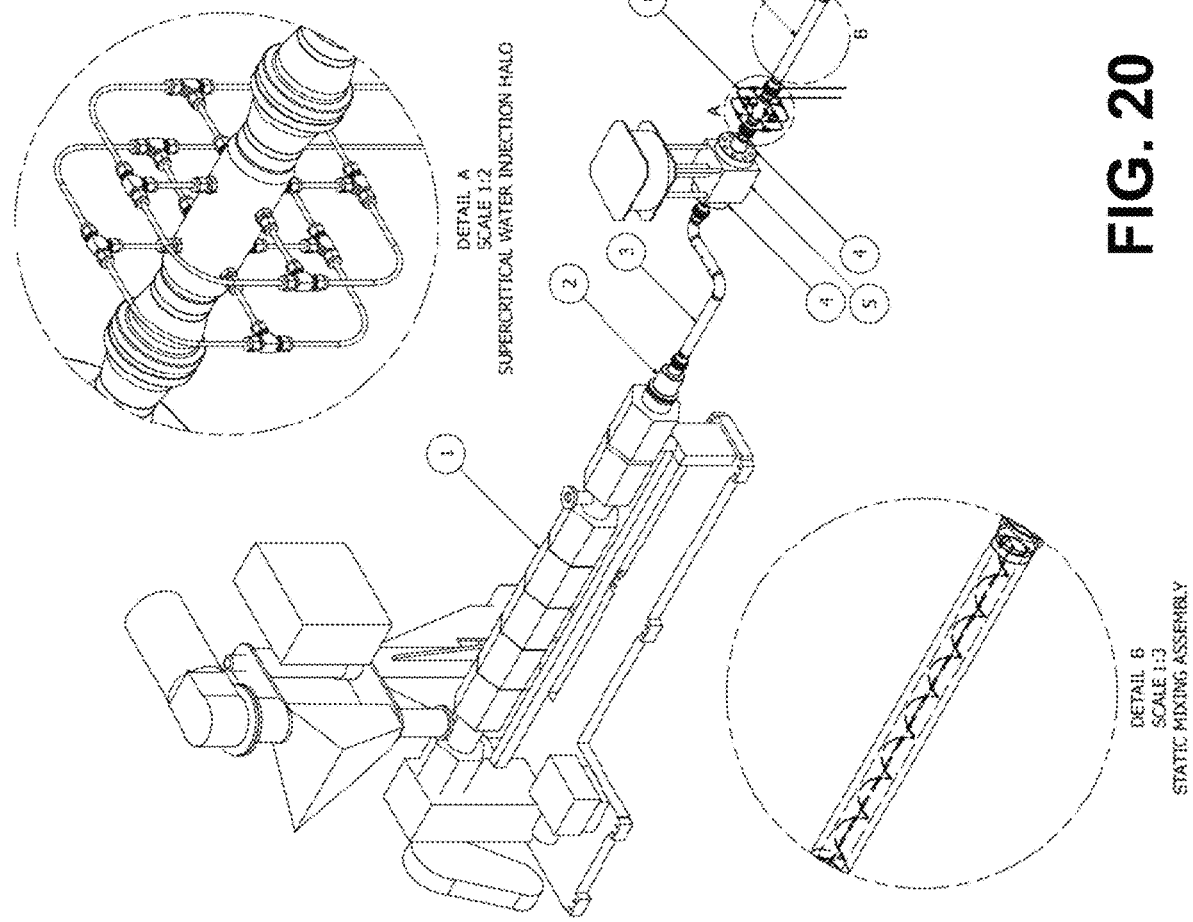
Figure 21:
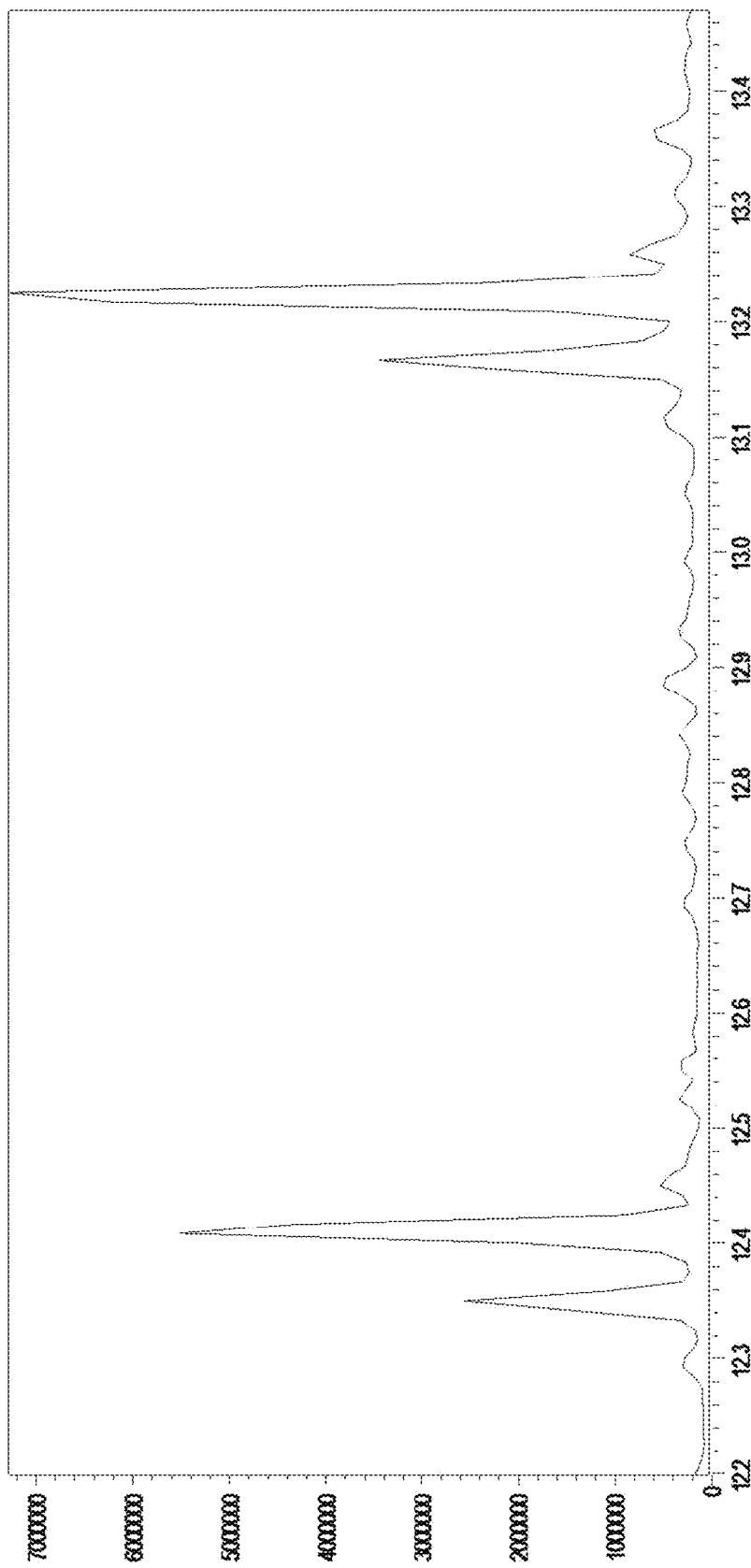

Figure Two provides a further exemplary schematic of a method and apparatus according to embodiments of the present invention.

Figure Three provides a non-limiting example of a reactor apparatus (part a) and a series of three such reactors (part b) according to embodiments of the present invention. each reactor including a blow down valve at the base leading to a drain pot.

Figure Four provides pictorial representations of an exemplary supercritical aqueous solvent injection manifold according to embodiments of the present invention. 1: supercritical water injection barrel, c/w welded nozzles to accept injection spigots, 2: butt weld coupling hub, 3: weld-on tube fitting, bored through, 4: supercritical water injection spigot, 5:tube fitting, elbow, 6: channeling breaker insert, 7: tube fitting, tee, 8: supercritical water delivery tubing.

Figure Five shows a representative process flow diagram of a flash distillation process according to an embodiment of the present invention.

Figure Six shows a representative process flow diagram of a flash distillation process with two condenser stages according to an embodiment of the present invention.

Figure Seven shows a representative process flow diagram of a flash distillation process with a fractionating column according to an embodiment of the present invention.

Figure Eight shows a representative process flow diagram of a flash distillation process with a fractionating column featuring vacuum distillation according to an embodiment of the present invention.

Figure Nine shows an exemplary schematic of a method and apparatus according to embodiments of the present invention.

Figure Ten shows a representative process flow diagram of the Cat-HTR hydrothermal reactor system according to an embodiment of the invention.

Figure Eleven shows simulated distillation (SIMDIS) boiling curves by gas chromatograph for the oil product from runs 1 and 2 of Example 1.1.

Figure Twelve shows a simulated distillation (SIMDIS) boiling curves by gas chromatograph for the oil product from Example 1.1.1.

Figure Thirteen shows an external view of a heated reactor array (HRA) viewed from the plenum chamber and burner end.

Figure Fourteen shows total ion chromatograms by Gas Chromatography Mass Spectrometry (GCMS) of three product oil fractions separated by fractional distillation in Example 1.2.1.

Figure Fifteen shows an analysis of the total ion chromatogram by GCMS of one fraction in the diesel boiling range separated by fractional distillation with estimated boiling points and cetane numbers (Example 1.2.1).

Figure Sixteen shows a boiling point curve by distillation according to ASTM D1160 for the product oil from Example 1.2.1.

Figure Seventeen shows total ion chromatograms by GCMS of three product oil fractions separated by fractional distillation in Example 1.2.2.

Figure Eighteen shows an analysis of the total ion chromatogram by GCMS of one fraction in the diesel boiling range separated by fractional distillation with estimated boiling points and cetane numbers (Example 1.2.2).

Figure Nineteen shows a boiling point curve by distillation according to ASTM D1160 for the product oil from Example 1.2.2.

Figure Twenty is a design illustrating a representative coupling arrangement between an extruder and a hydrothermal reactor according to an embodiment of the invention.

Figure Twenty-one is a chromatograph showing GCMS total ion count (y-axis) chromatogram of middle distillate boiling region of waxy oil product. Peaks with retention times of 13.17 minutes and 13.23 minutes (x-axis) are 1-hexadecene and hexadecane respectively, verified against mass spectra and retention times of external standards.

Definitions

As used in this application, the singular form "a", "an" and "the" include plural references unless the context clearly dictates otherwise. For example, the term "a catalyst" also includes a plurality of catalysts.

As used herein, the term "comprising" means "including." Variations of the word "comprising", such as "comprise" and "comprises," have correspondingly varied meanings. Thus, for example, an aqueous solvent "comprising" water may consist exclusively of water or may include one or more additional components (e.g. alcohol).

As used herein, the terms "polymeric material" and "polymeric materials" will be understood to encompass prepolymers, homopolymers (e.g. prepared from a single monomer species), copolymers (e.g. prepared from at least two monomer species), terpolymers, graft polymers, plastic, elastomeric material, rubber materials, and mixtures thereof. In some embodiments, the polymeric material/s are synthetically made.

As used herein, the term "continuous flow" refers to a process wherein a slurry comprising a feedstock (e.g. and any one or more of: an aqueous solvent, solid substrate, catalyst additive and/or oil additive, is subjected to:
(a) heating and pressurisation to a target temperature and pressure,
(b) treatment at target temperature(s) and pressure(s) for a defined time period (a "retention time"), and
(c) cooling and de-pressurisation;
during which the slurry is maintained in a stream of continuous movement along the length (or partial length) of a given surface of a reactor vessel. It will be understood that "continuous flow" conditions as contemplated herein are defined by a starting point of heating and pressurisation (i.e. (a) above) and by an end point of cooling and de-pressurisation (i.e. (c) above). Continuous flow conditions as contemplated herein imply no particular limitation regarding flow velocity of the slurry provided that it is maintained in a stream of continuous movement.

As used herein, the term "biofuel" refers to an energy-containing material derived from the processing of organic matter. Non-limiting examples of biofuels include oil products (i.e. bio-oils), char products (otherwise known as upgraded pulverised coal injection (PCI) equivalent products), gaseous products, biodiesel, and alcohols (e.g. ethanol and butanol).

As used herein, the term "bio-oil" will be understood to encompass oil products derived from processing fossilised organic material (e.g. coals such as lignite), non-fossilised organic material (e.g. lignocellulosic matter, polymeric material including plastic), or mixtures thereof.

As used herein, "end of life plastic" or "waste plastic" will be understood to mean plastic material containing at least some proportion of non-plastic contaminant(s) such as, for example, at least: 0.1%, 0.5%, 1%, 5%, 10%, 15%, 20%, 25%, 30%, 35%, 40%, non-plastic material. Non-limiting examples of such contaminants include dirt, paper and wood.

As used herein, a "supercritical" substance (e.g. a supercritical solvent) refers to a substance existing at a temperature and a pressure that is above the critical point of the substance.

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, a "solid substrate" is a component that is solid or substantially solid at a reaction temperature and pressure used in accordance with the methods of the present invention. The solid substrate may be capable of sequestering contaminants and/or other organic and/or inorganic matter that de-solubilises from the reaction mixture. Additionally or alternatively, the solid substrate may be capable of altering the flow characteristics of the reaction mixture or the product mixture in a reactor vessel. Solid substrates encompass both carbonaceous and non-carbonaceous materials, non-limiting examples of which include coals, anthracitic coal, meta-anthracite, anthracite semianthracite, bituminous coal, subbituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

As used herein, the term "aqueous solvent" refers to a solvent comprising at least one percent water based on total weight of solvent. An "aqueous solvent" may therefore comprise between one percent water and one hundred percent water based on total weight of solvent. An "aqueous solvent" will also be understood to include within its scope "aqueous alcohol", "aqueous ethanol", and "aqueous methanol".

As used herein, the term "intrinsic catalyst" will be understood to be a catalyst that is innately present in one or more other component/s of a reaction mixture processed according to the methods of the present invention, the vessel walls of a reactor apparatus in which the methods are performed, and/or, a catalyst that forms in situ during the performance of the methods.

As used herein, a "supplementary catalyst" is a catalyst included in a feedstock stream, solvent steam and/or reaction mixture that is supplementary to catalytic compounds intrinsically present other reaction mixture components (i.e. supplementary to 'intrinsic catalysts'), being separately added to the reaction mixture as a discrete/stand-alone component.

As used herein, the terms "reactor", "reactor apparatus", and are used interchangeably and have the same meaning. Each term encompasses any apparatus suitable for performing the methods of the present invention including, for example, continuous flow reactors and batch reactors.

As used herein a "substantially solid" substrate refers to a substrate that is predominantly solid at a specified reaction temperature and/or pressure in that at least 50%, at least 60%, at least 70%, at least 80%, at least 90%, preferably at least 95%, and more preferably at least 98% of the substrate is in a solid form.

As used herein, a "substantially insoluble" substance is one that is predominantly insoluble at a specified reaction temperature and/or pressure in that at least 90%, preferably at least 95%, and more preferably at least 98% of the substrate is not solubilised.

As used herein, an "inert" or "chemically inert" solid substrate is one that does not chemically react with other components in a reaction mixture or catalyse reactions between components in a reaction mixture, at a specified reaction temperature and pressure or at a range of reaction temperatures and pressures.

As used herein, a "or "substantially chemically inert" solid substrate one that does not to any significant degree chemically react with other components in a reaction mixture or catalyse reactions between components in a reaction mixture, at a specified reaction temperature and pressure or at a range of reaction temperatures and pressures. A "substantially inert" or "substantially chemically inert" solid substrate will be understood to react with any other component in a given reaction mixture, or catalyse a reaction between any given components in a reaction mixture, on less than 5%, less than 4%, less than 3%, less than 2%, or less than 1%, of interaction events with the component(s).

It will be understood that use of the term "about" herein in reference to a recited numerical value (e.g. a temperature or pressure) includes the recited numerical value and numerical values within plus or minus ten percent of the recited value.

Any description of prior art documents herein, or statements herein derived from or based on those documents, is not an admission that the documents or derived statements are part of the common general knowledge of the relevant art in Australia or elsewhere.

For the purposes of description all documents referred to herein are incorporated by reference unless otherwise stated.

DETAILED DESCRIPTION

Plastic polymers can be depolymerized in supercritical water (SCW) producing calorific gas, oil and waxy residues. Such experiments have been conducted in batch autoclaves on a small scale, or in continuous flow reactors where the concentration of polymer was low compared to the concentration of water.

However, existing processes are subject to a number of problems which need to be addressed for the hydrothermal processing of polymers to be commercially feasible.

Firstly, it has proven significantly difficult to prepare and process aqueous feedstock slurries with sufficient content of polymeric material. If the concentration of polymer is not high the process may not be economic because, for example, too much energy can be consumed to heat the water in the slurry to the reaction temperature. Reaction temperatures and pressures during hydrothermal processing of polymeric materials can typically lie above the supercritical point of water (374° C. and 218 atmospheres/221 bar). Polymers have a substantially lower heat capacity than water. Additionally, the lower the concentration of polymer that is fed into a reactor, the larger it must be to produce a given quantity of biofuel product, and the larger the capital expenditure and operating expenditure associated with constructing and running the reactor will be. Furthermore, if there is more water present in the reactor more carbon from the feedstock can be transferred to the aqueous phase from where it may be difficult to recover, and the costs associated with treating and disposing of the effluent water may be increased.

Means for preparing a higher concentration of polymeric material in aqueous slurries (e.g. water, for example 30% polymer and 70% water or 50% polymer and 50% water by weight) and their introduction into suitable devices such as continuous flow reactor are therefore desirable.

Secondly, the heating of a mixture of polymer and water to the desired reaction temperature can instigate blockages, scaling, and/or char formation in a reactor, and any means capable of alleviating or avoiding these occurrences are thus also desirable.

Thirdly, in comparison to continuous flow reactors batch reactors of the same capacity may use a lot more steel to contain the pressures generated in hydrothermal systems, and/or may be difficult to supply heat energy to, and/or and may require elaborate stirring mechanisms. Accordingly, methods and reactors capable of efficiently converting polymeric materials into biofuel at high temperature and pressure under conditions of continuous flow are desirable.

High pressure slurry pumps are one possible means of delivering an aqueous slurry comprising polymeric material into a continuous hydrothermal reaction zone. However, in order to pump high concentration slurries the pumps must be fed with a pre-prepared slurry of suitable concentration and viscosity. The preparation and storage of such a slurry is problematic for many polymeric materials, especially waste plastics. The waste plastics must first be prepared to provide a particulate form that can be suspended in water. Most polymers of commercial interest for processing into biofuels and chemicals are less dense than water and hydrophobic. Consequently, aqueous slurries prepared from them tend to be unstable and the polymers tend to separate and float on the water. The consequence of this is that the slurry so formed for transfer from a feed tank into a high pressure slurry pump has a low/suboptimal concentration of polymeric material.

Preparing a suitable particle size distribution for slurrying polymers is also difficult, especially from many types of plastic waste of commercial interest. For example plastic bags are often made from low density polyethylene (LDPE) and the form in which they are obtainable from sorting facilities may contain sheets of thin LDPE of e.g. 30 cm×30 cm in size or greater. LDPE is a soft and malleable material with low softening and melting point and is not amenable to mechanical comminution to the small particle sizes (e.g. less than 1 mm) suitable for forming aqueous slurries to be subjected to high pressure pumping.

The present invention provides a solution to one or more problems in the art by providing a means of producing aqueous slurries comprising an increased concentration of polymeric material (e.g. plastics). The slurries produced may be heated and/or pressurised during their preparation and/or may be suitable for introduction into continuous flow reactors to facilitate conversion of the polymeric material into biofuel (e.g. bio-oil).

Methods and devices according to the present invention involve an extruder to prepare and deliver a slurry feedstock comprising polymeric material (e.g. plastics) at high pressure and temperature. The slurry feedstock may be fed into a reactor (e.g. a hydrothermal reactor, a continuous flow hydrothermal reactor) where the polymeric material can be converted into biofuel product/s, typically of lower average molecular weight than the polymeric material prior to conversion.

Figure one provides a non-limiting overview of an apparatus and method according to embodiments of the present invention.

Polymeric material, non-limiting examples of which include plastic, prepolymers, homopolymers (e.g. prepared from a single monomer species), copolymers (e.g. prepared from at least two monomer species), terpolymers, graft polymers, plastic, elastomeric material, rubber materials, synthetic polymeric material, and mixtures thereof, may be prepared such that they are in a form suitable for extrusion by any means known in the art (e.g. pelletisation, granulisation, flaking, powdering) and fed into a suitable extruder (e.g. into the barrel of an extruder via a hopper). The polymeric material may optionally be mixed with an aqueous solvent, and/or with a non-aqueous solvent, and/or with oil, before, during, and/or after entry of the polymeric material into the extruder. Upon entry into the barrel of the extruder, the polymeric material may be melted by mechanical energy generated by turning screws of the extruder and/or by heaters and/or by other suitable means in association with the barrel. Increased levels of pressure can be maintained in the barrel during the extrusion process. The polymeric material can be extruded at temperatures, for example, of above 200° C. and/or at pressures, for example, of above 180 bar/177.65 atm).

The extruded stream of polymeric material may be contacted with a separate stream of heated/pressurised aqueous solvent (e.g. an aqueous solvent comprising supercritical water and/or superheated steam) to form an aqueous slurry comprising the polymeric material (the reaction mixture). By way of non-limiting example, the reaction mixture may comprise between 40 wt % and 80 wt % of the extruded polymeric material ("extrudate") and between 20 wt % and 60 wt % of the aqueous solvent. In some embodiments, the reaction mixture may comprise between 50 wt % and 75 wt % of extruded polymeric material ("extrudate") and between 25 wt % and 50 wt % of the aqueous solvent.

Optionally, contact of the separate stream of heated/pressurised aqueous solvent (4) and the extruded polymeric material may cause a phase change in the aqueous component of the solvent from supercritical to subcritical.

Optionally, the extruded polymeric material may be contacted with other solvent/s (e.g. a naphtha fraction recycled from a previously-generated biofuel product of the method) prior to, during or after contacting the extruded polymeric material with the heated/pressurised aqueous solvent.

Optionally, the reaction mixture may be further heated and/or pressurised to desired reaction conditions prior to and/or following entry into the reactor.

Optionally, one or more catalysts from an external source (i.e. excluding catalysts that are components of the polymeric material, solvent/s, and/or reactor vessel walls) may be mixed with the polymeric material. The catalysts may be mixed with the polymeric material prior to contact with the separate stream of heated/pressurised aqueous solvent, after contact with the separate stream of heated/pressurised aqueous solvent, after contact with the separate stream of heated/pressurised aqueous solvent and before the optional further heating and/or pressurisation to desired reaction conditions, after contact with the separate stream of heated/pressurised aqueous solvent and after the further heating and/or pressurisation to desired reaction conditions, after the aqueous slurry has reached reaction temperature and pressure. Without limitation and by way of example only, the catalysts may be base catalysts (e.g. sodium hydroxide to increase reaction mixture pH and/or encourage precipitation of chlorine as sodium chloride, potentially in a solid form). The catalysts may be contacted with the reaction mixture in a homogeneous form (e.g. as an aqueous solution of sodium hydroxide injected at pressure by means of a dosing pump, and/or in a heterogeneous form; as a powdered or pelletized solid mixed with the polymeric material, or as a fixed bed of solid catalyst).

The reactor may, for example, be a batch reactor or a continuous flow reactor. Following entry into the reactor, the reaction mixture may be held at a desired reaction temperature and/or pressure (or within a fixed range of desired reaction temperatures and/or pressures) for a residence time sufficient to allow cracking of the polymeric material into biofuel products comprising compounds of reduced molecular weight compared to the polymeric material prior to treatment (e.g. less than 0.01%, 0.05%, 0.1%, 0.5%, 1%, 5% 10%, 20%, 30%, 40%, 50%, 60%, 70%, 80% or 90% of the molecular weight of the polymeric material prior to treatment).

The product stream leaving the reactor may be cooled prior to and/or during/following depressurisation, and heat energy can optionally be recovered (e.g. for re-use in the method). The reaction mixture can be depressurised by conventional means, for example, to within 1 bar of atmospheric pressure, or 20 bar pressure.

Gaseous, aqueous and oil and/or wax products in the product stream may be separated.

Optionally, fraction/s of oil and/or wax products of the product stream may be separated (e.g. by fractional distillation).

Optionally, lower molecular weight oil fraction/s (e.g. the naphtha fraction) of the product stream can be recycled into the method, for example, as a solvent to lower the polymeric material stream viscosity.

Optionally higher molecular weight oil fractions (e.g. waxes with boiling points above 450° C. AEBP) of the product stream may be recycled into the method, for example, so that they may be further cracked to lower molecular weight compounds.

Optionally gas and/or low molecular weight oil fractions of the product stream (e.g. naphtha) may be combusted to provide heat for processing further polymeric material via the method.

Figure two provides a non-limiting overview of an extruder apparatus and method according to embodiments of the present invention.

The exemplary extruder comprises a barrel comprising a port located in an intermediate portion of the barrel. The skilled person will readily recognise that the barrel can be constructed with multiple ports. In order to enhance gas and/or vapour flow out of the barrel (e.g. to safely manage their removal), the port may be maintained under reduced pressure, for example, by use of a vacuum pump. Non-limiting examples of gases and/or vapours that may be vented from the port in this manner include hydrogen chloride, hydrogen bromide, hydrogen fluoride, chlorine, ammonia, carbon monoxide and carbon dioxide. In some embodiments, hydrogen chloride and/or hydrochloric acid vapour resulting from the thermal decomposition of chlorine-containing polymeric material may be removed via port.

The temperature of the feed material in the extruder barrel preceding the port may be sufficient to cause decomposition of the feed material to produce the desired gas or vapour species (e.g. hydrogen chloride). By way of non-limiting example, the temperature of the feed material in the extruder barrel preceding the port may be more than 200° C., more than 250° C., more than 300° C., more than 325° C., more than 350° C., more than 375° C., or more than 400° C.

Figure three provides a non-limiting example of a reactor apparatus (part a) and a series of three such reactors (part b) according to embodiments of the present invention. Each reactor includes a blow down valve for the removal of undesirable solids. Non-limiting examples of solid material which can accumulate and be removed include: metal staples, plastic filler material, pieces of grit/sand/other inorganic feed contamination, and precipitated metal halides and other inorganic salts having low solubility in a supercritical solution within the reactors.

The solids removal system may be installed on more than one reactor vessel if so desired (Figure three). A common drain pot and skip container may be used for more than one reactor, in which case solids removal from multiple reactor vessels can be designed to occur in a sequential fashion to minimise the instantaneous flow rate into the drain pot vessel and downstream loading on gas treatment systems. The drain pot may be purged with inerting gas.

The removal of the solid material may be initiated, for example, by opening automated control valves at the reactor base to a small extent, for a limited time interval, allowing the passing of smaller/finer solid particulates without excessive release of the reactor vessel contents. This approach may avoid a significant decrease of reactor pressure that might render the process difficult to control (e.g. a drop of pressure in the reactor from above the supercritical pressure of water to below the supercritical pressure of water). Exhausted material can be transferred to the drain pot, which may then be isolated from reactor/s and emptied into the skip. Solids accumulating at the bottom of the reactor vessel can be periodically removed from the process during operation, thus avoiding the requirement for a maintenance shutdown.

In some embodiments of the present invention, base may be included in the polymeric material melt stream/extrudate, aqueous solvent stream and/or reaction mixture. There is no particular restriction on the type or form of base that may be used or the point/s in the process that it may be introduced. By way of non-limiting example, the base may be introduced, for example, as a solid co-feed to the extruder with the polymeric material and/or as a liquid form at any point after the extrusion stage (e.g. to the extrudate/melt stream, to the aqueous solvent stream, and/or directly to the reaction mixture). In a continuous or semi-continuous version of the process of the invention, at least some base may be added prior to the final reactor leg.

Non limiting examples of bases suitable for this purpose are carbonates, hydroxides, hydrogen carbonates, oxides of Group I and Group II metals and materials containing significant quantities thereof e.g. black liquor, white liquor, green liquor, red mud, limestone, calcite.

The addition of the base may increase the pH of the reaction mixture, and/or sequester halogens (e.g. F, Cl, Br, I) present in the feed material in the form of metal chlorides. This may in turn provide a means of generating metal halides in the reaction mixture when the water present is above the supercritical temperature and pressure of water. The solubility of metal halides in water under these conditions is generally very low, and at concentrations above their solubility limit, they may precipitate as insoluble solids. These solids may be collected, for example, in blowdown boxes at the bottom of vertical reactor tubes (see, for example, the blow down boxes shown in Figure three), and periodically discharged in continuous operation by blow-down operations. By this means, halides that might normally be corrosive to metals from which the reactor apparatus is made when in solution may be removed from the process.

Figure four is illustrative of embodiments of the invention in which a manifold arrangement comprising multiple clusters of multiple injection points are used to contact supercritical aqueous solvent (e.g. water or mixtures of water and other solvent/s) with polymeric material extrudate. These and similar embodiments of the present invention may facilitate more thorough mixing of the supercritical aqueous solvent and the polymeric material extrudate at larger material flow rates.

Reaction Mixture Components
(i) Polymeric Material

A reaction mixture for use in accordance with the methods of the present invention comprises polymeric material.

For example, prepolymers, oligomers, homopolymers, copolymers, terpolymers, graft polymers, plastic, end of life plastic, waste plastic, elastomeric material, rubber materials, and mixtures may be included in the slurry feedstock and subjected to cracking in the reactor.

The polymeric materials may be characterised in part by their glass transition temperatures $T_g$ and/or their melting temperatures $T_m$ in the case of semi-crystalline or crystalline polymers. Above Tg polymers generally exhibit rubbery characteristics. Non-limiting examples of glass transition temperatures and melting temperatures are given below in Table 1.

TABLE 1

$T_g$ and $T_m$ temperatures of exemplary polymers

| Polymer | $T_m$ ° C. | $T_g$ ° C. |
|---|---|---|
| Polyethylene (PE) | 135 | −68 |
| Polypropylene (PP) | 176 | −8 |
| Polystyrene (PS) | 240 | 100 |
| Poly(methyl methacrylate) PMMA | 200 | 105 |
| Poly(vinyl chloride) PVC | 180 | 82 |
| Poly(vinylidene fluoride) (PVDF) | 210 | −39 |
| Polyisoprene | 28 | −70 |
| Nylon-6,6 | 265 | 50 |

Source: Williams (1971) cited in, "Introduction to Polymer Science and Chemistry: A Problem-Solving Approach" Second Edition, Manas Chanda, CRC Press, 11 Jan. 2013.

Non limiting examples of polymeric materials that can be treated according to the methods of the present invention include Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly (vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly(phenylene Oxide) (PPO), Polyphenylene Sulfide (PPS), Polyphthalamide, (PTA), Polysulfone (PSU), Polyurethane, (PU), Poly(vinylidene chloride) (PVDC), Poly (tetrafluoroethylene) PTFE, Poly(fluoroxy alkane) PFA, Poly(siloxanes), silicones, thermosplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers, synthetic polymeric materials, naturally-occurring polymeric materials, plastics, and mixtures thereof.

Without limitation, the polymeric material may comprise a low content of elements other than carbon, hydrogen and oxygen. For example, the polymeric material may contain less than about 5 wt % nitrogen, less than about 1 wt % nitrogen, less than about 0.5 wt % nitrogen, less than about 0.1 wt % nitrogen, or less than about 0.01 wt % nitrogen, as a percentage of total polymeric material weight.

Additionally or alternatively, the polymeric material may comprise less than about 5 wt % total halogens, less than about 1 wt % total halogens, less than about 0.5 wt % total halogens, less than about 0.1 wt % total halogens, less than about 0.05 wt % total halogens, or less than about 0.01% total halogens, as a percentage of total polymeric material weight.

Additionally or alternatively, the polymeric material may comprise a molar ratio of hydrogen to carbon (H/C) that is as high. For example, the H/C molar ratio may be greater than 2.15, greater than 2.0, greater than 1.8, greater than 1.6, greater than 14, greater than 1.2, greater than 1.0, or greater than 0.8.

In some embodiments, the polymeric material may be in the form of mixed or sorted waste plastics and in some cases may be contaminated with organic and inorganic impurities. The waste plastic material may require some pre-processing before being processed according to the methods of the present invention. For example, the waste plastic may require sieving or screening to remove abrasive particles.

Without limiting the mode of action polymers treated according to the methods of the present invention may be cracked to liquids having lower boiling and melting points or they may directly or indirectly act as sources of hydrogen which is then incorporated into the product liquids.

By way of non-limiting example a reaction mixture treated in accordance with the methods of the present invention may comprise at least: 1 wt %, 2 wt %, 3 wt %, 4 wt %, 5 wt %, 10 wt %, 15 wt %, 20 wt %, 25 wt %, 30 wt %, 35 wt %, 40 wt %, 45 wt %, 50 wt %, 60 wt %, 70 wt %, 80 wt %, 90 wt %, 95 wt %, or 98 wt %, polymeric material (as a percentage of the total weight of the slurry or reaction mixture).

By way of non-limiting example a reaction mixture treated in accordance with the methods of the present invention may comprise less than: 98 wt %, 95 wt %, 90 wt %, 80 wt %, 70 wt %, 60 wt %, 50 wt %, 45 wt %, 40 wt %, 35 wt %, 30 wt %, 25 wt %, 20 wt %, 15 wt %, 10 wt %, 5 wt %, 4 wt %, 3 wt %, 2 wt %, or 1 wt %, polymeric material (as a proportion of the total weight of the slurry or reaction mixture).

In some embodiments the feedstock to the extruder and/or the reaction mixture comprises at least 60%, at least 70%, at least 80%, or at least 90% polyethylene by weight on a dry basis (db).

In some embodiments the feedstock to the extruder and/or the reaction mixture comprises at least 60%, at least 70%, at least 80%, or at least 90% polypropylene by weight on a dry basis (db).

In some embodiments the feedstock to the extruder and/or the reaction mixture comprises at least 60%, at least 70%, at least 80%, or at least 90% polystyrene by weight on a dry basis (db).

By way of non-limiting example, polymeric materials suitable for the method of the invention may have a melt mass-flow rate (MFR) of between 0.05 grams to 20 grams per 10 minutes, or 0.1 gram to 10 grams per 10 minutes, or 0.01 grams to 5 grams per 10 minutes as measured according to ISO 1133-1-2011 Plastics—Determination of the Melt Mass-Flow Rate (MFR).

(ii) Aqueous Solvent Component

A reaction mixture for use in accordance with the methods of the present invention may comprise an aqueous solvent.

In some embodiments the aqueous solvent comprises more than 5 wt %, more than 10 wt %, more than 20 wt %, more than 30 wt %, more than 40 wt %, more than 50 wt %, more than 60 wt %, more than 70 wt %, more than 80 wt %, more than 90 wt %, or more than 95 wt %, water (as a proportion of the total weight of the slurry or reaction mixture). In some embodiments the aqueous solvent comprises less than 10 wt %, less than 20 wt %, less than 30 wt %, less than 40 wt %, less than 50 wt %, less than 60 wt %, less than 70 wt %, less than 80 wt %, less than 90 wt %, or less than 95 wt %, water (as a percentage of the total weight of the slurry or reaction mixture).

In some embodiments, the water may be recycled from the product of feedstock comprising polymeric material previously treated by the method. For example, a portion of the water present following treatment of a given reaction mixture may be taken off as a side stream and recycled into the method (e.g. as some or all of a separate stream of supercritical solvent contacted with the extruded polymeric material).

The solvent may comprise or consist of one or more aqueous alcohol/s. Non-limiting examples of suitable alcohols include methanol, ethanol, isopropyl alcohol, isobutyl alcohol, pentyl alcohol, hexanol, iso-hexanol, and any combination thereof.

(iii) Catalysts

A reaction mixture for use in accordance with the methods of the present invention may comprise catalysts which may enhance the formation of desired products.

The catalysts may be 'intrinsic catalysts' which are derived from other components of the reaction mixture itself (e.g. from the polymeric material, aqueous solvent, any other reaction mixture component), are generated in situ during the treatment of the reaction mixture in accordance with the methods of the present invention, and/or are derived from the walls of a reactor apparatus within which the reaction mixture is treated. For example, the catalysts may be hydronium/hydroxide ions of water in the reaction mixture, compound/s in the polymeric material and/or transition/noble metals from the reactor vessel walls. Waste plastic polymers treated according to the methods of the present invention may have contaminants with catalytic activity.

Additionally or alternatively, the catalysts may be 'supplementary catalysts' which are not derived from other components of the reaction mixture itself, are not generated in situ during the treatment of the reaction mixture in accordance with the methods of the present invention, and are not derived from the walls of a reactor apparatus within which the reaction mixture is treated. Rather, the supplementary catalysts are separately added to the reaction mixture as a discrete/stand-alone component, and are thus additional to intrinsic catalysts present in the reaction mixture.

Although the addition of supplementary catalysts may be advantageous in certain circumstances, the skilled addressee will recognise that the methods of the invention may be performed without using them.

A supplementary catalyst as contemplated herein may be any catalyst that enhances the formation of biofuel products and/or other products such as chemicals from polymeric material feedstocks using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, metals supported on nitrogen doped carbon materials, and combinations thereof.

Without being limited to theory, supplementary base catalysts may play a multiple role in that they may enhance product formation and also control pH, which may be advantageous for reducing corrosion rates in reactor metal components, and may promote the precipitation of halogens contained in the feedstock as metal halides that are insoluble or sparingly soluble in supercritical water. Upon cooling and depressurisation the metal halides can re-dissolve in the water phase. This action is advantageous because the halogens, in particular chlorine, may effectively be removed from the gas phase and/or from the oil phase. Chlorines are undesirable in gas and oil phases because they may ultimately form dioxins and other environmental pollutants if incompletely combusted in a subsequent process.

In some embodiments, supplementary catalysts known in the art to promote water-gas shift (WGS) reactions may be included in the reaction mixture to promote hydrogen transfer from water to oil products. Any WGS catalysts or hydrogen transfer catalysts known in the art may be utilised. Without limitation the catalysts may be in the form of a finely dispersed solid added to the extruder feed. Additionally or alternatively, they may be in the form of a fixed bed. Additionally or alternatively, they may be homogenous when present in a reaction stream (e.g. aqueous solvent, polymeric material extrudate, and/or reaction mixture) under subcritical conditions and/or supercritical conditions.

Without being bound by theory, the addition of WGS and/or hydrogen transfer catalysts may increase the degree of saturation of hydrocarbons in the product. This may be desirable as the cetane number of middle distillates in the product may increase and the proportion of n-paraffins in the wax fractions in the product may also increase, making the waxes valuable by virtue of their high purity and sharp and discrete melting point ranges.

Table 2 below provides a summary of various exemplary catalysts that may be employed in the methods of the invention and the corresponding reactions that they may catalyse.

TABLE 2 summary catalysts and corresponding reactions

| Reaction Type | Catalyst Family | Catalyst Family Member | Specific example(s) | Preferred catalysts/comments |
|---|---|---|---|---|
| Hydrolysis | Base catalysts | Sub/super-critical water | Hydroxide ion in sub/super-critical water | |
| | | All alkali and transition metal salts, both cations and anions can contribute. Include all common inorganic anions<br>Any organic base | M = any alkali or transition metal<br>A = anions, including: aluminate, sulfate, sulfite, sulfide phosphate, phosphite nitrate, nitrite silicate hydroxide alkoxide carbonate oxide<br>ammonia, pyridine, etc. | M = Na, K, Fe, Ca, Ba<br>A = aluminate, phosphate, silicate, hydroxide, methoxide, ethoxide carbonate sulphate sulphide disulphide ($FeS_2$) oxide |
| Hydrolysis | Acid catalysts (slower) | Sub/super-critical water | Hydronium ion in sub/super-critical water | |
| | | Any liquid mineral or organic acid | HA, where<br>A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |

TABLE 2-continued summary catalysts and corresponding reactions

| Reaction Type | Catalyst Family | Catalyst Family Member | Specific example(s) | Preferred catalysts/comments |
|---|---|---|---|---|
| Dehydration (elimination) | Acid catalysts | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals. zeolites or alumino-silicates in general may be added |
| Transfer Hydrogenation or in-situ $H_2$ generation | Transfer hydrogenation catalysts | All alkali and transition metal hydroxides and formates All reactive carboxylic acids All transition and noble metals | M = any alkali or transition metal A = hydroxide, formate All transition and noble metals | M = Na, K A = hydroxide, formate formic, acetic M = Fe, Pd, Pd, Ni Ru Rh |
| Decarboxylation | Largely thermal | Acid and transition (noble) metal cats have been reported to aid the process | All transition and noble metals supported on solid acids | $Pt/Al_2O_3/SiO_2$ $Pd/Al_2O_3/SiO_2$ $Ni/Al_2O_3/SiO_2$ |
| Decarbonylation | Largely thermal | As for decarboxylation | As for decarboxylation | As for decarboxylation |
| In-situ gasification | Largely thermal | Transition metals | supported transition metals sulfides | $Pt/Al_2O_3/SiO_2$ $Pd/Al_2O_3/SiO_2$ $Ni/Al_2O_3/SiO_2$ Fe $Fe_xS_y$ $FeS/Al_2O_3$ $FeS/SiO_2$ $FeS/Al_2O_3/SiO_2$ |
| Water-Gas Shift | WGS catalysts | Standard WGS catalysts | As per literature | As per literature |
| Direct Hydrogenation with $H_2$ | Transition metals | Zero valent metals Sulfides | | Fe, Pt, P, Ni as zero valent FeS, $Fe_xS_y$ |
| Hydrode-oxygenation | Combined acid and hydrogenation catalyst | Transition metal and solid acid | M = transition metal A = acidic solid | $Pt/Al_2O_3/SiO_2$ $Pd/Al_2O_3/SiO_2$ $Ni/Al_2O_3/SiO_2$ $NiO/MoO_3$ $CoO/MoO_3$ $NiO/WO_2$ zeolites loaded with noble metals, e.g. ZSM-5, Beta, ITQ-2 |

The optimal quantity of a supplementary catalyst used in the methods of the invention may depend on a variety of different factors including, for example, the type of polymeric material under treatment, the aqueous solvent utilised, the specific temperature and pressure employed during the reaction, the type of supplementary catalyst and the desired properties of the product/s. By following the methods of the invention, the optimal quantity of a supplementary catalyst to be used can be determined by one skilled in the art without inventive effort.

It will be understood that no particular limitation exists regarding the timing at which the supplementary catalyst/s may be applied to a feedstock slurry or reaction mixture when performing the methods of the present invention. For example, the supplementary catalyst/s may be added during the preparation of the slurry, or added to the slurry before heating/pressurisation to target reaction temperature and pressure. Alternatively, the supplementary catalyst/s may be added during heating/pressurisation to target reaction temperature and pressure, and/or after reaction temperature and pressure are reached. supplementary catalyst/s may thus be included in a reaction mixture comprising polymeric material for treatment according to the present invention prior to heating and/or pressurising the reaction mixture, during heating and/or pressurising of the reaction mixture, and/or after the reaction mixture reaches a desired reaction temperature and/or reaction pressure.

(iv) Solid Substrate Component

A reaction mixture treated in accordance with the methods of the present invention may comprise a solid substrate component as described herein.

Favourable characteristics of the solid substrate may include any one or more of the following: it remains inert or substantially inert at the reaction temperature and pressure used; it remains unaltered or substantially unaltered upon completion of the process; it remains as a solid or substantially solid at the reaction temperatures and pressures used; it is of low or moderate hardness so that it does not induce substantial abrasion or erosive corrosion in reactors (e.g. continuous flow reactors); it has a high internal or external specific surface area so that it can adsorb and/or absorb large quantities of bio-products and/or other precipitates during the conversion process.

The solid substrate may be a carbonaceous material. By way of non-limiting example only, the solid substrate may be a carbonaceous material comprising at least 50 wt %, at least 60 wt %, at least 70 wt %, at least 80 wt %, at least 90 wt %, or at least 95 wt % carbon (as a percentage of total solid substrate weight).

Without being bound by theory, the solid substrates may act as active surfaces to adsorb materials precipitating during reactions and thereby reduce the tendency of pressure differentials to develop across continuous flow reactors.

Again without being bound by theory the solid substrates may favourably alter the flow characteristics of oils and/or slurries being pumped through reactors under conditions of continuous flow.

Non-limiting examples of suitable carbonaceous materials for use as the solid substrate include coals (e.g. anthracitic coals such as meta-anthracite, anthracite and semianthracite; bituminous coals, subbituminous coals, lignite (i.e. brown coal), coking coal, coal tar, coal tar derivatives, coal char); cokes (e.g. high temperature coke, foundry coke, low and medium temperature coke, pitch coke, petroleum coke, coke oven coke, coke breeze, gas coke, brown coal coke, semi coke); charcoal; pyrolysis char; hydrothermal char; carbon black; graphite fine particles; amorphous carbon; carbon nanotubes; carbon nanofibers; vapor-grown carbon fibers; and any combination thereof.

In some preferred embodiments of the present invention the solid substrate may be a carbon rich char.

The solid substrate may be a non-carbonaceous material. By way of non-limiting example only, the solid substrate may be a non-carbonaceous material comprising less than 20 wt %, less than 10 wt %, less than 5 wt %, less than 3 wt %, less than 2 wt %, or less than 1 wt % carbon (as a percentage of total slurry or solid substrate weight), or comprise no carbon.

Non-limiting examples of suitable non-carbonaceous materials for use as the solid substrate include ash (e.g. fly ash); minerals (e.g. calcium carbonate, calcite, silicates, silica, quartz, oxides including iron ore, clay minerals, talc, gypsum); an insoluble or substantially insoluble metal salt; and any combination thereof.

Further non-limiting examples of suitable materials for use as the solid substrate include carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

In certain embodiments of the present invention, the solid substrate may constitute less than 20 wt %, less than 15 wt %, less than 10 wt %, less than 5 wt %, or less than 2 wt % of total slurry or reaction mixture weight.

In certain embodiments of the present invention, the solid substrate may constitute more than 0.5 wt %, more than 1 wt %, more than 3 wt %, more than 5 wt %, more than 10 wt %, more than 1 wt %, more than 20 wt %, more than 25 wt %, or more than 30 wt % of total slurry or reaction mixture weight.

The optimal particle size and optimal concentration of the solid substrate may depend upon factors such as, for example, the desired rheological properties of the slurry and/or the compatibility of the slurry with component/s of a given apparatus within which the methods of the invention may be performed (e.g. reactor tubing). The optimal particle size and/or concentration of the solid substrate component in a slurry used for the methods of the invention can readily be determined by a person skilled in the art using standard techniques. For example, a series of slurries may be generated, each sample in the series comprising a specific solid substrate of different size and/or different concentration to those of other samples. Each reaction mixture can then be treated in accordance with the methods of the invention under a conserved set of reaction conditions. The optimal solid substrate size and/or concentration can then be determined upon analysis and comparison of the products generated from each reaction mixture using standard techniques in the art.

In certain embodiments of the invention, the size of a solid substrate component in the slurry may be between about 10 microns and about 10,000 microns. For example, the size may be more than about 50, 100, 500, 750, 1000, 2000, 3000, 4000, 5000, 6000, 7000, 8000 or 9000 microns. Alternatively, the size may less than about 50, 100, 500, 750, 1000, 2000, 3000, 4000, 5000, 6000, 7000, 8000 or 9000 microns. In some embodiments of the invention, the particle size distributions and particle surface charge characteristics of the solid substrate component of the slurry may be optimized in order to provide desirable slurry characteristics when mixed, for example, to obtain minimum viscosity for a given solids content. The optimal particle size and/or particle surface charge of solid components in a given slurry used can readily be determined by a person skilled in the art using standard techniques. For example, a series of slurries may be generated, each sample in the series comprising different concentrations of solid components compared to the other samples. Each slurry can then be treated in accordance with the methods of the invention under a conserved set of reaction conditions. The optimal particle size and/or particle surface charge of solid substrate component can then be determined upon analysis and comparison of the products generated from each slurry using standard techniques known in the art.

(v) Oil Component

In some embodiments of the invention the reaction mixture comprises an oil additive. The oil additive is independent from/not derived from any other component in the reaction mixture, and is added as a discrete/stand-alone component. The oil additive may act as an oil-solvent during the reaction. The oil additive may be any suitable oil, non-limiting examples of which include paraffinic oil, gas-oil, crude oil, synthetic oil, coal-oil, bio-oil, shale oil/kerogen oil, aromatic oils (i.e. single or multi-ringed components or mixtures thereof), tall oils, triglyceride oils, fatty acids, ether extractables, hexane extractables and any mixture of any of the previous components. The oil may be incorporated into the reaction mixture at any point before target reaction temperature and/or pressure are reached.

In some embodiments, the oil is a bio-oil product recycled from the process. For example, a portion of the bio-oil produced may be taken off as a side stream and recycled into the reaction mixture.

In some preferred embodiments, the bio-oil is recycled in combination with solid substrate, each being a component of the biofuel product. For example, a portion of the bio-oil produced mixed with solid substrate may be taken off as a side stream and recycled into the slurry, reaction mixture, or both.

No particular limitation exists regarding the proportion of oil additive reaction mixture treated in accordance with the methods of the present invention. For example, the reaction mixture may comprise more than about 2 wt % oil, more than about 5 wt % oil, more than about 10 wt % oil, or more than about 20, 30, 40, 50, 60 or 70 wt % oil. Alternatively, the slurry may comprise less than about 98 wt % oil, less than about 95 wt % oil, less than about 90 wt % oil, or less than about 80, 70, 60, 50, 40 or 30 wt % oil.

In some preferred embodiments the reaction mixture comprises between about 10 wt % and about 30 wt % organic matter, between about 2 wt % and about 15 wt % solid substrate, and between about 50 wt % and about 90 wt % solvent where the solvent is a mixture of oil and aqueous phase in any proportion.

In some preferred embodiments, the reaction mixture comprises between about 40 wt % and about 50 wt % oil. In other preferred embodiments, the slurry comprises about 45 wt % oil.

In other preferred embodiments the reaction mixture comprises a feedstock to oil ratio of 0.5-1.2:1. The oil may be paraffinic oil.

Treatment of Polymeric Material
(i) Pre-Treatment of Polymeric Material

Although optional and not necessarily required, prior to the extrusion process the polymeric material may be pre-treated to break down physical and/or chemical structure. Pre-treatment of the polymeric material may comprise physical methods, non-limiting examples of which include grinding, chipping, pelletisation, granulisation, flaking, powdering, shredding, milling (e.g. vibratory ball milling), compression/expansion, agitation, and/or pulse-electric field (PEF) treatment.

Additionally or alternatively, pre-treatment of the polymeric material may comprise physio-chemical methods, non-limiting examples of which include pyrolysis, steam explosion, ammonia fibre explosion (AFEX), ammonia recycle percolation (ARP), and/or carbon-dioxide explosion. For example, steam explosion involves exposing the polymeric material to high pressure steam in a contained environment before the resulting product is explosively discharged to an atmospheric pressure. Pre-treatment with steam explosion may additionally involve agitation of the polymeric material.

Additionally or alternatively, pre-treatment of the polymeric material may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), and/or oxidative treatments.

(ii) Extrusion of Polymeric Material

Polymeric material treated in accordance with the methods of the present invention is subjected to extrusion. Extrusion of the polymeric material may be performed in any suitable extruder, non-limiting examples of which include single screw extruders, multiscrew extruders (e.g. twin screw extruders), intermeshing screw extruders, radial extruders, and roll-type extrusion presses. The multiscrew extruders may be counter-rotating or co-rotating. The extruder may comprise kneading disk/s and/or other screw element/s for mixing or dispersing the melt.

Suitable extruders typically are from about 1 metre to about 50 metres in length, 5 metres to about 40 metres in length, about 10 metres to about 30 metres in length, about 10 metres to about 20 metres in length, about 5 metres to about 20 metres in length, about 5 metres to about 10 metres in length.

The energy needed by the extruder to heat the polymeric material can be provided by friction and/or shearing of the material in the extruder, and/or by heating elements. The extruder may comprise one or multiple series of heating zones.

The polymeric material may be heated in the extruder to temperature/s sufficient for the material to melt. For example, the polymeric material may be heated in the extruder to more than 50° C., to more than 75° C., to more than 100° C., to more than 150° C., to more than 200° C., to more than 250° C., to more than 300° C., or to more than 350° C. Accordingly, the polymeric material may be heated in the extruder, for example, to between about 50° C. and about 350° C., between about 50° C. and about 300° C., between about 50° C. and about 200° C., between about 50° C. and about 150° C., between about 80° C. and about 300° C., between about 80° C. and about 200° C., or between about 80° C. and about 150° C.

The residence time of the polymeric feedstock in the extruder may be, for example, about 30 seconds to about 20 minutes, about 2 minutes to about 6 minutes, or about 3 minutes to about 5 minutes.

The extruder may be fitted with a suitable feeder device (e.g. a hopper) for application of the polymeric material to/into the extruder.

Additionally or alternatively, the extruder may be fitted with a die to facilitate the generation of back-pressure. For example, the die may terminate in a capillary tube of reduced diameter.

Molten stream of polymeric material may exit the extruder at a desired temperature and pressure. For example, the stream of material exiting the extruder may be: at a temperature of between about 150° C. and about 400° C. and a pressure of between about 200 bar and 350 bar; at a temperature of between about 200° C. and about 300° C. and a pressure of between about 250 bar and 350 bar; or at a temperature of between about 220° C. and about 280° C. and a pressure of between about 200 bar and 350 bar.

(iii) Combining Extruded Polymeric Material with Aqueous Solvent

Following extrusion the polymeric material is mixed with aqueous solvent that has been heated and/or pressurised prior to contacting the extruded polymeric material. The aqueous solvent may be heated and/or pressurised using any suitable means.

The aqueous solvent may be in a subcritical state or a supercritical state prior to and at the time of contacting the extruded polymeric material.

In some embodiments, the aqueous solvent is water or steam (e.g. supercritical water, superheated steam, or subcritical water).

Contacting a supercritical aqueous solvent with the extruded polymeric material may initiate a supercritical to subcritical phase change in the aqueous solvent (i.e. bring it into a subcritical state as the temperature and/or pressure of the solvent falls below its critical point). The phase change may trigger a large release of energy which in turn may assist in successfully combining the aqueous solvent with the extruded polymeric material.

Alternatively, contacting a supercritical aqueous solvent with the extruded polymeric material may not initiate a supercritical to subcritical phase change in the aqueous solvent.

By way of non-limiting example only, the aqueous solvent may be supercritical (e.g. supercritical water), and may be at a temperature of between about 375° C. and about 600° C., between about 375° C. and about 550° C., between about 375° C. and about 500° C., or between about 375° C. and about 450° C. at the time of contacting the extruded polymeric material.

Combining the independently heated/pressurised solvent with the extruded polymeric material in accordance with the methods of the present invention provides a means of generating a slurry/reaction mixture comprising a higher concentration of the extruded polymeric material than could be achieved, for example, (i) by mixing an equivalent amount of the polymeric material which has not been subjected to the aforementioned extrusion process with an equivalent amount of the independently heated and/or pressurised aqueous solvent; and/or (ii) by mixing an equivalent amount of the polymeric material which has not been subjected to the aforementioned extrusion process with an equivalent amount of the aqueous solvent, and heating/pressurising the mixture to the same levels.

(iv) Reaction Parameters

Following mixture of the independently heated/pressurised aqueous solvent with the extruded polymeric material, the slurry/reaction mixture so formed can optionally be further heated and/or pressurised to reach a desired reaction temperature and/or pressure levels.

The reaction mixture can then be fed into a reactor (e.g. a hydrothermal reactor, a continuous flow hydrothermal reactor) where the polymeric material can be converted into biofuel product/s, typically of lower average molecular weight than the polymeric material prior to conversion.

According to the methods of the present invention the reaction mixture comprising extruded polymeric material and an aqueous solvent is treated at a target temperature (or within a range of target temperatures) and a target pressure (or within a range of target pressures) for a fixed time period ("retention time") to provide product/s.

The optimal reaction temperature/s and/or pressure/s for a given reaction mixture may be readily determined by the skilled addressee by preparing and running a series of reactions that differ only by temperature and/or pressure utilised and analysing the yield and/or quality of the product/s.

It will be understood that in certain embodiments an aqueous solvent used in the methods of the present invention may be heated and pressurised beyond its critical temperature and/or beyond its critical pressure (i.e. beyond the 'critical point' of the solvent) during treatment in the reactor. Accordingly, the solvent may be a 'supercritical' aqueous solvent if heated and pressurised beyond the 'critical point' of the aqueous solvent.

In one embodiment the aqueous solvent (e.g. water) in a reaction mixture with extruded polymeric material treated by the methods of the present invention may be heated and pressurised to level(s) above its critical temperature and pressure (i.e. above the 'critical point' of the aqueous solvent). Accordingly, the mixture may comprise a 'supercritical' aqueous solvent when performing the methods.

In other embodiments an aqueous solvent (e.g. water or superheated steam) in a reaction mixture with extruded polymeric material treated by the methods of the present invention may be heated and pressurised to level(s) below its critical temperature and pressure (i.e. below the 'critical point' of the aqueous solvent). Accordingly, the mixture may comprise a 'subcritical' aqueous solvent when performing the methods. For example, the 'subcritical' solvent is heated and/or pressurised to level(s) approaching the 'critical point' of the solvent (e.g. between about 10° C. to about 50° C. below the critical temperature and/or between about 10 bar to about 50 bar below its critical pressure).

In still other embodiments, an aqueous solvent (e.g. water) in a reaction mixture with extruded polymeric material treated by the methods of the present invention may be heated and pressurised to levels both above and below its critical temperature and pressure (i.e. heated and/or pressurised both above and below the 'critical point' of the solvent at different times). Accordingly, the aqueous solvent of the mixture may oscillate between 'subcritical' and 'supercritical' states when performing the methods.

In certain embodiments, treatment of a reaction mixture comprising extruded polymeric material, an aqueous solvent, and optionally any one or more of: (i) supplementary catalysts, (ii) solid substrate and/or (iii) oil, which are not derived from the polymeric feedstock, aqueous solvent, or the walls of a reactor apparatus in which the treatment is carried out, and are not products generated in situ during the preparation and/or treatment of the reaction mixture, may be conducted at: temperature(s) of above 370° C. and pressure(s) of above 20 bar; temperature(s) of above 370° C. and pressure(s) above 40 bar; temperature(s) of above 370° C. and pressure(s) of above 60 bar; temperature(s) of above 370° C. and pressure(s) of above 80 bar; temperature(s) of above 370° C. and pressure(s) of above 100 bar; temperature(s) of above 370° C. and pressure(s) of above 120 bar; temperature(s) of above 370° C. and pressure(s) of above 140 bar; temperature(s) of above 370° C. and pressure(s) of above 160 bar; temperature(s) of above 370° C. and pressure(s) of above 180 bar: temperature(s) of above 370° C. and pressure(s) of above 200 bar; temperature(s) of above 370° C. and pressure(s) of above 220 bar; temperature(s) of above 370° C. and pressure(s) of above 240 bar; temperature(s) of above 370° C. and pressure(s) of above 260 bar: temperature(s) of above 370° C. and pressure(s) of above 280 bar; temperature(s) of above 370° C. and pressure(s) of above 300 bar; temperature(s) of above 370° C. and pressure(s) of above 350 bar; temperature(s) of above 400° C. and pressure(s) of above 20 bar; temperature(s) of above 400° C. and pressure(s) above 40 bar; temperature(s) of above 400° C. and pressure(s) of above 60 bar; temperature(s) of above 400° C. and pressure(s) of above 80 bar; temperature(s) of above 400° C. and pressure(s) of above 100 bar; temperature(s) of above 400° C. and pressure(s) of above 120 bar; temperature(s) of above 400° C. and pressure(s) of above 140 bar; temperature(s) of above 400° C. and pressure(s) of above 160 bar; temperature(s) of above 400° C. and pressure(s) of above 180 bar: temperature(s) of above 400° C. and pressure(s) of above 200 bar; temperature(s) of above 400° C. and pressure(s) of above 220 bar; temperature(s) of above 400° C. and pressure(s) of above 240 bar; temperature(s) of above 400° C. and pressure(s) of above 260 bar: temperature(s) of above 400° C. and pressure(s) of above 280 bar; temperature(s) of above 400° C. and pressure(s) of above 300 bar; temperature(s) of above 400° C. and pressure(s) of above 350 bar temperature(s) of above 374° C. and pressure(s) of above 221 bar; temperature(s) of above 375° C. and pressure(s) of above 225 bar; temperature(s) of between 370° C. and 550° C. and pressure(s) of between 20 bar and 400 bar; temperature(s) of between 374° C. and 500° C. and pressure(s) of between 221 bar and 400 bar; temperature(s) of between 374° C. and 550° C. and pressure(s) of between 221 bar and 400 bar; temperature(s) of between 375° C. and 550° C. and pressure(s) of between 221 bar and 400 bar; temperature(s) of between 375° C. and 550° C. and pressure(s) of between 225 bar and 400 bar.

In certain embodiments treatment of a mixture comprising extruded polymeric material and an aqueous solvent using the methods of the invention may be conducted at: temperatures of between 400° C. and 550° C. and pressures of between 100 bar and 300 bar.

In certain embodiments, the temperature may be between 370° C. and 500° C., between 370° C. and 480° C., between 374° C. and 500° C., between 380° C. and 500° C., between 380° C. and 450° C., between 400° C. and 480° C., or between 440° C. and 480° C.; and the pressure may be more than 100 bar.

In some embodiments the reaction mixture is treated at greater than about: 350° C., 360° C., 370° C., 380° C., 390°

C., 400° C., 410° C., 420° C., 430° C., 440° C., 450° C., 460° C., 470° C., or 480° C. In some embodiments the reaction mixture is treated at any one of the temperatures referred to in this paragraph and at a pressure that is greater than about: 180 bar, 200 bar, 220 bar, 240 bar, 260 bar, 280 bar, 300 bar, or 320 bar.

In certain embodiments, the pH of the polymeric material melt stream/extrudate, supercritical aqueous solvent, and/or reaction mixture may be maintained at a pH of more than: 6, 7, 8, 9, 10 or 11, for example, by the addition of base. This may serve to minimise acid-catalysed isomerization and/or hydration reactions of alkenes, especially of 1-alkenes, during the process.

(v) Retention Time

The specific time period over which a reaction mixture of the present invention comprising extruded polymeric material and an aqueous solvent may be treated at a target temperature and pressure (i.e. the "retention time") to provide biofuel may depend on a number different factors including, for example, the type of polymeric material under treatment and the relative proportions or types of components in the reaction mixture (e.g. the proportion of aqueous solvent, additive catalyst(s), solid substrates and/or any other additional component/s), and/or the type of apparatus in which the methods are performed. These and other factors may be varied in order to optimise a given method so as to maximise the yield and/or reduce the processing time. Preferably, the retention time is sufficient to upgrade all or substantially all of the heavy oil used as a feedstock into an upgraded product.

In certain embodiments, the retention time is less than about 60 minutes, 45 minutes, 30 minutes, 25 minutes, 20 minutes, 15 minutes, 10 minutes or less than about 5 minutes. In certain embodiments, the retention time is more than about 60 minutes, 45 minutes, 30 minutes, 25 minutes, 20 minutes, 15 minutes, 10 minutes or more than about 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

The optimal retention time for a given set of reaction conditions as described herein may be readily determined by the skilled addressee by preparing and running a series of reactions that differ only by the retention time, and analysing the yield and/or quality of upgraded product generated.

In some embodiments the retention time in the reactor, calculated assuming plug flow of a fluid with the density of an idealised mixture of water plus oil derived from polymeric material, at the reaction temperature, is about 30 seconds, about 1 minute, about 2 minutes, about 5 minutes, between 5 minutes and 10 minutes, between 10 minutes and 20 minutes, between 20 minutes and 30 minutes, between 30 minutes and 40 minutes, greater than 40 minutes, or less than about 60 minutes.

(vi) Pressurisation/De-Pressurisation

A reaction mixture comprising extruded polymeric material and aqueous solvent according to the present invention may be pressurised using known means in the art.

For example, pressurisation within an apparatus according to the present invention can be generated via the extruder and/or pump/s used to pressurise the aqueous solvent brio to contacting extruded polymeric material.

In continuous flow systems, pressure will generally change from atmospheric to target pressure during the time it takes to cross the extruder and/or pump (i.e. close to instantaneous) whereas in a batch system it will mirror the time that it takes to heat the mixture up.

In some embodiments, the reaction mixture may be brought to a target temperature and/or pressure in a time period of between about 30 seconds and about 30 minutes.

In some embodiments, the reaction mixture may be brought to a target temperature and/or pressure in a time period less than about 15 minutes, less than about 10 minutes, less than about 5 minutes, or less than about 2 minutes.

In certain embodiments, the reaction mixture may be brought to a target pressure substantially instantaneously and brought to a target temperature in less than about 20 minutes, less than about 10 minutes, or less than about 5 minutes. In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes.

Additionally or alternatively, following completion of the retention time period the product mixture generated may be cooled to between about 150° C. and about 200° C., between about 160° C. and about 200° C., preferably between about 170° C. and about 190° C., and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of heating/pressurisation and cooling/de-pressurisation may be facilitated by performing the methods of the present invention in a continuous flow system (see section below entitled "Continuous flow").

(vii) Continuous Flow

Methods according to the present invention may be performed under conditions of continuous flow.

Although the methods need not be performed under conditions of continuous flow, doing so may provide a number of advantageous effects. For example, continuous flow may facilitate the accelerated implementation and/or removal of heat and/or pressure applied to a slurry/reaction mixture. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the slurry/reaction mixture heats/pressurises and/or cools/de-pressurises. Continuous flow is also believed to enhance reactions responsible for converting polymeric materials into biofuels and/or other products by virtue of generating mixing and shear forces believed to aid in emulsification.

Accordingly, in preferred embodiments the methods of the present invention are performed under conditions of continuous flow. As used herein, the term "continuous flow" refers to a process wherein:

(i) reaction mixture precursors (e.g. polymeric material undergoing extrusion, aqueous solvent, and optionally catalyst, oil and/or solid substrate streams) are maintained in a stream of continuous movement into the reactor apparatus;
(ii) reaction mixtures are maintained in a stream of continuous movement through the reactor apparatus; and
(iii) product stream/s are maintained in a stream of continuous movement out of the reactor apparatus Accordingly, in a continuous flow system the reaction mixture is maintained in a stream of continuous movement along the length (or partial length) of a given surface of a reactor apparatus from the point of entry into the reactor to the point of exiting the reactor.

Continuous flow conditions as contemplated herein imply no particular limitation regarding flow velocity of a reaction mixture provided that it is maintained in a stream of continuous movement.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of reaction mixture is maintained.

The use of a suitable flow velocity (under conditions of continuous flow) may be advantageous in preventing scale-formation along the length of a particular surface that the reaction mixture moves along (e.g. vessel walls of a reactor apparatus) and/or generating an effective mixing regime for efficient heat transfer into and within the reaction mixture.

Products

The methods of the present invention may be used to produce bio-product(s) from polymeric matter feedstocks. The nature of the bio-product(s) may depend on a variety of different factors including, for example, the particular polymeric matter feedstocks treated, and/or the reaction conditions/reagents utilised in the methods.

In certain embodiments, the bio-product(s) may comprise one or more biofuels (e.g. bio-oils, char products, gaseous products) and chemical products (e.g. platform chemicals, alkenes, alkanes, aromatic hydrocarbons, styrene, ethylbenzene, alcohols, ketones, organic acids, furanics, furfural, hydroxymethylfurfural, levoglucosan, sorbitol, cylitol, arabinitol, formaldehyde, acetaldehyde).

The bio-oil may comprise multiple phases, including but not limited to a water-soluble aqueous phase which may comprise, compounds including, but not limited to, any one or more of carbohydrates, aldehydes, carboxylic acids, carbohydrates, phenols, furfurals, alkenes, alkanes, aromatic hydrocarbons, styrene, ethylbenzene, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives; and a water-insoluble phase which may comprise, compounds including, but not limited to, any one or more of alkenes, alkanes, aromatic hydrocarbons, styrene, ethylbenzene, waxes, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives.

A bio-oil bio-product produced in accordance with the methods of the invention may comprise an energy content of greater than about 30 MJ/kg, more preferably greater than about 35 MJ/kg, more preferably greater than about 40 MJ/kg, still more preferably greater than about 42 MJ/kg, 43 MJ/kg or 44 MJ/kg, and most preferably above about 45 MJ/kg. The bio-oil product may comprise less than about 10% wt db oxygen, preferably less than about 5% wt db oxygen, more preferably less than about 2% wt db oxygen and still more preferably less than about 0.5% wt db oxygen, and preferably less than about 0.1% wt db oxygen. The bio-oil product may comprise greater than about 6% wt db hydrogen, preferably greater than about 10% wt db hydrogen, more preferably greater than about 12% wt db hydrogen, and still more preferably greater than about 13, 14 or 15% wt db hydrogen. The molar hydrogen:carbon ratio of a bio-oil of the invention may be less than about 2.1 or 2.0, less than about 1.9, less than about LB, or less than about 1.6. Other non-limiting examples of products include oil char (e.g. carbon char with bound oils), char, and gaseous product (e.g. methane, hydrogen, carbon monoxide and/or carbon dioxide, ethane, ethene, propene, propane).

In some embodiments, polymeric material in the reaction mixture may be converted into a bio-oil. The bio-oil may comprise compounds including, but not limited to, any one or more of alkanes, alkenes, aromatic hydrocarbons, aldehydes, carboxylic acids, carbohydrates, phenols, furfurals, alcohols, and ketones. The bio-oil may comprise compounds including but not limited to aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives.

In some embodiments polymeric material may be cracked and/or depolymerized to form as product monomers that were originally used in the manufacture of the polymer. For example polystyrene may be depolymerized to styrene. The yield of styrene may, for example, be 1% by weight, 2% by weight, 5% by weight, 10% by weight, 20% by weight, 40% by weight or 60% by weight, or 80% or 90% by weight of the product based on the dry polymeric material (e.g. polystyrene) in the feed.

Upon depressurisation and cooling the bio-oil may separate from water present in the product stream and being of lower density float on the water. Gas and vapour may also separate from the product upon depressurisation and cooling. The gas may be calorific and can be combusted to provide energy to the process. The separation of the two liquid phases (i.e. oil phase and water phase) may be enhanced by use of suitable means (e.g. a centrifuge). The oil phase can be subjected to further processing, for example it can be distilled to provide fractions such as naphtha, middle distillates, heavy gas oils and vacuum gas oils, and waxes. Waxes and partly converted polymers may optionally be recycled as feed to the front of the process for further cracking. Naphtha and other fractions may optionally be added to the reaction mixture, for example by injection after extrusion of the polymeric material and/or after contacting extruded polymeric material with heated/pressurised aqueous solvent, to lower the fluid viscosity and modify the phase behaviour.

In some embodiments the product comprises alkenes (e.g. n–1-alkenes such as 1-dodecene). The n–1-alkene content of a product oil, wax oil, or wax produced in accordance with the methods of the present invention may be between 5%, and 10%, between 5%, and 15%, between 5%, and 20%, between 5%, and 25%, between 10%, and 20%, between 15%, and 20%, or between 20% and 25%, by weight. The n-alkane to n–1-alkene ratio in a product oil, wax oil, or wax produced in accordance with the methods of the present invention may be between 1:1 and 4:1, between 1.25:1 and 3:1, between 1.5:1 and 2.5:1, between 1.75:1 and 2:1, more than 2.5:1, more than 3:1, or more than 4:1.

Alkenes and especially n–1-alkenes may be separated from other components of the product oil, wax oil, or wax by methods known in the art. For example they may be separated by fractional distillation, or selective solvent extraction. They may also be chemically modified (e.g. by etherification or hydroamination).

In some embodiments boil product may be fractionated by means of a flash separation or flash distillation, optionally also serving as a depressurization means and/or a heat recovery step.

Figure five provides an exemplary schematic in which the fractionation is achieved by flash distillation. Simple flash distillation provides a means of separating flash volatile oil and wax components to a single unfractionated distillate. The upper boiling point of the distillate can be modified by altering the pressure of the flash vessel, for example, to 20 barg, 10 barg, 1 barg, or 0.2 barg. Energy recovery can be made possible by means of a heat exchanger (see 'Primary Condenser (Cold)'—Figure five). Lower pressure flashes may reduce the quantity of heat recoverable in the heat exchanger as more energy is carried forward in the flash distilled components.

In some embodiments, the fractionation may be achieved using a flash distillation with two condenser stages as exemplified in Figure six. Two condenser stages can allow the flash distillate to be recovered as two fractions (e.g. middle distillates (kerosene, diesel) and heavier fuel oils and waxes) depending on the pressure of the flash and the temperatures of the condensers.

In some embodiments the fractionation may be achieved using flash distillation with a fractionating column as depicted in Figure seven. The use of a fractionating column may provide improved separation of flash distillate fractions into, for example, heavy naphtha and kerosene, diesel, heavy gas oil and wax fractions.

In some embodiments the fractionation may be achieved using flash distillation with a fractionating column featuring vacuum assistance as shown in Figure eight. Utilising a vacuum distillation column can allow recovery of high boiling wax fractions including high melting wax fractions if high-vacuum short-path distillation is employed.

In some embodiments, the reaction mixture comprises plastic polymers and the product comprises bio-oil and/or synthetic wax. In some embodiments the bio-oil product has a middle distillate fraction that has a very high cetane number, making the fraction valuable as a cetane booster for lower cetane fuels. For example, in some embodiments the product is at least partly comprised of a bio-oil where the cetane number, or the derived cetane number of the middle distillate fraction or the diesel fraction is greater than about 50, or greater than about 60, or greater than about 70, or greater than about 80, or greater than about 90, or greater than about 100.

In some embodiments alkenes in the bio-oil product can be separated by chemical or physical means and/or subjected to a chemical reaction (e.g. an addition reaction, and/or an oxidation reaction, and/or a hydrogenation reaction) to make products other than biofuels (e.g. surfactants). This has the advantage that removal of the alkenes may increase the oxidation stability of the remaining bio-oil product, making it better for use (e.g. as a diesel fuel).

In some embodiments, the polymeric material is converted into biofuel product/s, of lower average molecular weight than the polymeric material prior to conversion.

In some embodiments the product comprises a wax (e.g. a paraffin wax). The product may be fractionated or purified and optionally blended to obtain waxes with specific physical and chemical properties. The fractionation and purification may be achieved by any means known in the art including, but not limited to, vacuum distillation (with or without a fractionating column), solvent extraction (including, but not limited to, extraction with propane, butane, carbon dioxide or other non-polar solvents), recrystallization, and/or hydrogenation.

In some embodiments the product comprises a wax with at least 30%, at least 40%, at least 50%, at least 60%, at least 70% of the wax having a boiling point above 360° C. AEPB.

In some embodiments the product comprises a wax with at least 30%, at least 40%, at least 50%, at least 60%, at least 70% of the wax having a molecular weight of between 400 and 950 daltons.

In one embodiment the product comprises a wax comprising:
A. Any one or more of the following features:
 more than 30%, more than 40%, more than 50%, more than 60%, more than 70%, more than 80% or more than 90% n-paraffin content by weight;
 an oil content of less than 5%, less than 10%, less than 15%, less than 20% or less than 30% by weight;
 a melting point or congealing point of about 50° C.-75° C. and/or a viscosity of between 3 and 10 cS at 100° C.;
 ASTM D1500 Colour of less than 2.
B. Any one or more of the following features:
 more than 70%, more than 80%, more than 90% n-paraffin content by weight;
 an oil content less than 5%, less than 10%, or less than 15% by weight;
 a melting point or congealing point of between 70° C. and 85° C.;
 a viscosity or between 15 and 20 cS at 100° C.; ASTM D1500 Colour of less than about 2.
C. Any one or more of the following features:
 more than 70%, more than 80%, or more than 90% n-paraffin content by weight;
 an oil content of less than 5%, less than 10%, or less than 15% by weight;
 a melting point or congealing point of between 70° C. and 85° C.;
 a viscosity of between 15 cS and 20 cS at 100° C.;
 ASTM D1500 Colour of less than 2.

D. Any one or more of the following features:
- more than 30%, more than 40%, more than 50%, more than 60%, more than 70%, more than 80%, or more than 90% n-paraffin content by weight;
- an oil content of less than 5%, less than 10%, less than 15%, less than 20%, or less than 30% by weight;
- a melting point or congealing point of between 40° C. and 50° C. (e.g. 45° C.).

E. Any one or more of the following features:
- more than 70%, more than 80%, or more than 90% n-paraffin content by weight;
- an oil content of less than 3%, less than 5%, less than 8%, or less than 10% by weight;
- a melting point or congealing point of between 50° C. and 75° C.;
- a viscosity of between 3 cS and 20 cS at 100° C.;
- Saybolt colour of between 20 and 30, or between 25 and 28.

F. Any one or more of the following features:
- more than 80%, more than 90%, or more than 95% n-paraffin content by weight,
- an oil content of less than 0.5% or less than 0.75% by weight;
- a melting point or congealing point of between 100° C. and 120° C.;
- Saybolt colour more than 15.

Bio-products produced in accordance with the methods of the present invention may be used in any number of applications. For example, biofuels may be blended with other fuels, including for example, ethanol, diesel and the like. Additionally or alternatively, the biofuels may be upgraded into higher fuel products. Additionally or alternatively, the biofuels may be used directly, for example, as petroleum products and the like.

Treatment of Polyethylene

The following embodiments provide non-limiting examples of how the present invention may be applied in the processing of polyethylene.

(i) Polyethylene (PE) Processing

The present invention may be used to process feedstocks comprising a high proportion of polyethylene (PE). When considered in the context of common polymers polyethylene typically requires elevated temperatures for cracking/depolymerisation. The present inventors have unexpectedly identified advantageous conditions and/or plant configurations capable of reducing capital plant costs and/or operational expenditure when cracking polyethylene-rich feedstocks into fuels and/or waxes and/or chemical products. More specifically, the conditions and/or plant configurations described herein may reduce material costs of plant by reducing or removing the requirement for expensive specialized steels, and/or increase product yields. Without being limited by theory, it is hypothesised that multiphase flow occurs when supercritical water is mixed with high PE content polymeric material melt streams/extrudates where the mass flows of polymeric material and supercritical fluid being mixed may be, for example, 30% polymeric material and 70% aqueous solvent (e.g. water), 50% polymeric material and 50% aqueous solvent (e.g. water), or 70% polymeric material and 30% aqueous solvent (e.g. water). Processing conditions and configurations that serve to minimize the average viscosity of the supercritical solvent/polymer mix at the operating temperatures and flow rates are thus desirable. If the average viscosity in the process becomes too high the pressure drop along the continuous process may increase. Alternatively, if the downstream pressure becomes too low such as, for example, below the critical pressure of water, then a continuous process may become difficult to control.

According to certain embodiments of the present invention, polyethlyene may be processed under any one or more of the following non-limiting conditions, in any combination:

Polymeric material fed into the extruder may comprise at least 40%, at least 50%, at least 60%, at least 70%, at least 80%, or at least 90% polyethylene by weight on a dry basis. The supercritical aqueous solvent may, for example, consist of supercritical water or consist essentially of supercritical water with minor levels (e.g. less than 3%, less than 2% or less than 1% contaminants). Alternatively, the aqueous solvent may comprise less than 95%, less than 90%, less than 85%, less than 80%, less than 75%, less than 70%, less than 60% or less than 50% supercritical water). In some embodiments the supercritical solvent may comprise alcohol (e.g. more than 1%, more than 2%, more than 3%, more than 4%, more than 5%, more than 10%).

The supercritical aqueous solvent may constitute less than 10%, less than 20%, less than 30%, less than 40%, less than 50%, less than 60% of the total mass flow in the process following mixing with the polymeric material melt stream/extrudate.

The temperature of the polymeric material melt stream/extrudate leaving the extruder may be more than 275° C., more than 300° C., more than 325° C., more than 350° C., and/or between 340° C. and 360° C.

The pressure of the reaction mixture (i.e. polymeric material melt stream/extrudate and supercritical aqueous solvent) may be at least 230 bar, at least 240 bar, at least 250 bar, at least 260 bar at least 270 bar, at least 280 bar, between 250 bar and 280 bar, or less than 300 bar. Additionally or alternatively, the maximum pressure drop between the point at which the reaction mixture is initially formed (i.e. the 'mixing point') and the reactor inlet may be less than 10 bar, less than 20 bar, less than 30 bar, less than 40 bar, or less than 50 bar.

The temperature of the supercritical aqueous solvent immediately prior to or at the point of mixing with the polymeric material melt stream/extrudate may be at least 400° C., at least 450° C., at least 500° C., between 450° C. and 500° C., or between 450° C. and 550° C.

The reaction mixture may be formed in an apparatus comprising a supercritical aqueous solvent injection zone. The ratio of average mass flow to pipe or pipe segment cross-sectional area in the supercritical water injection zone is more than 20,000 kg/m2/h more than 30,000 kg/m2/h, more than 40,000 kg/m2/h, more than 50,000 kg/m2/h, less than 80,000 kg/m2/h, between 30,000 and 60,000 kg/m2/h and if it is less than said ratio a manifold or sub-divided flow device is employed, each manifold leg or pipe sub-division including at least one supercritical water injection nozzle or spigot.

The temperature of the reaction mixture may be least 350° C., at least 370° C., at least 400° C., at least 425° C., between 360° C. and 410° C., at least 420° C., at least 440° C., at least 450° C., between 420° C. and 470° C., at least 470° C.

The reaction mixture may be treated at the reaction temperature and pressure for at least 10 minutes, at least 20 minutes, at least 30 minutes, at least 40 minutes, at least 50 minutes, at least 60 minutes, between 10 and 50 minutes, between 20 and 60 minutes, or between 30 and 50 minutes.

The product may comprise an oil and/or or wax oil with at least 70%, at least 75% at least 80%, at least 85%, at least 90% having a boiling point below 550° C. AE BP.

The product may comprises an oil and/or wax oil and/or wax with at least 30%, at least 40% at least 50%, at least 60% n-alkane content.

The product may comprise a diesel fuel with a cetane number of at least 50, at least 55, at least 60, at least 65, at least 70, at least 75, at least 80.

The product may comprise a wax with at least 40% by weight of the product having a boiling point above 360° C. AEBP. It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting.

Example 1: Hydrothermal Conversion of Plastic Polymers to Fuels and Waxes

In these Examples a slurry pump was used to transport the polymeric material into the reactor.

Example 1.1: Plastic Upgrading in Supercritical Water

Introduction

Polymers (plastics) mixed with lignocellulosic biomass (wood flour) were cracked in supercritical water to make hydrocarbon oils. The mixtures simulate processing of end-of-life (EOL) plastics, which are typically mixtures of different polymers contaminated with paper, cardboard and other materials. Low density polyethylene (LDPE), polypropylene (PP), and polystyrene (PS) were mixed in varying proportions to simulate EOL plastic mix and wood flour was added to simulate a mixture of paper and cardboard.

A continuous flow hydrothermal unit with a capacity of at least 36 fluid (slurry) litres per hour was used. This unit is referred to as 'Small Pilot Plant' or 'SPP'. The hydrothermal reactor arrangement and process is referred to as 'Cat-HTR'.

Process Outline

A simplified process flow diagram of the Cat-HTR is shown in Figure ten. Slurry starts at ambient temperature, and is heated to about 360° C. at the mixing piece by supercritical steam flow. The mixture is then further heated by electrical heaters 6, 4 and 5 until the desired reaction temperature is obtained and then pumped into the reactor shown by the concentric circles in Figure ten. The reactor consists of four legs of 2 inch nominal schedule 160, 310 stainless steel pipe, arranged vertically with the flow entering the bottom and exiting the top. Half-inch 310 stainless steel tube (2.1 mm thick) downcomers move the process fluid from the top of the previous leg to the bottom of the next. The height of each of the legs is 12 m, giving a total reactor length of 48 m and volume of 69 L. The outside of the reactor legs are wrapped in electrical resistance heat tracing and thick insulation. It will be evident to those skilled in the art that it is difficult to estimate a priori the residence time in such a reactor of a possibly multi-phase system. In the residence time based on plug flow of a fluid with the combined density of the polymer and the water is about 8 minutes. It is possible that under conditions of multi-phase flow that the water and the polymeric materials have different average residence times in the reactor.

Process slurry is batch mixed prior to pilot plant operation at required concentration Pilot plant is operated with three distinct modes; start-up, slurry injection and shut-down.

Start-up phase involves heating up the plant to reaction temperature and pressure using water in place of the plastic slurry.

Once process stability on water is reached, governed by temperature and pressure over plant, operating moves to the next phase of slurry injection, by switching from water to slurry pumping.

The slurry is injected in the mixing piece and mixed with supercritical water before going through another three heaters in series, before reaching the target temperature of about 440-445° C. The slurry then enters the reactor with a residence time of approximately 7 to 8 minutes.

Product passes through the pressure let-down station to product receival tank. Product may also be pumped to the secondary product tank. On-line gas-sampling occurs prior to the gas treatment unit.

Once desired amount of slurry has been injected, process fluid switches back to water and shut-down phase is initiated.

Shut-down phase allows for plant cool down and clearing of all product from process lines.

Feedstock Preparation

All plastics were milled and sieved to a particle size of less than 150 μm, with the exception of polystyrene, which was used at a particle size of less than 250 μm.

*Radiata* pine wood was milled and sieved to provide wood flour with a particle size less than 150 μm. Feedstocks used in this example set are shown in Table 3. The plastic powders were wetted with ethanol before slurrying in water in order to reduce their hydrophobicity and increase the ease of dispersion in water. The continuous phase of the slurry was about 10% by weight ethanol and 90% by weight water in the slurry storage tank.

TABLE 3

Starting Feedstock blends (weight % dry basis (db))

| | Run 1 | | Run 2 | | Run 3 | |
|---|---|---|---|---|---|---|
| | kg to feed tank (db) | % of dry feed | kg to feed tank (db) | % of dry feed | kg to feed tank (db) | % of dry feed |
| Polystyrene | 1.06 | 7.3 | 0 | 0 | 3.0 | 20 |
| Polypropylene | 7.35 | 50.5 | 7.07 | 46.7 | 6.0 | 40 |
| Low density Polyethylene | 2.10 | 14.4 | 3.00 | 20.0 | 1.0 | 6 |
| Wood Flour | 4.05 | 27.8 | 4.86 | 33.3 | 5.0 | 34 |
| Ethanol | 17.0 | | 23.0 | | 17.0 | |
| Water | 68.1 | | 58.67 | | 64.5 | |
| Total Solids | 14.6 | | 14.93 | | 15.0 | |
| Total Water | 68.6 | | 58.67 | | 64.5 | |

TABLE 3-continued

Starting Feedstock blends (weight % dry basis (db))

|  | Run 1 | | Run 2 | | Run 3 | |
| --- | --- | --- | --- | --- | --- | --- |
|  | kg to feed tank (db) | % of dry feed | kg to feed tank (db) | % of dry feed | kg to feed tank (db) | % of dry feed |
| Total to feed tank | 100.1 | | 96.60 | | 96.5 | |
| % Solids in slurry | 14.6 | | 15.23 | | 15.6 | |

Analysis of the wood flour used is given in Tables 4 and 5.

TABLE 4

Feedstock Proximate and Ultimate Analysis

| | Proximate Analysis | | | | Ultimate Analysis | | | | |
| --- | --- | --- | --- | --- | --- | --- | --- | --- | --- |
| Sample | Moisture (%) ar | Ash Yield | Volatile Matter | Fixed Carbon | C | H | N | S | O[1] |
| Radiata pine | 6.2 | 0.3 | 86.2 | 13.5 | 51.3 | 6.4 | <0.01 | 0.01 | 42 |
| Plastic-wood mix Run 1 | 1.6 | 0.3 | | | 76.6 | 11.9 | 0.04 | 0.02 | 11.2 |

All values are given as a weight % db (dry basis) unless otherwise noted
[1]Calculated by difference

TABLE 5

Feedstock ash composition

| | SiO$_2$ | Al$_2$O$_3$ | Fe$_2$O$_3$ | TiO$_2$ | K$_2$O | MgO | Na$_2$O | CaO | SO$_3$ | P$_2$O$_5$ |
| --- | --- | --- | --- | --- | --- | --- | --- | --- | --- | --- |
| Radiata pine | 8.3 | 1.6 | 3.2 | 0.14 | 13.8 | 4.9 | 0.7 | 28.9 | 1.1 | 4.4 |
| Plastic-wood mix Run 1 | 10.0 | 11.5 | 5.2 | 29.2 | 6.4 | 4.2 | 3.7 | 12.7 | 2.9 | 2.1 |

| | BaO | SrO | CuO | MnO | Cr$_2$O$_3$ | ZnO | V$_2$O$_5$ | Co$_3$O$_4$ | NiO |
| --- | --- | --- | --- | --- | --- | --- | --- | --- | --- |
| Radiata pine | 0.4 | 0.1 | <0.1 | 4.0 | <0.1 | 0.5 | <0.1 | <0.1 | <0.1 |
| Plastic-wood mix Run 1 | 0.02 | 0.03 | 0.03 | 0.59 | 0.02 | 3.8 | <0.01 | 0.02 | 0.01 |

All values are given as a weight % oxide in ash on a dry basis

Hydrothermal Cracking

Processing conditions were as shown as in Table 6

TABLE 6

Processing Conditions

| Run # | Pressure Range (barg) | Temperature (° C.) | Slurry Concentration. (% db) |
| --- | --- | --- | --- |
| 1 | 240-280 | 440 | 14.0 |
| 2 | 240-280 | 445 | 15.2 |
| 3 | 240-280 | 440 | 17.0 |

Products of Hydrothermal Cracking

Products from the hydrothermal cracking of feed were gases/vapours, a waxy hydrocarbon oil, and an aqueous phase containing organic and inorganic dissolved materials. A small amount of solid hydrocarbon material consisting of polymers nut fully cracked into an oil phase was also recovered.

The organic material contained in the aqueous phase also constitutes an emulsified and/or dissolved hydrocarbon phase that can be recovered by various means known in the art including liquid-liquid extraction (LLE) with solvents. Diethyl ether was used for LLE of the hydrocarbons dissolved in the aqueous phase.

The approximate relative distribution of products obtained is given in Table 7.

TABLE 7

Product Distribution

| | Run # | | |
| --- | --- | --- | --- |
| | 1 | 2 | 3 |
| Oil | 55 | 57.3 | 52.8 |
| Gas | 20 | 12 | 16.6 |
| Oil from aqueous phase by LLE | 14 | 20 | 21 |
| Other aqueous solutes | 1 | 0.7 | 0.6 |
| Partly cracked polymers (waxy solids) | 10 | 10 | 9 |
| Total | 100 | 100 | 100 |

Properties of the Products

Certain properties of the oil product are shown in Table 8. GCV stands for gross calorific value. The high calorific value of the oil indicates that is composition is dominated by paraffinic hydrocarbons. For example the calorific value of dodecane is 47.47 MJ/kg.

TABLE 8

Oil Gross Calorific Value

| Run # | GCV (MJ/kg) |
|---|---|
| 1 | 45.0 +/- 1.5 |
| 2 | 46.0 +/- 1.0 |
| 3 | 44.7 +/- 0.5 |

Certain properties of the aqueous phase are shown in Table 9.

TABLE 9

Aqueous phase product parameters

| Parameter | Unit | Run #1 |
|---|---|---|
| Benzene | µg/l | 290 |
| Toluene | µg/l | 9500 |
| Ethylbenzene | µg/l | 24000 |
| m/p-xylene | µg/l | <500 |
| o-xylene | µg/l | <250 |
| naphtalene | µg/l | <250 |
| Total BTEX | µg/l | 34,000 |
| TRH C6-C10 | µg/l | 84000 |
| TRH C6-C9 | µg/l | 83000 |
| TRH C6-C10 minus BTEX | µg/l | 50000 |
| TRH C10-C14 | µg/l | 74000 |
| TRH C15-C28 | µg/l | 87000 |
| TRH C29-C36 | µg/l | 13000 |
| TRH C37-C40 | µg/l | 4500 |
| Total PAH | µg/l | <20 |
| Biological Oxygen Demand BOD5 | mg/l | 62,000 |
| Chemical Oxygen Demand | mg/l | 78,000 |
| Total Organic Carbon | mg/l | 24,000 |
| Total Dissolved Solids | mg/l | 1,400 |
| pH | | 3.7 |
| Chloride | mg/l | 4.8 |
| Total Sulphur | mg/l | 4.0 |
| Calcium | mg/l | 3.6 |
| Magnesium | mg/l | 0.7 |
| Sodium | mg/l | 14 |
| Potassium | mg/l | 7.3 |

Certain properties of the gas phase on a dry, air free basis are shown in Table 10. Compositions in volume %.

TABLE 10

Gaseous phase compositions, dry, air free volume % basis

| Run # | CO | $CO_2$ | $H_2$ | $H_2S$ | Methane | Ethane | Propane | Butane | Pentane |
|---|---|---|---|---|---|---|---|---|---|
| 1 | 17.72 | 40.59 | 1.87 | <0.1 | 16.5 | 3.98 | 0.87 | 3.85 | 2.58 |

The gas is notable for its high calorific value based on its components and could readily be burned to provide process energy.

The gas is notable for its high calorific value based on its components and could readily be burned to provide process energy.

Boiling Range of the Oil Product

Figure eleven shows simulated distillation (SIMDIS) boiling curves by gas chromatograph for the oil product from runs 1 and 2 of Example 1.1.

Example 1.1.1

In this example the feedstock was a mixed waste plastic from a paper recycling facility in the UK, containing significant amounts of paper, cardboard and other non-plastic matter. The estimated composition of the feedstock is shown in Table 11. The estimated conversion to products is shown in Table 12. Db— dry basis, a/r as received basis.

The unknown products include water, unidentified water soluble compounds and products lost to the apparatus surface area.

TABLE 11

Estimated composition and product split of waste plastic feed containing cellulosic polymers

| Moisture % a/r | 4.0 |
|---|---|
| Ash % db | 6.6 |
| Volatile Matter % db | 84.5 |
| Fixed Carbon % db | 8.9 |
| Carbon % db | 60.1 |
| Hydrogen % db | 8.4 |
| Sulphur % db | 0.11 |
| Chlorine % db | 1.0 |
| Nitrogen % db | 0.12 |

TABLE 12

Estimated composition and product split of waste plastic feed containing cellulosic polymers.

| | Feed Composition % db | Products % db |
|---|---|---|
| Plastic | 58.4 | |
| Cellulose (paper etc.) | 35 | |
| Ash (inorganic material) | 6.6 | |
| Sum | 100 | |
| Synthetic crude | | 44 |
| Partly converted plastic and ash | | 11 |
| Gas | | 15 |
| Water soluble organics | | 8 |
| Unknown | | 22 |
| Sum | | 100 |

The boiling point distribution of the synthetic crude oil product is by simulated distillation using gas chromatography is shown in Figure twelve. Analysis of the heavy naphtha fraction of the product showed it contained approximately 50% paraffins and iso-paraffins, and 50% napthenes and aromatics.

Example 1.2

In this Example a modified version of the apparatus shown in Figure two of Example 1.1 was used. The reactor unit in Figure two, was replaced by a different unit termed the heated reactor array (HRA). The HRA consisted of 9 horizontally mounted reactor tubes of approximately 4 inch (10 cm) internal diameter linked by 180 degree coupling tubes. The reactor tubes could be decoupled if desired so that from 1 to 9 reactor tubes in series could be used to vary the residence time in the reactor tube array. The HRA was trace heated by means of enclosing the HRA in a box, the air in which was heated by a natural gas burner/blower to the reaction temperature. This enabled the reaction mixture to pass through the array without appreciable cooling due to heat loss to ambient. An external view of the HRA is shown in Figure thirteen.

Feedstock Preparation

All plastics were milled and sieved to a particle size of less than 150 µm, with the exception of polystyrene, which was used at a particle size of less than 250 µm.

The plastic powders were wetted with ethanol before slurrying in water in order to reduce their hydrophobicity and increase the ease of dispersion in water. The continuous phase of the slurry was about 10% by weight ethanol and 90% by weight water in the slurry storage tank.

Example 1.2.1

In this Example the feed was 85% polyethylene (HDPE) and 15% polystyrene. The polymers were locally sourced injection moulding grades and contained additives such as fillers and colourants. The reaction temperature was 440-450 C, the reaction pressure was 280-300 bar and the residence time was 20-25 minutes.

The feedstock was converted to a yellowish wax-oil that floated on top of the water phase in the product collection tank. The oil was fractionally distilled and the diesel boiling range fractions of the oil were found to contain predominantly high cetane number paraffins and olefins with some di-aromatic compounds derived presumably from polystyrene. Figure fourteen shows total ion chromatograms by GCMS of three fractions separated by fractional distillation. The three fractions, numbered 5, 6 and 7 boil approximately within the diesel boiling range. Figure fourteen shows the composition is dominated by alkenes and n-alkanes. The major components appear as a doublet of peaks, each doublet having one more carbon atom in the chain. The peak in the doublet with the lower retention time is an alkene, probably a 1-alkene, the peak with the higher retention time is an n-alkane. Figure fifteen shows a more detailed analysis of Fraction 6, including boiling points and cetane numbers associated with the assigned peaks. It can be seen from Figure fifteen that the diesel boiling range part of the product can be expected to have a very high overall cetane number. For comparison the minimum cetane number for diesel fuel meeting the EN 590 diesel standard is 51 units. Figure sixteen shows the overall boiling curve of the product as obtained by vacuum distillation according to the ASTM D1160 method.

While not being bound by theory, it is probable that polymers such as polystyrene more readily undergo thermolysis at a given temperature than polyethylene, and that in mixed polymer systems, the radicals formed from polystyrene thermolysis help to initiate cracking of more thermally stable polymers such as polyethylene. It is also probable from the lack of clear evidence of cross-reaction products between PE and PS that the presence of supercritical water favours the formation of intramolecular thermolysis products over intermolecular species.

Example 1.2.2

In this Example the feed was 100% polyethylene (HDPE). The polymer was a locally sourced injection moulding grade and contained additives such as fillers and colourants. The reaction temperature was 440-450 C, the reaction pressure was 280-300 bar and the residence time was 20-25 minutes.

The feedstock was converted to a yellowish wax-oil that floated on top of the water phase in the product collection tank. The oil was fractionally distilled and the diesel boiling range fractions of the oil were found to contain predominantly high cetane number paraffins and olefins. Figure seventeen shows total ion chromatograms by GCMS of three fractions separated by fractional distillation. The three fractions, numbered 7, 8 and 9 boil approximately within the diesel boiling range. Figure seventeen shows the composition is dominated by alkenes and n-alkanes. The major components appear as a doublet of peaks, each doublet having one more carbon atom in the chain. The peak in the doublet with the lower retention time is an alkene, probably a 1-alkene, the peak with the higher retention time is an n-alkane. Figure eighteen shows a more detailed analysis of Fraction 8, including boiling points and cetane numbers associated with the assigned peaks. It can be seen from Figure eighteen that the diesel boiling range part of the product can be expected to have a very high overall cetane number. For comparison the minimum cetane number for diesel fuel meeting the EN 590 diesel standard is 51. Figure nineteen shows the overall boiling curve of the product as obtained by vacuum distillation according to the ASTM D1160 method.

Table 13 shows the density of certain middle distillate fractions from Example 1.2.1 measured at 23.5+/−1 degrees C.

TABLE 13

Densities of Distilled Fractions Example 1.2.1

| | Boiling Point AEBP degrees C. | | |
|---|---|---|---|
| Fraction # | Lower | Upper | Density g/ml |
| 5 | 252 | 288 | 0.8184 |
| 6 | 288 | 320 | 0.827 |
| 7 | 320 | 350 | 0.8334 |
| 8 | 350 | 387 | 0.8332 |

Table 14 shows the density of certain middle distillate fractions from Example 1.2.1 measured at 23.5+/−1 degrees C.

TABLE 14

Densities of Distilled Fractions Example 1.2.2

| | Boiling Point AEBP degrees C. | | |
|---|---|---|---|
| Fraction # | Lower | Upper | Density g/ml |
| 7 | 283.7 | 305.8 | 0.7997 |
| 8 | 305.8 | 325.7 | 0.8042 |
| 9 | 325.7 | 345.6 | 0.8083 |
| 10 | 345.6 | 365.4 | 0.8123 |

Example 2: Use of an Extruder to Extrude Polymer

Polymer was extruded at a die pressure of about 280 bar and a barrel temperature of 250° C. In this example the extruded material was not fed to a hydrothermal reactor.

Example 2 demonstrates that an extruder can deliver a steady controllable flow of polymer melt at a temperature of about 250° C. and a pressure of about 280 bar, suitable for feeding into a hydrothermal reactor.

The extruder had the following features:

Extruder Description
- Single screw extruder designed and manufactured by Telford Smith Engineering Pty Ltd.
- 75 mm barrel with a 34/1 length to diameter ratio.
- One piece bimetallic Xalloy barrel fitted with seven independent heating/cooling zones with control thermocouples.
- Seven independent 6 kW heating elements.
- Stainless steel hopper and water cooled crammer.
- 61 kW drive motor and reduction gear box producing a maximum screw revolution capability of 129 RPM.
- Gross weight 1.2 tonnes
- Design temperature of 300° C. and pressure of 10,000 PSI (690 bar)

Example 2.1

The extruder was fitted with a die terminating in a capillary tube of ⅜" diameter. The capillary tube lengths could be varied to provide different back-pressures. The capillary lengths tested were 110 mm, 180 mm and 220 mm. Extruder feed was HDPE pellets (10-20 mm, sourced from Astron Plastics Group and used to simulate pellets of waste plastic with high PE content. The HDPE was extruded at a barrel temperature of 250 C. For some experiments an additional clamp-on heater was added onto the extruder die to prevent the plastic cooling between the extruder barrel end and the exit of the capillary to ambient air temperature.

The screw turning speed was varied with the different capillaries in place to assess the effect on the flow rate of extruded polymer at different back-pressures. For example, using the 110 mm capillary the 20 rpm extruder speed gave a flowrate of approximately 25 kg/h and pressure of around 2200 psi (152 bar) and the 220 mm capillary gave a flowrate of about 22 kg/h and 4100 psi (282 bar) at the same screw speed. Here the pressure was measured near the extruder exit, at the end of the screw.

TABLE 15

Screw speed impact on pressure and flow rate, 220 mm capillary at 250° C.

| Extruder Speed (rpm) | Crammer Speed (rpm) | Melt Pressure (psi) | Flowrate (kg/h) |
|---|---|---|---|
| 10 | 1.5 | 3000 | 12.2 |
| 20 | 3.5 | 4100 | 22.1 |

TABLE 16

Screw speed impact on pressure and flow rate, 180 mm capillary at 250° C.

| Extruder Speed (rpm) | Crammer Speed (rpm) | Melt Pressure (psi) | Flowrate (kg/h) |
|---|---|---|---|
| 10 | 1.5 | 2700 | 10.8 |
| 20 | 3.5 | 3200 | 21.4 |
| 30 | 4 | 3600 | 30.7 |
| 40 | 4.5 | 3950 | 39.8 |

Example 2.2

The variation of melt pressure along the length of the extruder from crammer interface to near the exit point was measured at 40 rpm screw speed with Capillary length 180 mm and 250 C melt temperature. The results are shown in Table 17.

TABLE 17 variation of melt pressure down extruder screw

| | Distance down extruded screw (mm from crammer interface) | | |
|---|---|---|---|
| | 250 | 2000 | 2350 |
| Melt pressure/psi | 1250 | 2800 | 4000 |

Example 3: Extrusion of Waste Plastic for Upgrading Using Supercritical Water

Example 3 is prophetic. Figure one shows a process flow diagram according to an embodiment of the invention In this Example the feedstock e.g. pelletized waste plastic containing about 85% polyethylene with the balance being mainly polypropylene and/or polystyrene, with a moisture content of about 0.5% by weight, will be fed into the extruder where it will be heated and pressurized, forming a molten polymer stream that will then be mixed with supercritical water at the mixing piece.

The mass flow rate of the feedstock can be optionally maintained by metering pellets into the extruder hopper. The outlet temperature of the extruder will be controlled by varying the barrel heating element temperatures. The mixing temperature will be varied by altering the temperature of the super critical water injection stream. The residence time can be optionally adjusted by controlling the flow rate of the super critical water stream using a positive displacement pump via adjustment of a variable frequency drive. The process pressure can be optionally varied or example by adjusting a control valve, or by selecting fixed orifices of different sizes according to back-pressure required, or by selecting capillary tube outlets of varying diameters and lengths. The optional selection of fixed orifice nozzles or capillaries can be by means of a diverter valve or selector valve.

Heat recovery can optionally be achieved by utilising e.g. a thermal oil recirculation system which will recover heat from the reaction mixture as it exits the reactor, the heat can then be used to heat the extrusion system and to pre-heat water prior to supercritical water generation step.

In one embodiment of the method according to this process the feedstock will be extruded at about 250° C. and 300 bar and the supercritical water will be mixed at about 500° C., such that the average composition of the mixed stream near the mixing piece will be 30% by weight water and 70% by weight plastic and the temperature will be about 380° C. and the pressure is about 300 bar. The mixed stream will then be heated to about 450° C. in the fired indirect heater. For example the fired indirect heater is a fluidized bed heater heated by natural gas. The reaction mixture will then be passed through a tube or multi-tube reactor to provide a residence time for the cracking reactions to occur. It will be evident to those skilled in the art that it is difficult to estimate a priori the residence time of a possibly multi-phase system. For example the residence time based on plug flow of a fluid with the combined density of the polymer and the water might be about 25 minutes. The temperature at the entrance to the reactor might be 450° C. and at exit might be about 430° C. Under these conditions the polymers in the feed will be converted into a synthetic crude oil as exemplified in Example 1. Upon depressurization and cooling the synthetic crude oil will separate from the water in the flash tank and float on the water, being of lower density that water. Gas and vapour will also be separated at this point. The gas will be calorific and can be combusted to provide energy to the process. The separation of the two liquid phases can be further improved by use of, for example, a centrifuge. The oil phase can be subjected to further processing, for example it can be distilled to provide fractions such as naphtha, middle distillates, heavy gas oils and vacuum gas oils, and waxes.

Waxes and partly converted polymers may optionally be recycled as feed to the front of the process for further cracking. Naphtha and other fractions may optionally be added to the reaction mixture, for example by injection after the extruder barrel or after the mixing piece, to act as solvents to lower the fluid viscosity and modify the phase behaviour.

Table 18 shows a possible mass and energy balance for such a process.

hydrothermal reactor system, effectively isolating the two units from one another. The polymer melt can then pass to a water injection system (6) (Detail A). This may consist of two 'halo' devices, the first being for injecting ambient temperature water, or other liquids, for start-up, commissioning, cleaning and control purposes. The second device can be for injecting supercritical water or superheated steam to provide an aqueous medium for the hydrothermal cracking reactions, and can also be for increasing the temperature of the polymer melt. The injection can be accomplished by means of quill pipes extending from the halo into the main pipe (internal detail not shown). The quill pipes can terminate in a curve such that the direction of injection is approximately in the same direction as the melt flow.

The reaction mixture can then pass via a series of spool pipes (7)-(10) to a heater (12) that can increase the temperature of the reaction mixture to the desired temperature. Some of the spool pipes may optionally contain inserts that

TABLE 18

Mass and Energy Balance

| Stream | Stream name | Water kg/h | Plastic kg/h | WSO kg/h | NCG kg/h | Light oil kg/h | Oil kg/h | Flow Total kg/h |
|---|---|---|---|---|---|---|---|---|
| 1 | Feedstock into extruder | 0 | 2530 | 0 | 0 | 0 | 0 | 2530 |
| 2 | Melt out of extruder | 0 | 2530 | 0 | 0 | 0 | 0 | 2530 |
| 3 | SCW inlet | 1084 | 0 | 0 | 0 | 0 | 0 | 1084 |
| 4 | SCW injection | 1084 | 0 | 0 | 0 | 0 | 0 | 1084 |
| 5 | Mixing piece | 1084 | 2530 | 0 | 0 | 0 | 0 | 3614 |
| 6 | Direct heater outlet | 1084 | 2530 | 0 | 0 | 0 | 0 | 3614 |
| 7 | Reactor outlet | 1084 | 0 | 253 | 253 | 1518 | 506 | 3614 |
| 8 | Cooler outlet | 1084 | 0 | 253 | 253 | 1518 | 506 | 3614 |
| 9 | Cool back to ambient (bal) | 1084 | 0 | 253 | 253 | 1518 | 506 | 3614.0 |

| Stream | Temp °C. | Pressure barg | E-Water kW | E-Plastic kW | E-Products kj/kg | E-Total kj/kg | Δ E kW | |
|---|---|---|---|---|---|---|---|---|
| 1 | 20 | 0 | 0 | 27.0 | 0 | 27 | | |
| 2 | 250 | 300 | 0 | 487.4 | 0 | 487 | 460 | Extruder duty |
| 3 | 20 | 0 | 25 | 0.0 | 0 | 25 | | |
| 4 | 500 | 300 | 928 | 0.0 | 0 | 928 | 903 | SWC Duty |
| 5 | 379.9 | 300 | 553 | 859.7 | 0 | 1413 | | |
| 6 | 450 | 300 | 849 | 1112.3 | 0 | 1961 | 548 | Direct heater duty |
| 7 | 430 | 300 | 801 | 0.0 | 1040 | 1841 | −120 | Heat loss from reactor |
| 8 | 260 | 300 | 342 | 0.0 | 514 | 855 | −986 | Cooler duty |
| 9 | 20 | 0 | 25 | 0.0 | 27 | 52 | | |

Example 4: Apparatus for Extrusion Polymeric Material and Updgrading by Hydrothermal Treatment Example 4 shows a design for a coupling between extruder and hydrothermal reactor suitable for the method. Figure twenty shows aspects of the design including the following features:

The polymer melt can exit the extruder (1) via a dog-leg delivery spool (3) with suitable high-pressure couplings. The dog-leg can be designed so that the extruder can easily be decoupled from the rest of the apparatus for maintenance. The polymer melt can then pass to a diverter valve (5) having in this configuration one inlet and two outlets. The second outlet is not shown but can serve to divert the polymer melt flow vertically downwards. The diverter valve can therefore be used to divert the melt away from the promote mixing of the water-polymer mixture. For example such inserts may be in spool pipe (7) as illustrated in detail B, and/or in spool pipe (10). The inserts may be metals spirals or other shapes known in the art. For example StaMixCo X Grid Static Mixer http://www.stamixco.com/xgrid.php inserts or CHEMPLANT static mixers https://www.cem-int.com.au/wp-content/uploads/2010/11/Static-Mixer-20-08-2012.pdf are suitable for the purpose. Alternatively an engineered static mixer known in the art in the plastic extrusion industry, with section mixing elements which can be added and subtracted, and integrated heat tracing, may be employed, e.g. http://www.stamixco.com/injection.php The spool pipes and unions may be electrically trace heated (not illustrated) to reduce heat loss from the polymer melt/reaction mixture to ambient and also to allow preheating of the apparatus to assist start-up operations.

Example 5: Precipitation and Removal of Metal Halides as Solids Under Basic Conditions Commercial-and-industrial (C&I) polyethylene (PE)-rich pelletized waste plastic was sourced locally. The chlorine content was measured as <0.05%. PVC pellets (virgin extrusion grade containing 48.5% chlorine by weight) were carefully added and uniformly mixed with C&I pellets at 89 g per 10,000 g. The overall chlorine content of the feed was 0.43% w/w. Sodium carbonate pellets of very low chloride content were added to the feed. The amount of sodium carbonate was sufficient to neutralize all of the hydrogen chloride potentially generated on a stoichiometric basis if all of the chlorine in the feed were to be converted to hydrogen chloride.

The feed polymeric material was processed according to the methods of the invention using the apparatus described in Figure nine. The processing conditions were as shown in Table 19 below.

TABLE 19

Processing Conditions

| | |
|---|---|
| mass % polymeric feed extruded to mixing piece, dry basis | 50 |
| mass % supercritical water added at mixing piece | 50 |
| extruder exit temperature, deg C. | 350 |
| supercritical water temperature at mixing piece, deg C. | 500 |
| process heater entry temperature, after mixing piece, deg C. | 380-390 |
| process heater exit temperature, deg C. | 460 |
| Reactor temperature, deg C. | 445-450 |
| Pressure, bar | 240-250 |
| Average residence time, minutes | 30-40 |

The retention time for the cracking reaction was facilitated by three horizontally oriented reactor legs (Figure nine). Due to multiphase flow observed under the reaction conditions there is an equilibration period during which the horizontal reactors fill with reaction mixture. The end of this equilibration period is evidenced by a sharp increase in the density of the product mixture leaving the reactor and passing through the cooler as measured on a mass-flow meter. At this point the flows of feed into the extruder and out of the pressure let down device are matched. After this point was reached approximately 30-60 minutes of the product flow were diverted to a capture tank (Figure nine) fitted with a condenser and gas sampling points. After this the flow was re-directed to the large product tank (Figure nine), and then the experiment was concluded by shutting down the extruder feed and flushing the system with supercritical and then subcritical water.

At the conclusion of the experiment there were two tanks both containing product oil and process water, the large product tank (Figure nine) containing start-up, mid-stream and shut-down oil and water products, and the capture tank (Figure nine), containing an equilibrium mid-stream product sample.

Comparative chlorine analysis of the large product tank and capture tank showed that almost all of the chlorine in the feed was found as chloride in the water phases of the tanks. Hypochlorite, chlorite, chlorate free chlorine and perchlorate species were below quantitation thresholds of ~3-5 mg/l, where chloride was present at around 300 mg/L. Moreover, although 30% of the feed plastic was directed to the capture tank and 70% to the large product tank, only 4.6% of the chloride ions were in the capture tank vs 95.4% in the large product tank and only 8.4% of the sodium ions were in the capture tank vs 91.6% in the large product tank. The pH of the water in the capture tank was 2.4, in the large product tank it was 4.6.

As the large product tank was the only tank to receive material flushed from the process with subcritical water, in which metal chlorides are much more soluble than in low-density supercritical water, this indicates that metal chlorides formed in the reactors under supercritical water condition and precipitated as solids, which remained in reactors until they were re-dissolved in subcritical water at the flushing stage and carried to the large product tank.

This indicates that in continuous operation of a commercial process, concentrations of halogens and halides to which materials of construction are exposed, particularly in the subcritical parts of the plant after the cooler, can be substantially reduced by adding base followed by periodic blow-down of solids from the supercritical part of the reactor. The halogens and halides, if not removed, would cause corrosion in downstream parts of the plant, especially in regions where water was present at subcritical conditions.

The blow down of vertical reactors can also be used to remove ash and particulates, originating e.g. from fillers and other property modifiers contained in polymeric feeds, from vertical reactors during continuous operation.

In an example of this several kilograms of finely divided light brown solids having gross calorific value 11 MJ/kg dry basis were removed from the bottom of a horizontal reactor tube after some weeks of operation. The solids had an ash content of about 60% by weight dry basis. The solids were composed mainly of inorganic fillers such as silica, calcium carbonate, aluminosilicates and carbon black used in polymer technology.

Chlorine content of the waxy oil product was <0.05% by weight. A middle distillate fraction contained 49 ppmw chlorine by XRF analysis.

The waxy oil was distilled into fractions using a vacuum distillation method approximating ASTM D1160. The boiling curve for the distillation is shown in Table 20 below.

TABLE 20

D1160-type distillation of waxy oil product - boiling range data

| AEBP Start of cut deg C. | AEBP end of cut deg C. | Cumulative mass % in fractions |
|---|---|---|
| IBP | 152.2 | 4.0 |
| 152.2 | 242.3 | 13.1 |
| 242.3 | 300.3 | 22.4 |
| 300.3 | 340.1 | 31.8 |
| 340.1 | 381.2 | 41.3 |
| 381.2 | 426.0 | 51.4 |
| 426.0 | 469.6 | 61.1 |
| 469.6 | 510.3 | 70.4 |
| 510.3 | 563.9 | 78.6 |
| >564 | | 100.0 |

Product components were, on a percent dry feed basis: calorific gas 13%, waxy oil 82%, water-soluble compounds 3%, unaccounted 2%. The calorific gas had the composition shown in Table 21.

TABLE 21

Composition of calorific gas, normalised to exclude O, N, Ar, He

| Component | vol % |
|---|---|
| hydrogen | 4.6 |
| methane | 12.3 |

TABLE 21-continued

Composition of calorific gas, normalised to exclude O, N, Ar, He

| Component | vol % |
|---|---|
| carbon dioxide | 3.1 |
| carbon monoxide | 0.7 |
| methane | 13.5 |
| ethylene | 1.2 |
| ethane | 17.3 |
| acetylene | <0.02 |
| propylene | 4.3 |
| propane | 17.3 |
| i-butane | 0.6 |
| butane | 9.7 |
| pentanes | 8.1 |
| hexanes | 3.4 |
| heptanes | 2.6 |
| octanes | 1.0 |
| nonanes and decanes | 0.5 |

The calorific gas was analysed for halogen-containing compounds. Of the following analytes; chlorine, hydrogen chloride, Freon 12, Freon 11, Freon 113, Freon 114, Methyl chloride, Vinyl chloride,1,1-dichloroethene, cis 1,2-dichloroethene, trans 1,2-dichloroethene,1,1-dichloroethane, 1,2-dichloroethane, dichloromethane, chloroform, carbon tetrachloride, 1,1,1-trichlorethane, 1,1,2-trichlorethane, bromodichloromethane, dibromochloromethane, bromoform, trichloroethene, tetrachloroethene, trans 1,2-dichloroethene, 1,1-dichloropropane, cis 1,2-dichloropropene, trans 1,2-dichloropropene, hexachlorobutadiene, chlorobenzene, dichlorobenzenes, trichlorobenzenes, tetrachlorobenzenes; only Freon 12 (~50 ppb normalized) and tetrachloroethene (~110 ppb normalized) were detected above the practical quantitation limit of 0.5 ppb. Freon 12 and tetrachloroethene are both likely to have arisen from environmental contamination.

GCMS analysis of product water for over 50 common halogenated volatile and semi-volatile compounds including the analytes above, found no halogenated compounds at concentrations above the practical quantitation limit of 0.05 ppmw.

Example 6: Generation of Wax Products

Commercial-and-industrial (C&I) polyethylene (PE)-rich pelletized waste plastic was sourced locally. The chlorine content was measured as <0.05% by weight. The feed polymeric material was processed according to the methods of the invention using the apparatus described in Figure nine. The processing conditions were as shown in Table 22 below.

TABLE 22

| processing conditions | |
|---|---|
| mass % polymeric feed extruded to mixing piece, dry basis | 60 |
| mass % supercritical water added at mixing piece | 40 |

TABLE 22-continued

| processing conditions | |
|---|---|
| extruder exit temperature, deg C. | 340 |
| supercritical water temperature at mixing piece, deg C. | 490 |
| process heater entry temperature, after mixing piece, deg C. | 370-380 |
| process heater exit temperature, deg C. | 460 |
| Reactor temperature, deg C. | 430-440 |
| Pressure, bar | 230-240 |
| Average residence time, minutes | 30-40 |

The product oil was vacuum distilled to obtain four wax fractions, which were not further treated to remove oil components, with properties measured as follows:

TABLE 23

| product characteristics | | | | |
|---|---|---|---|---|
| BP range AEBP start | 375 | 404 | 438 | 470 |
| Finish | 404 | 438 | 470 | 511 |
| Congealing point | 31.5 | 39.8 | 48.2 | 54.9 |

NB: all temperatures are in degrees Celcius

Example 7: Generation of Waxy Oil Products

End-of-life waste plastic material was sourced from waste management facilities in the United Kingdom. The material was sorted with magnets to remove magnetic metals, and with an eddy current sorter to remove non-magnetic metals e.g. aluminium. The material was sorted to remove chlorine-containing polymers using commercially available infra-red based sorting equipment. The material was shredded and pelletized. The composition of the pelletized material is shown in Table 24.

TABLE 24

Analysis of Pelletized End-of-Life Plastic Feedstock after Pre-treatment

% dry basis except moisture – % as received. Oxygen by difference

| Description | Moisture | Ash Yield | Volatile Matter | Fixed Carbon | C | H | N | S | Cl | O |
|---|---|---|---|---|---|---|---|---|---|---|
| Pelletised | 5.8 | 4.2 | 95.5 | 0.4 | 84.1 | 15.5 | 0.37 | 0.04 | <0.05 | <0.1 |

The pelletized material was processed by cracking in supercritical water using the apparatus shown in Figure nine. The conditions of the processing were as shown below in Table 25 below.

TABLE 25

| processing conditions | |
|---|---|
| mass % polymeric feed extruded to mixing piece, dry basis | 22 |
| mass % supercritical water added at mixing piece | 78 |
| extruder exit temperature, deg C. | 275 |
| supercritical water temperature at mixing piece, deg C. | 420 |
| process heater entry temperature, after mixing piece, deg C. | 390-400 |
| process heater exit temperature, deg C. | 450 |
| Reactor temperature, deg C. | 430-440 |
| Pressure, bar | 230-260 |
| Average residence time, minutes | 20-30 |

The products were calorific gas and light hydrocarbons (5% yield), waxy oil, (90% yield) and water containing some dissolved organic material. Yields are weight % expressed on a dry polymeric feed basis. The waxy oil was distilled into fractions using a vacuum distillation method approximating ASTM D1160. The boiling curve for the distillation is shown in Table 26.

TABLE 26

D1160-type distillation of waxy oil product - boiling range data

| AEBP Start of cut deg C. | AEBP end of cut deg C. | Cumulative mass % in fractions |
|---|---|---|
| IBP | 170.2 | 5.7 |
| 169.8 | 237.0 | 12.6 |
| 230.3 | 263.0 | 19.5 |
| 261.2 | 293.6 | 26.7 |
| 291.0 | 327.7 | 34.0 |
| 325.0 | 356.6 | 41.3 |
| 354.2 | 386.4 | 48.5 |
| 382.7 | 411.4 | 55.3 |
| 405.1 | 434.4 | 62.4 |
| 427.5 | 465.3 | 69.6 |
| 463.5 | 490.3 | 76.6 |
| >490.3 | | 100.0 |

Properties of the waxy oil and the residue from the D1160-type vacuum distillation are shown in Table 27.

TABLE 27

Chemical properties of Waxy Oil product and residuum from vacuum distillation.

| | | | |
|---|---|---|---|
| Waxy Oil | Chlorine by combustion | <500 | ppm |
| | Carbon content | 85.6 | Wt % |
| | Hydrogen content | 14.0 | Wt % |
| | Nitrogen content | <0.01 | Wt % |
| | Ash content | 0.02 | Wt % |
| Vacuum Residuum | Chlorine by combustion | <500 | ppm |
| | Carbon content | 85.0 | Wt % |
| | Hydrogen content | 13.8 | Wt % |
| | Nitrogen content | <0.01 | Wt % |
| | Ash content | 0.04 | Wt % |

A diesel boiling range sample of distillate was obtained by ASTM D2892 distillation with target cut points of 230° C. to 360° C. Properties of the fraction are given in Table 28.

TABLE 28

Properties of diesel boiling range hydrocarbons from end-of-life plastic feedstock

| Property | Value | Unit | Method |
|---|---|---|---|
| Density at 15° C. | 0.8073 | Kg/l | ASTM D4052 |
| Ash | 0.002 | % | ASTM D482 |
| Cetane Index | 75.9 | | ASTM D4737(A) |
| Derived Cetane Number | >64 | | ASTM D6890 |
| Copper Corrosion | 1a | | ASTM D130 |
| Carbon content | 86.77 | Wt % | ASTM D5291 |
| Hydrogen content | 13.95 | Wt % | ASTM D5291 |
| Kinematic viscosity | 2.83 | mm2/s | ASTM D445 |
| Nitrogen | 100 | mg/kg | ASTM D4629 |
| Sulphur | 23 | mg/kg | ASTM D5453 |
| Mono-aromatics | 6.6 | % m/m | IP 391 |
| Di-aromatics | 1.7 | % m/m | IP 391 |
| Tri+-aromatics | 0.2 | % m/m | IP 391 |
| Polycyclic aromatics | 1.9 | % m/m | IP 391 |
| Total Aromatics | 8.5 | % m/m | IP 391 |
| Acid number | 1.25 | mg KOH/g | ASTM D664 A |
| Chlorine | 20 | ppmw | XRF |

Example 8: Generation of Waxy Oil Products

Commercial-and-industrial (C&I) polyethylene (PE)-rich pelletized waste plastic was sourced locally. The chlorine content was measured as <0.05% by weight.

The feed polymeric material was processed according to the method of the invention using the apparatus described in Figure nine. The processing conditions were as shown in Table 29.

TABLE 29 processing conditions

| | |
|---|---|
| mass % polymeric feed extruded to mixing piece, dry basis | 60 |
| mass % supercritical water added at mixing piece | 40 |
| extruder exit temperature, deg C. | 340 |
| supercritical water temperature at mixing piece, deg C. | 490 |
| process heater entry temperature, after mixing piece, deg C. | 370-380 |
| process heater exit temperature, deg C. | 460 |
| Reactor temperature, deg C. | 430-440 |
| Pressure, bar | 230-240 |
| Average residence time, minutes | 30-40 |

The products were calorific gas and light hydrocarbons (15% yield), waxy oil, (85% yield) and water containing some dissolved organic material. Yields are weight % expressed on a dry polymeric feed basis. The waxy oil was distilled into fractions using a vacuum distillation method approximating ASTM D1160. The boiling curve for the distillation is shown in Table 30.

TABLE 30

D1160-type distillation of waxy oil product - boiling range data

| AEBP Start of cut deg C. | AEBP end of cut deg C. | Cumulative mass % in fractions |
|---|---|---|
| IBP | 155.0 | 3.2 |
| 155.0 | 224.6 | 8.5 |
| 224.6 | 255.0 | 14.5 |
| 255.0 | 280.3 | 20.4 |
| 280.3 | 308.5 | 26.4 |
| 308.5 | 331.6 | 32.9 |
| 331.6 | 360.9 | 39.7 |
| 360.9 | 388.0 | 46.1 |
| 388.0 | 418.1 | 52.8 |
| 418.1 | 449.0 | 59.1 |
| 449.0 | 475.7 | 65.0 |
| 475.7 | 506.7 | 71.6 |
| 506.7 | 525.2 | 77.7 |
| >525 | | 100 |

Figure twenty-one shows a GCMS total ion count chromatogram of middle distillate boiling region of a typical waxy oil product from high polyethylene content feedstock. The n-alkane: n-1-alkene ration for $C_{16}$ species in this sample is about 2.5:1 based on relative peak integrations, assuming equal response factors.

Example 9: Generation of Waxy Oil Products

The chlorine content was measured as <0.05% by weight. The feed polymeric material was processed according to the method of the invention using the apparatus described in Figure nine. The processing conditions were as shown in Table 31.

TABLE 31

| processing conditions | |
|---|---|
| mass % polymeric feed extruded to mixing piece, dry basis | 70 |
| mass % supercritical water added at mixing piece | 30 |
| extruder exit temperature, deg C. | 350 |
| supercritical water temperature at mixing piece, deg C. | 500 |
| process heater entry temperature, after mixing piece, deg C. | 370-380 |
| process heater exit temperature, deg C. | 450-460 |
| Reactor temperature, deg C. | 435-440 |
| Pressure, bar | 230-240 |
| Average residence time, minutes | 30-40 |

The products were calorific gas (10% yield), waxy oil, (~85% yield) and water containing some dissolved organic material. Yields are weight % expressed on a dry polymeric feed basis The waxy oil was distilled into fractions using a vacuum distillation method approximating ASTM D1160. The boiling curve for the distillation is shown in Table 32.

TABLE 32

| 1160-type distillation of waxy oil product - boiling range data | | |
|---|---|---|
| AEBP Start of cut deg C. | AEBP end of cut deg C. | Cumulative mass % in fractions |
| IBP | 151.6 | 1.9 |
| 151.6 | 248.8 | 9.2 |
| 248.8 | 295.0 | 17.4 |
| 295.0 | 335.6 | 26.0 |
| 335.6 | 377.2 | 35.2 |
| 377.2 | 415.8 | 43.9 |
| 415.8 | 454.9 | 52.3 |
| 454.9 | 538.7 | 60.8 |
| 538.7 | 612.7 | 68.8 |
| >612 | | 100.0 |

The invention claimed is:

1. A method for producing a bio-oil, the method comprising:
    extruding synthetic polymeric material in an extruder to thereby form a melt stream comprising the polymeric material, wherein the melt stream exits from the extruder at a temperature of between 200° C. and 300° C. and a pressure of between 100 bar and 350 bar,
    providing a stream of aqueous solvent that is separate to the melt stream,
    contacting the melt stream with the stream of aqueous solvent to form a reaction mixture,
    treating the reaction mixture in a reactor vessel at a reaction temperature and a reaction pressure for a time period suitable for conversion of all or a portion of the polymeric material present in the reaction mixture into a product comprising the bio-oil, and
    depressurising and cooling the product,
    wherein the stream of aqueous solvent is supercritical and comprises more than 90% supercritical water prior to said contacting,
    wherein the reaction mixture prior to said treating comprises at least 60 wt % of the polymeric material,
    wherein the reaction temperature is or ranges between 400° C. and 600° C., and
    wherein the reaction pressure is or ranges between 100 bar and 300 bar.

2. The method according to claim 1, wherein the extruder is a single screw extruder, a multiscrew extruder, a counter-rotating multiscrew extruder, a co-rotating multiscrew extruder, a twin screw extruder, a counter-rotating twin screw extruder, a co-rotating twin screw extruder, an intermeshing screw extruder, a radial extruder, or a roll-type extrusion press.

3. The method according to claim 1, wherein the method further comprises:
    (i) venting gases and/or vapours from one or a series of ports present in a barrel of the extruder; or
    (ii) venting gases and/or vapours from one or a series of ports present in a barrel of the extruder wherein the gases and/or vapours comprise any one or more of: hydrogen chloride, hydrogen bromide, hydrogen fluoride, chlorine, ammonia, carbon monoxide, and carbon dioxide.

4. The method according to claim 1, further comprising adding a base to any one or more of: the polymeric material prior to extrusion, the melt stream, the stream of aqueous solvent, and/or the reaction mixture,
    wherein the base is an additional component to the polymeric material and the aqueous solvent,
    wherein, within the reaction mixture, the number of moles of the base added per 100 grams of polymeric material is between 0.5 times and 1.5 times the total number of moles of halogens per 100 grams of the polymeric material, and
    wherein the base precipitates metal halides in the reaction mixture facilitating their removal.

5. The method according to claim 4, wherein the product has a pH of more than 3, 4, 5, 6, 7, 8, or 9 after cooling and depressurising it to ambient temperature and pressure.

6. The method of claim 1,
    wherein the extruder is directly connected to a hydrothermal reactor apparatus in a manner allowing the melt stream to flow into the reactor in a continuous flow.

7. The method according to claim 1, wherein prior to said extruding:
    (i) the polymeric material is pretreated using any one or more of grinding, chipping, pelletisation, granulisation, flaking, powdering, shredding, milling, compression/expansion, agitation, washing, flotation, removing materials comprising halogens optionally by infra-red or x-ray fluorescence detection and compressed gas classification/rejection and/or pulse-electric field (PEF) treatment; and/or
    (ii) the polymeric material is extruded in the presence of water, and the water constitutes less than 5 wt % (wet basis) of total polymeric material weight.

8. The method according to claim 1, wherein the polymeric material is selected from the group consisting of: Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly (vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly (phenylene Oxide) (PPO), Polyphenylene Sulfide (PPS), Polyphthalamide, (PTA), Polysulfone (PSU), Polyurethane, (PU), Poly(vinylidene chloride) (PVDC), Poly(tetrafluoroethylene) PTFE, Poly(fluoroxy alkane) PFA, Poly(siloxanes), silicones, thermoplastics, thermosetting polymers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, and silicone rubbers, plastics, and mixtures thereof.

9. The method according to claim 1, wherein the reaction mixture prior to said treating comprises
less than 70 wt % of the polymeric material.

10. The method according to claim 1, wherein the polymeric material comprises:
less than about 5 wt % nitrogen;
less than about 1 wt % total halogens;
a molar ratio of hydrogen to carbon (H/C) of greater than 2.15; or
combinations thereof.

11. The method of claim 1, wherein prior to said contacting the stream of aqueous solvent comprises:
(i) more than 95% supercritical water, or 100% supercritical water; or
(ii) between 5 wt % and 40 wt % alcohol, between 1 wt % and 30 wt % alcohol, between 5 wt % and 25 wt % alcohol, between 1 wt % and 20 wt % alcohol, between 2 wt % and 20 wt % alcohol, between 1 wt % and 10 wt % alcohol, or between 2 wt % and 10 wt % alcohol.

12. The method according to claim 1, wherein the aqueous solvent is alcohol, wherein the alcohol is ethanol, methanol, or a mixture comprising ethanol and methanol.

13. The method according to claim 1, wherein the method comprises:
separating one or more of a gaseous, aqueous, bio-oil, and/or wax component from the product, and/or
separating one or more fractions of a bio-oil, and/or one or more fractions of a wax component from the product.

14. The method according to claim 1, wherein the method comprises separating and recycling:
(i) a fraction of the product comprising a wax or a waxy oil having a boiling point above 370° C. atmospheric equivalent boiling point (AEBP); and/or
(ii) a fraction of the product having a boiling point in the range of a: naphtha boiling range, heavy naphtha boiling range, kerosene boiling range, diesel boiling range, heavy gas oil boiling range, or vacuum gas oil boiling range, and combusting the separated naphtha fraction to provide heat for the reactor vessel.

15. The method according to claim 1, wherein the reaction mixture comprises a supplementary catalyst selected from the group consisting of: a base catalyst, an acid catalyst, a water-gas-shift catalyst, an alumino-silicate catalyst, a sulphide catalyst, and any combination thereof, wherein the supplementary catalyst is not derived from any other component of the reaction mixture or a vessel wall of a reactor apparatus, and does not form in situ during the method.

16. The method according to claim 15, wherein:
(i) the supplementary catalyst is selected from the group consisting of sodium hydroxide, potassium hydroxide, sodium carbonate, potassium carbonate, sodium formate, potassium formate, and iron salt; and/or
(ii) the supplementary catalyst is added to the reaction mixture after the reaction mixture has reached said reaction temperature, or after the reaction mixture after the reaction mixture has reached said reaction temperature and said reaction pressure.

17. The method according to claim 1, wherein the reaction mixture comprises oil selected from the group consisting of paraffinic oil, gas-oil, crude oil, synthetic oil, coal-oil, bio-oil, shale oil, kerogen oil, mineral oil, white mineral oil, and aromatic oil.

18. The method according to claim 1, wherein the reaction mixture prior to said treating:
(i) comprises less than 10 wt % of: lignocellulosic matter, coal, coke, peat, kerogen, tar sand, oil shale, shale tar, asphalt, asphaltine, natural bitumen, and bituminous sand; or
(ii) does not comprise lignocellulosic matter, coal, coke, peat, kerogen, tar sand, oil shale, shale tar, asphalt, asphaltine, natural bitumen, and bituminous sand.

* * * * *

UNITED STATES PATENT AND TRADEMARK OFFICE
CERTIFICATE OF CORRECTION

PATENT NO. : 11,339,330 B2
APPLICATION NO. : 16/465916
DATED : May 24, 2022
INVENTOR(S) : Humphreys et al.

It is certified that error appears in the above-identified patent and that said Letters Patent is hereby corrected as shown below:

In the Specification

Column 3, Line 46:
now reads "is preteated using any"
should read --is pretreated using any--

Column 4, Line 36:
now reads "at least 5 wt%, at least 30 wt%"
should read --at least 25 wt%, at least 30 wt%--

Column 5, Line 4:
now reads "less than about 1 wt% total halogens, less than about 1 wt% total halogens"
should read --less than about 1 wt% total halogens--

Column 5, Line 10:
now reads "greater than 14,"
should read --greater than 1.4,--

Column 5, Line 35:
now reads "300 bar; or"
should read --300 bar.--

Column 5, Line 48:
now reads "more than 90% subcritical water, more than 90% subcritical water,"
should read --more than 90% subcritical water, more than 95% subcritical water,--

Column 7, Line 1:
now reads "or after the reaction mixture after the reaction mixture"
should read --or after the reaction mixture--

Column 11, Line 33:
now reads "intrinsically present other"
should read --intrinsically present in other--

Column 11, Line 59:
now reads "a " or "substantially chemical inert"

Signed and Sealed this
Twenty-eighth Day of February, 2023

Katherine Kelly Vidal
*Director of the United States Patent and Trademark Office*

CERTIFICATE OF CORRECTION (continued)
U.S. Pat. No. 11,339,330 B2

| | |
|---|---|
| | should read --a "substantially inert" or "substantially chemical inert"-- |
| Column 17, Line 62: | now reads "about 0.01% total halogens,"<br>should read --about 0.01 wt% total halogens,-- |
| Column 18, Line 2: | now reads "greater than 14,"<br>should read --greater than 1.4,-- |
| Column 23, Line 49: | now reads "more than 1 wt%,"<br>should read --more than 15 wt%,-- |
| Column 29, Line 20: | now reads "number different factors"<br>should read --number of different factors-- |
| Column 29, Line 66: | now reads "solvent brio to contacting"<br>should read --solvent prior to contacting-- |
| Column 32, Line 28: | now reads "less than about LB"<br>should read --less than about 1.8-- |
| Column 33, Line 31: | now reads "boil product"<br>should read --bio-oil product-- |
| Column 33, Line 41: | now reads "to 20 barg, 10 barg, 1 barg, or 0.2 barg"<br>should read --to 20 bar/g, 10 bar/g, 1 bar/g or 0.2 bar/g-- |
| Column 34, Line 57: | now reads "viscosity or..."<br>should read --viscosity of-- |
| Column 36, Line 51/52/53/54: | now reads "20,000 kg/m2/h more than 30,000 kg/m2/h, more than 40,000 kg/m2/h, more than 50,000 kg/m2/h , less than 80,000 kg/m2/h, between 30,000 and 60,000 kg/m2/h"<br>should read --20,000 kg/m$^2$/h more than 30,000 kg/m$^2$/h, more than 40,000 kg/m$^2$/h, more than 50,000 kg/m$^2$/h , less than 80,000 kg/m$^2$/h, between 30,000 and 60,000 kg/m$^2$/h-- |
| Column 39, Table 6: | now reads "Pressure Range (barg)"<br>should read --Pressure Range (bar/g)-- |
| Column 40, Line 2: | now reads "polymers nut fully cracked"<br>should read --polymers not fully cracked-- |
| Column 46, Line 37: | now reads "varied or example by"<br>should read --varied for example by-- |

CERTIFICATE OF CORRECTION (continued)
U.S. Pat. No. 11,339,330 B2

| | |
|---|---|
| Column 47, Table 18: | now reads "Pressure barg" |
| | should read --Pressure bar/g-- |
| | |
| Column 49, Line 63: | now reads "~3-5 mg/l" |
| | should read --~3-5 mg/L-- |
| | |
| Column 53, Table 28: | now reads "Kinematic viscosity/2.83/mm2/s" |
| | should read --Kinematic viscosity/2.83/mm$^2$/s-- |

In the Claims

Claim 16,
| | |
|---|---|
| Column 58, Lines 23-24: | now reads "or after the reaction mixture after the reaction mixture" |
| | should read --or after the reaction mixture-- |